(12) United States Patent
Faber

(10) Patent No.: US 6,301,195 B1
(45) Date of Patent: Oct. 9, 2001

(54) GEOPHONE WITH MOUNTED CONNECTORS

(75) Inventor: C. A. M. Faber, Voorhout (NL)

(73) Assignee: Input/Ouput, Inc., Stafford, TX (US)

( * ) Notice: Subject to any disclaimer, the term of this patent is extended or adjusted under 35 U.S.C. 154(b) by 0 days.

(21) Appl. No.: 09/429,842

(22) Filed: Oct. 29, 1999

Related U.S. Application Data

(60) Provisional application No. 60/124,410, filed on Mar. 15, 1999, and provisional application No. 60/125,076, filed on Mar. 17, 1999.

(51) Int. Cl.⁷ .................................. H04R 1/02; G01V 1/16
(52) U.S. Cl. ............................................................ 367/188
(58) Field of Search ............................. 367/188; 181/122

(56) References Cited

U.S. PATENT DOCUMENTS

| | | | |
|---|---|---|---|
| 3,930,218 | * 12/1975 | Hall, Jr. ................................ | 367/188 |
| 4,637,001 | * 1/1987 | Annoot ................................ | 367/188 |
| 4,811,311 | * 3/1989 | Woodall, Jr. et al. ................ | 367/188 |
| 5,010,531 | * 4/1991 | McNeel ................................ | 367/188 |
| 5,878,001 | * 3/1999 | McNeel et al. ....................... | 367/188 |

* cited by examiner

Primary Examiner—Daniel T. Pihulic
(74) Attorney, Agent, or Firm—Madan, Mossman & Sriram, PC

(57) ABSTRACT

A geophone with mounted connectors includes a body, a plurality of removable cable connectors, and a cap. The body includes an opening defining a cavity, a first circuit board positioned in the cavity, and a seismic detector positioned in the cavity operably coupled to the first circuit board. The cable connectors are positioned in the cavity above the first circuit board. The cap is coupled to the body and includes a second printed circuit board operably coupled to the cable connectors and the first circuit board.

40 Claims, 54 Drawing Sheets

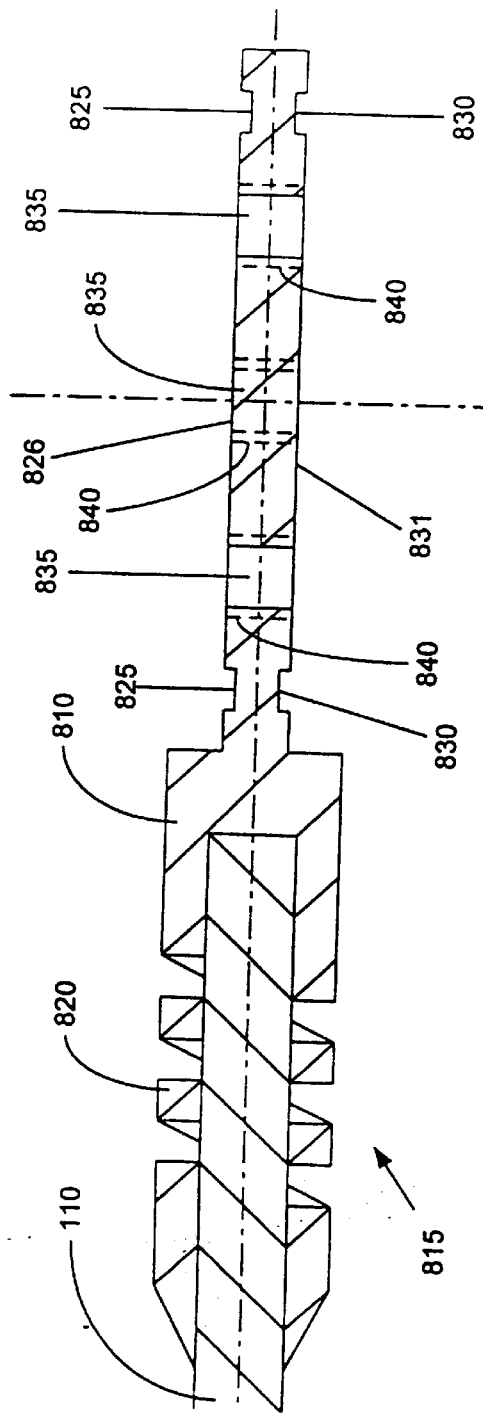
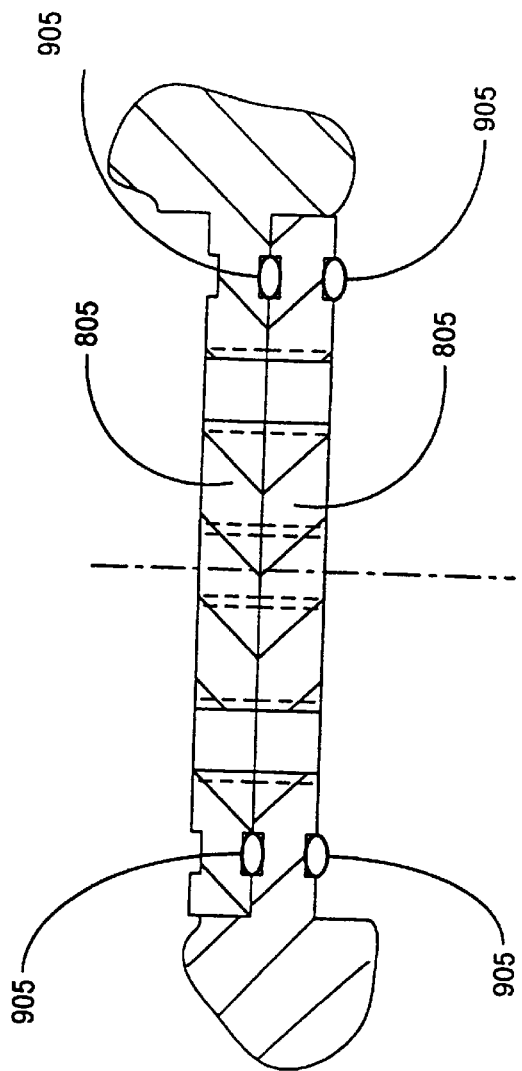
FIGURE 9a
FIGURE 9b

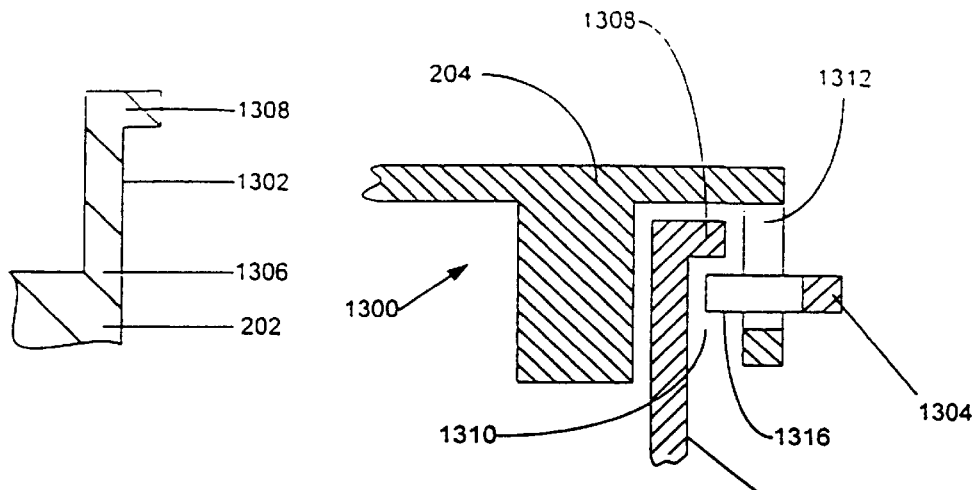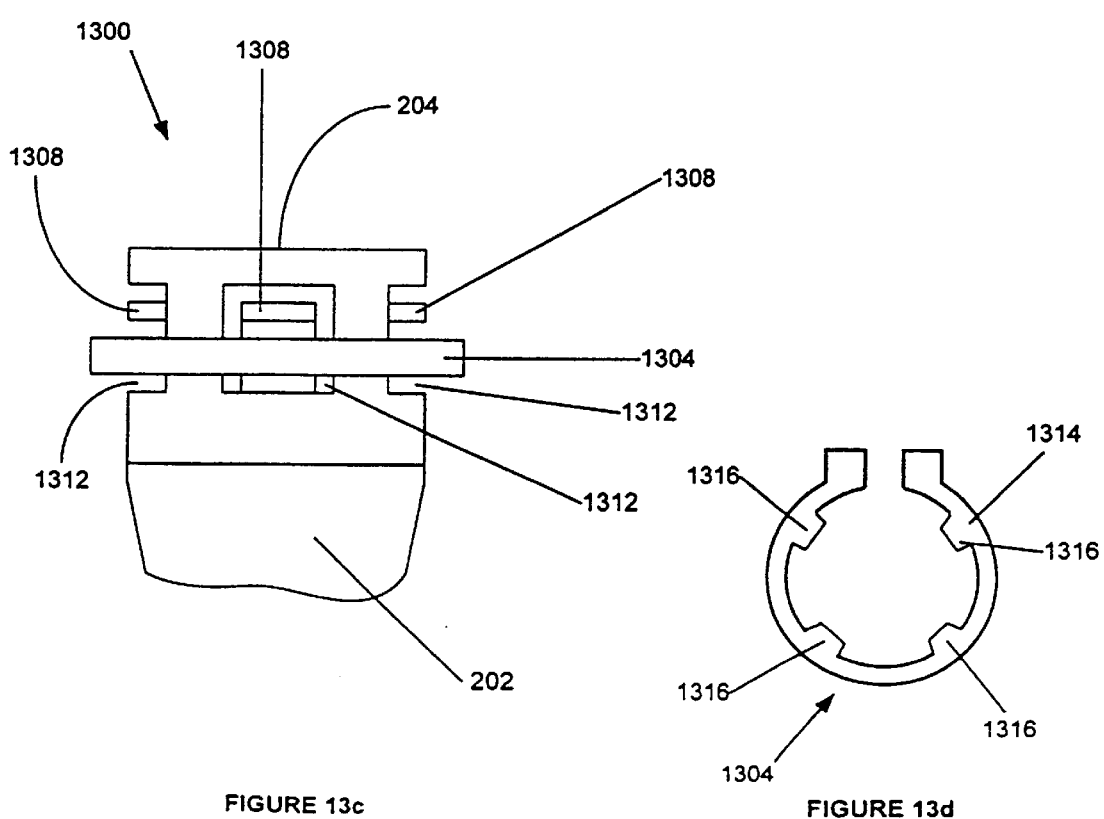

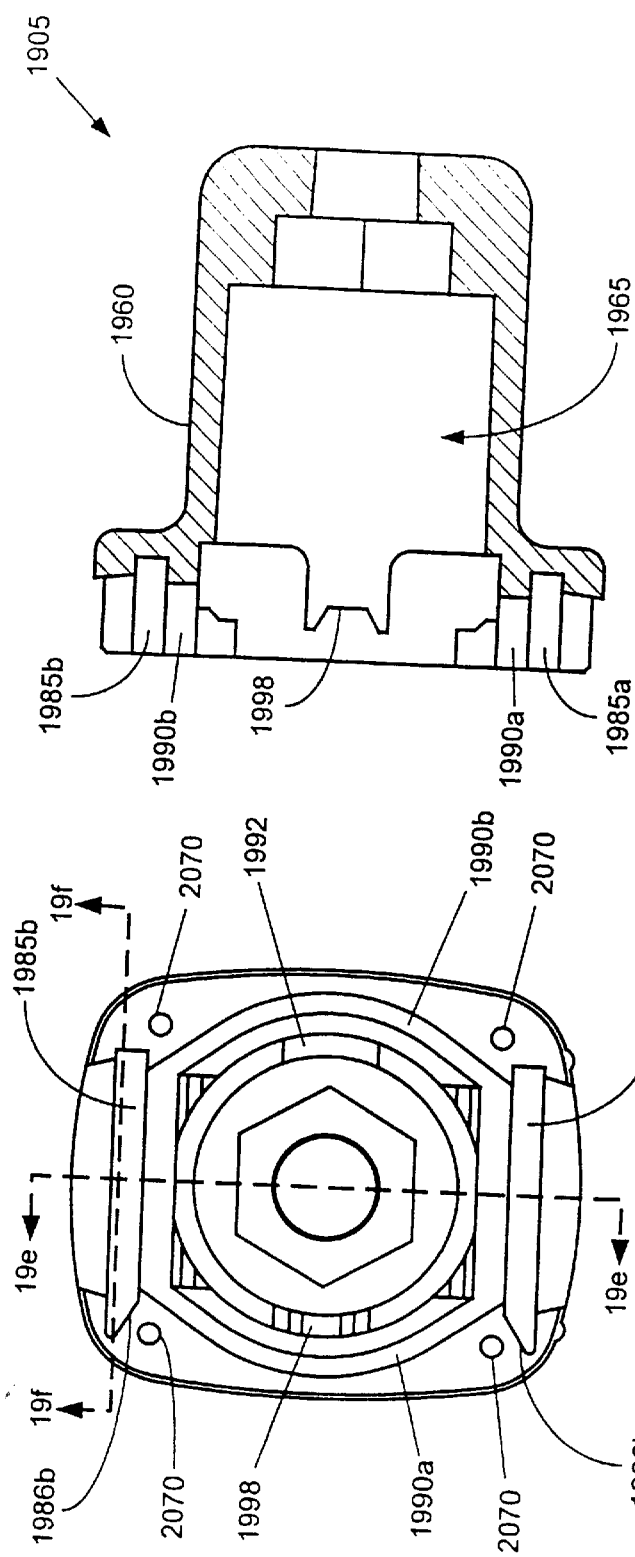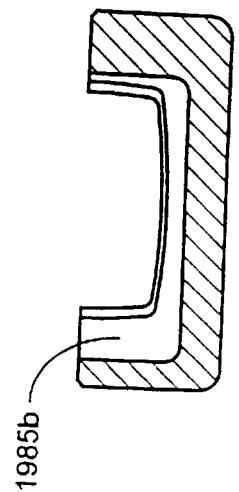

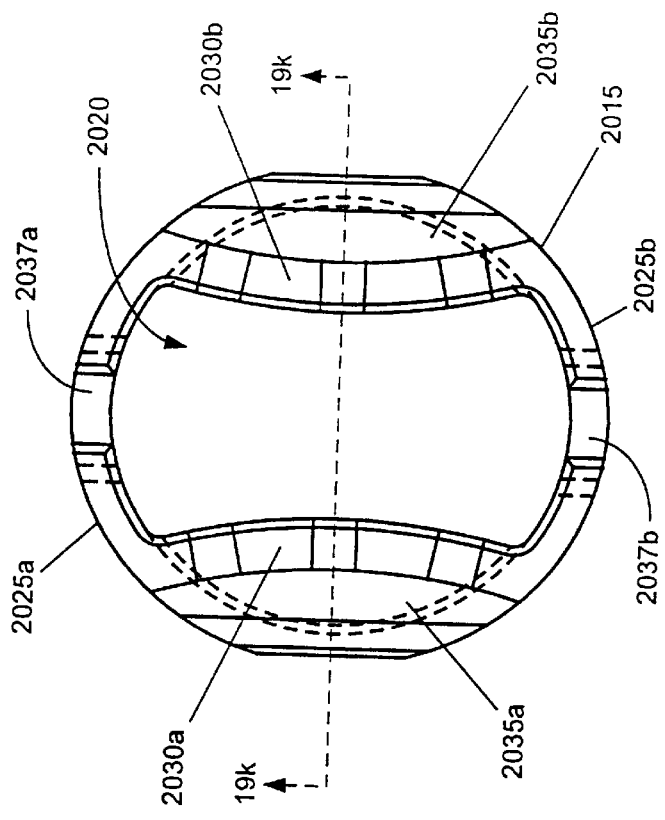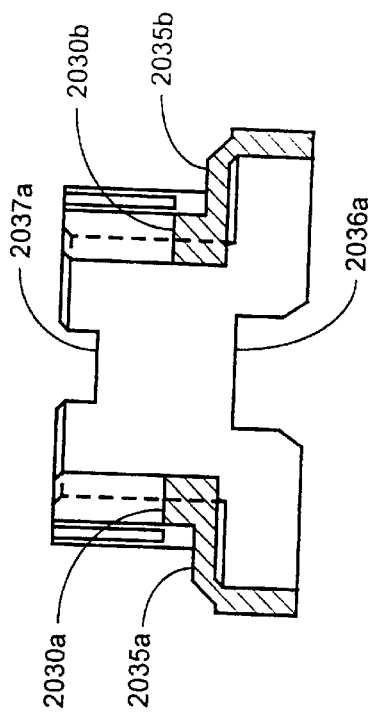
FIGURE 19j
FIGURE 19k

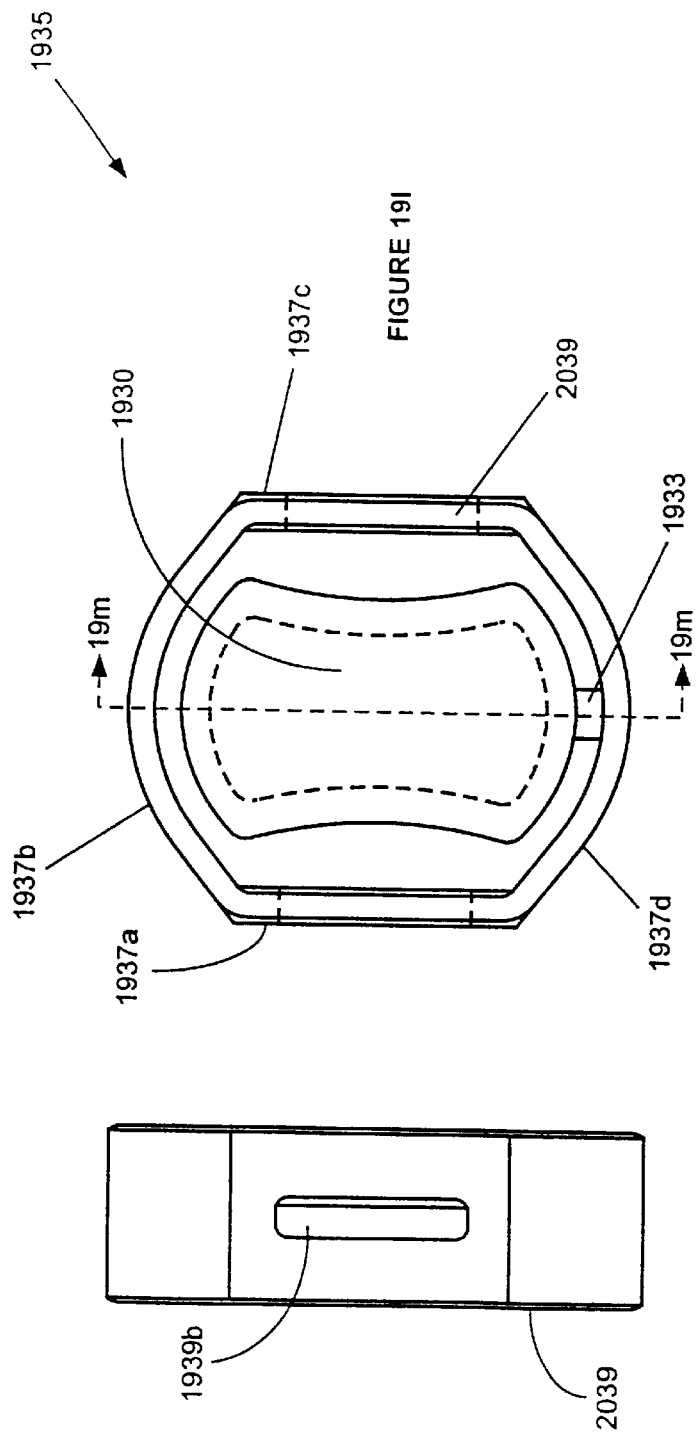
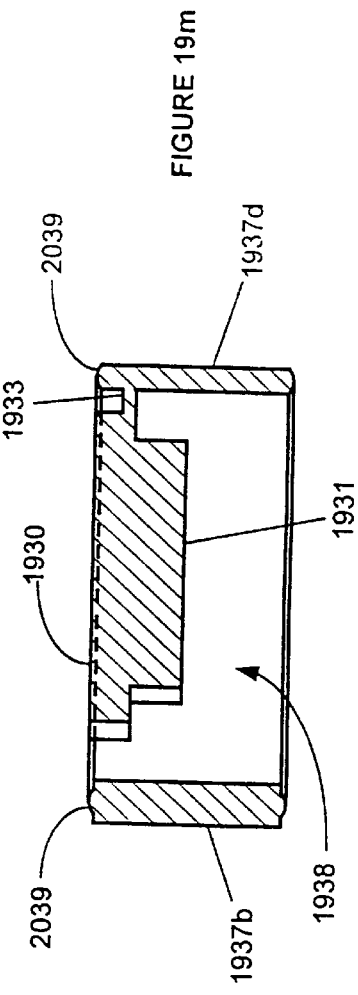

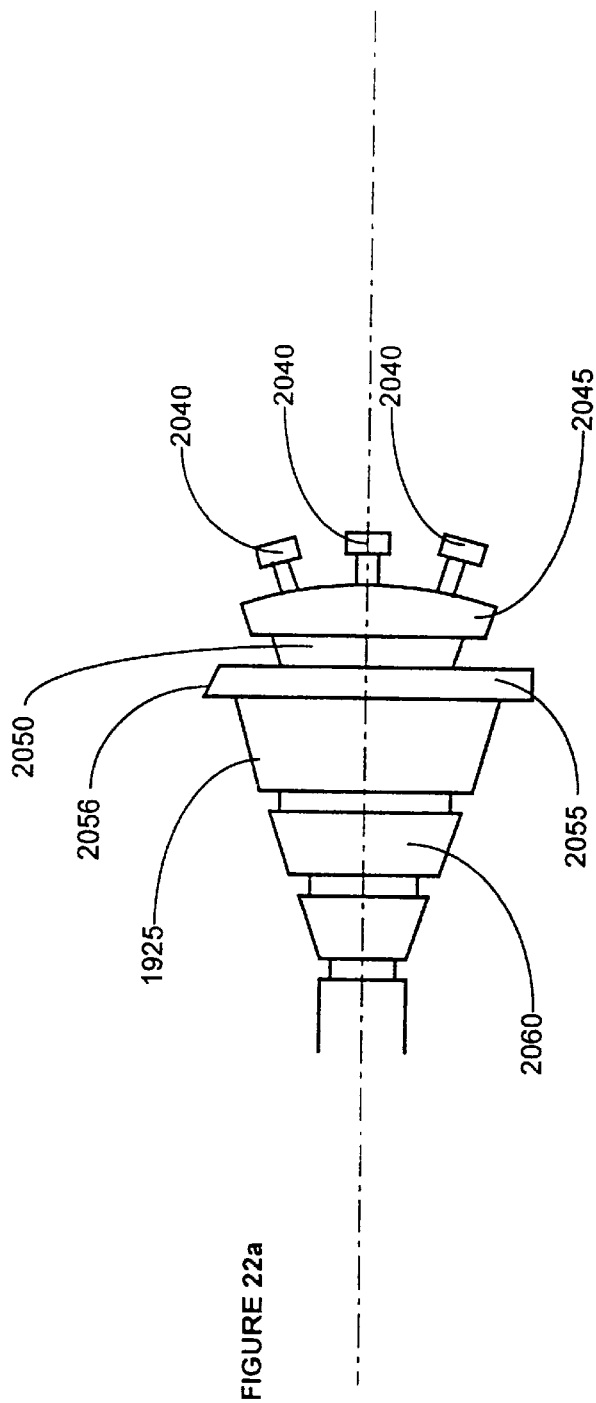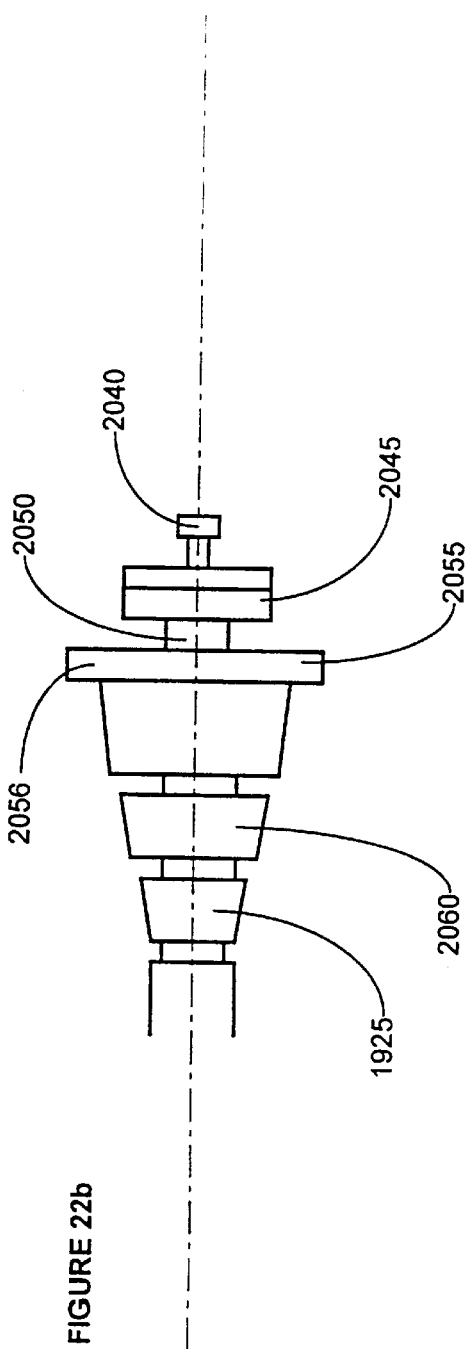
FIGURE 22a
FIGURE 22b

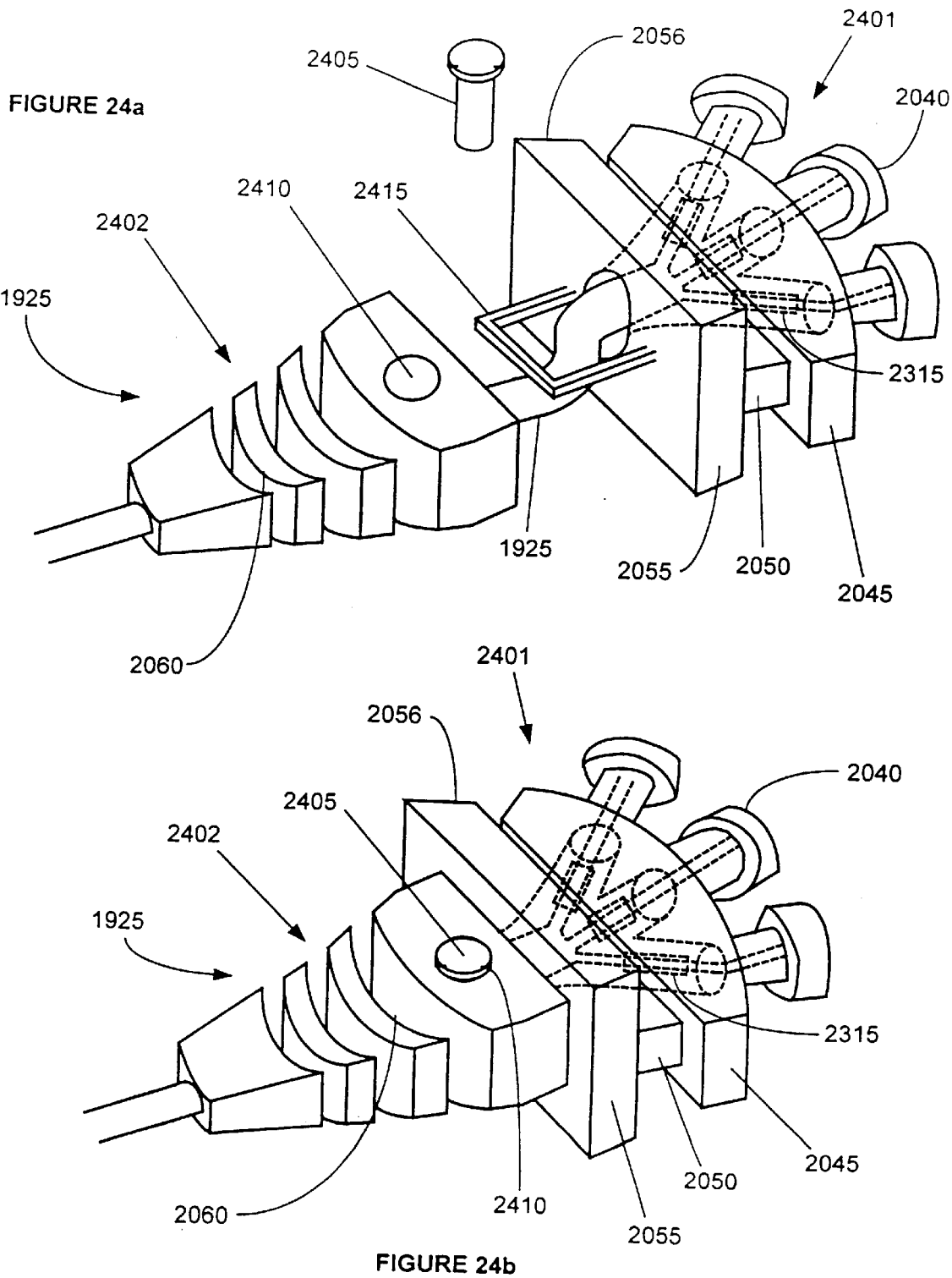

1

GEOPHONE WITH MOUNTED CONNECTORS

CROSS-REFERENCE TO RELATED APPLICATIONS

This application claims the benefit of the filing dates of U.S. provisional patent application serial number 60/124,410, filed on Mar. 15, 1999, and U.S. provisional patent application serial number 60/125,076, filed on Mar. 17, 1999, the disclosures of which are incorporated herein by reference.

BACKGROUND OF THE INVENTION

This invention relates generally to geophones, and in particular to geophones with mounted connectors.

Seismic geophone systems are used to gather seismic data. Existing geophone systems suffer from a number of limitations. These limitations include the necessity for soldered electrical connections and complicated mechanical fasteners which increases both the cost and complexity of assembly and repair.

The present invention is directed to overcoming one or more of the limitations of the existing geophone systems.

SUMMARY OF THE INVENTION

According to one aspect of the present invention, a geophone system is provided that includes one or more geophones including a body including an opening defining a cavity, a first circuit board positioned in the cavity, and a seismic detector positioned in the cavity operably coupled to the first circuit board, one or more removable cable connectors positioned in the cavity above the first circuit board, and a cap coupled to the body, the cap including a second printed circuit board operably coupled to the cable connectors and the first circuit board, and cabling operably coupled to the cable connectors.

According to one aspect of the present invention, a geophone system is provided that includes one or more-geophones including a body including an opening defining a cavity, a plurality of slots extending into the cavity, a first circuit board positioned in the cavity, a seismic detector positioned in the cavity operably coupled to the first circuit board, and one or more locking fingers extending from the body, one or more removable cable connectors positioned in the cavity above the first circuit board, the cable connectors extending into the slots, and a cap coupled to the locking fingers, the cap including a second printed circuit board operably coupled to the cable connectors and the first circuit board, and cabling operably coupled to the cable connectors.

According to another aspect of the present invention, a geophone system is provided that includes one or more geophones including a body including an opening defining a cavity, a circuit board positioned in the cavity, and a seismic detector positioned in the cavity operably coupled to the circuit board, one or more removable cable connectors positioned in the cavity on top of the circuit board, and a cap coupled to the body, and cabling operably coupled to the cable connectors.

According to another aspect of the present invention, a geophone element is provided that includes a geophone sensor and a circuit board coupled to the geophone sensor.

According to another aspect of the present invention, a cabling system for use within a geophone system is provided that includes an electrical cable, a housing for the cable, and one or more cable terminations at the ends of the electrical cable.

According to another aspect of the present invention, a housing for holding geophone sensor components is provided that includes a housing body including an opening comprising a cavity within the body, one or more keying members located within the housing body, and a cap for sealing the housing body.

According to another aspect of the present invention, a bridge device is provided that includes a bridge body, including an interior chamber and exterior walls, and slots defining cable termination supports in the exterior walls.

According to another aspect of the present invention, a rubber pressure seal for sealing geophone system components is provided that includes a body, including a top surface and a bottom surface, and a pressure ridge positioned on the bottom surface of the body.

According to another aspect of the present invention, a gasket device for mating with a housing for holding a geophone sensor is provided that includes exterior walls and an interior chamber.

According to another aspect of the present invention, a cap for sealing a housing body within a geophone system is provided that includes a cap body and one or more screw holes extending through the cap body.

According to another aspect of the present invention, a method of assembling a geophone assembly is provided that includes inserting a geophone sensor element within a body of a housing, placing a bridge in the body of the housing, inserting cabling into the housing body, placing a gasket device on top of the cabling, and sealing the geophone assembly.

According to another aspect of the present invention, a method of replacing components in a geophone assembly is provided that includes disassembling the geophone assembly, removing a component from within the geophone assembly, replacing the component with a new component, and reassembling the geophone assembly.

BRIEF DESCRIPTION OF THE DRAWINGS

FIG. 9a is a side view of the mounted cable connector shown in FIG. 8.

FIG. 9b is a side view illustrating the use of a plurality of the mounted cable connectors of FIG. 9a.

FIG. 12a is a partial cross-sectional view of the hollow body of the geophones illustrating an embodiment of the locking mechanism for attaching the cap to the hollow body of the geophone.

FIG. 12b is a top view of the hollow body of FIG. 12a.

FIG. 12c is-a-fragmentary cross-sectional illustration of locking relationship between the cap and the hollow body.

FIG. 13a is a fragmentary cross-sectional view of an alternative embodiment of the locking fingers of the alternative locking mechanism.

FIG. 13b is a fragmentary cross-sectional view of the alternative embodiment of the locking mechanism.

FIG. 13c is a side view of the alternative view of the locking mechanism.

FIG. 13d is a top view of the locking ring.

FIG. 14b is an exploded view of another portion of the geophone with mounted connectors of FIG. 14a.

FIG. 14c is an exploded view of another portion of the geophone with mounted connectors of FIG. 14a.

FIG. 19b is an exploded view of another portion of the geophone with mounted connectors of FIG. 19a.

FIG. 19c is an exploded view of another portion of the geophone with mounted connectors of FIG. 19a.

FIG. 19d is a top view of a preferred embodiment of a body of the geophone with mounted connectors of FIG. 19a.

FIG. 19e is a cross-sectional view of the body of FIG. 19d.

FIG. 19f is a cross-sectional view of a portion of the body of FIG. 19d.

FIG. 19g illustrates a preferred embodiment of a circuit board within the geophone with mounted connectors of FIG. 19a.

FIG. 19h illustrates another preferred embodiment of the circuit board of FIG. 19g.

FIG. 19i illustrates another preferred embodiment of the circuit board of FIG. 19g.

FIG. 19j is a top view of a preferred embodiment of a bridge included within the geophone with mounted connectors of FIG. 19b.

FIG. 19k is a cross-sectional view of the bridge of FIG. 19j.

FIG. 19l is a top view of a preferred embodiment of a gasket device included within the geophone with mounted connectors of FIG. 19c.

FIG. 19m is a cross-sectional view of the gasket device of FIG. 19l.

FIG. 19n is a side view of the gasket device of FIG. 19l.

FIG. 22a is a top view of a preferred embodiment of a cable including a keying member.

FIG. 22b is a side view of the cable of FIG. 22a.

FIG. 22c is a side view of a preferred embodiment of a cable termination included within the cable of FIG. 22a.

FIG. 22d is a top view of an alternative embodiment of the cable of FIG. 22a.

FIG. 23 is a top view of the wire terminations used in the cable of FIG. 22a.

FIG. 24a is a three-dimensional view of an unassembled cable assembly including a locking mechanism.

FIG. 24b is a three-dimensional view of the cable assembly of FIG. 24a after assembly of the parts.

DETAILED DESCRIPTION OF THE ILLUSTRATIVE EMBODIMENTS

A geophone system is disclosed. The geophone system preferably includes cabling and a geophone assembly including a geophone element, a housing for holding the geophone element, and a cap for sealing the housing. In a preferred embodiment, the geophone assembly is assembled by aligning keying features positioned on various components within the system.

Figure 1:
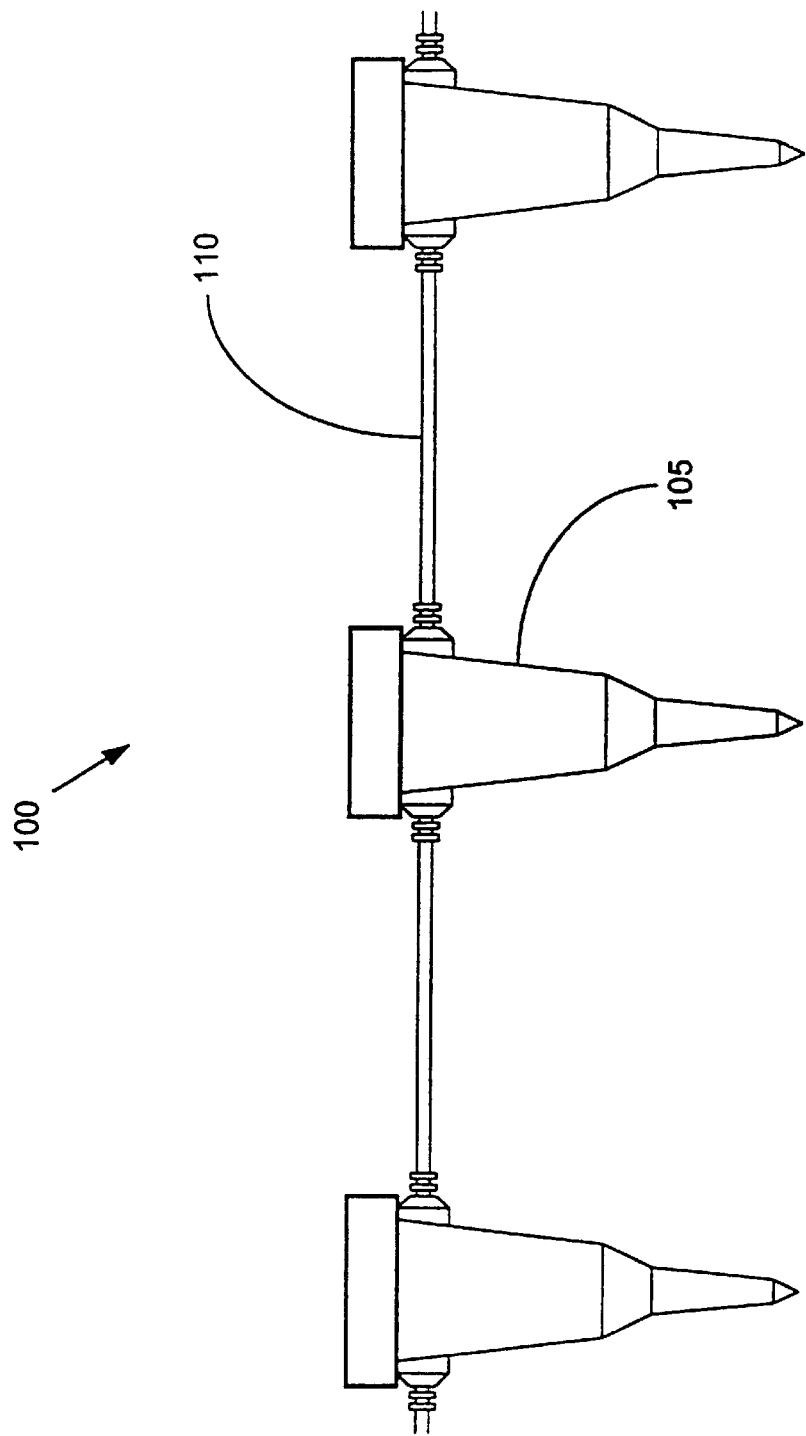
FIG. 1 is a side view of an embodiment of a geophone system including a number of geophones connected by cabling.

Referring initially to FIG. 1, a geophone system 100 is illustrated that includes geophones 105 connected by cabling 110. The cabling 110 may include any number of commercially available cabling suitable for geophone systems.

Figure 2:
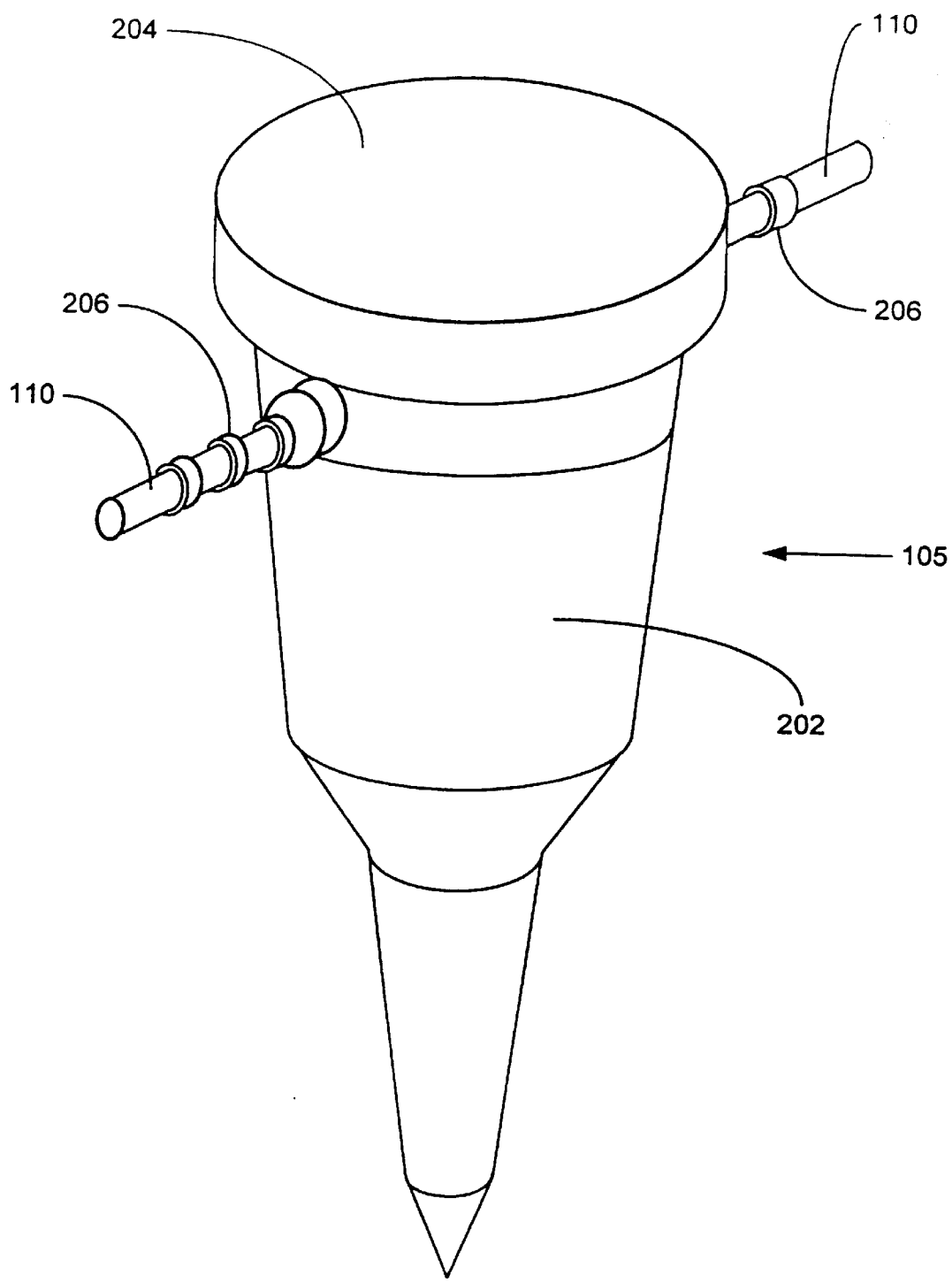
FIG. 2 is a three-dimensional view of an embodiment of a geophone with mounted connectors including a hollow body and a cap.

FIG. 2 illustrates a three-dimensional surface view of one of the geophones 105 and cabling 110 illustrated in FIG. 1. The geophone 105 includes a hollow body 202 and a cap 204, both having circular cross-sections. The hollow body 202 may be fabricated from any number of commercially available materials suitable for geophone systems using any number of conventional processes. The cap 204 may be fabricated from any number of commercially available materials suitable for geophone systems using any number of conventional processes.

The hollow body 202 receives the cabling 110 adjacent to the cap 204. In a preferred embodiment, a resilient plastic jacket 206 limits the cabling 110 radius of curvature adjacent to the hollow body 202 during use in order to prevent conductor damage. The resilient plastic jacket 206 may be fabricated from any number of commercially available materials suitable for geophone systems using any number of conventional processes. In a preferred embodiment, the resilient plastic jacket 206 is molded onto the cabling 110 to increase the structural strength of the cabling 110.

Figure 3:
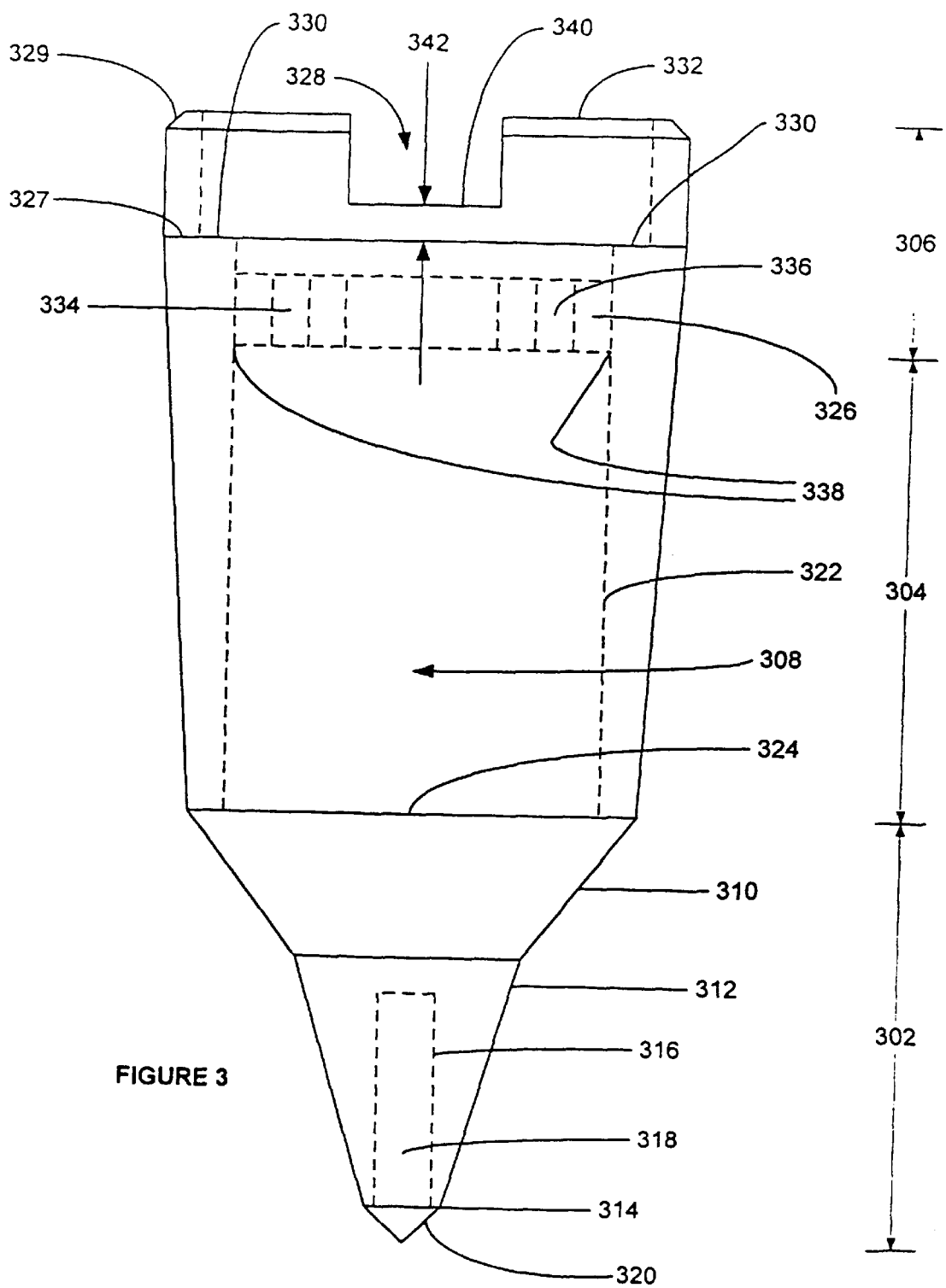
FIG. 3 is a side view of the hollow body of the geophone of FIG. 2.

FIG. 3 illustrates a side view of the hollow body 202 orthogonal to the view of FIG. 1. In a preferred embodiment, the hollow body 202 includes a bottom portion 302, a middle portion 304, a top portion 306, and an internal cavity 308. The bottom portion 302 is solid, having an upper conic portion 310 and a lower conic portion 312. The lower conic portion 312 includes a bottom surface 314, wherein a cavity 316 extends inward.

A metal spike 318 is mounted within the cavity 316. The spike 318 may be fabricated from any number of commercially available materials suitable for geophone systems using any number of conventional processes.

The spike 318 includes an enlarged pointed tip 320, which rests on the bottom surface 314. In a preferred embodiment, the diameter of the lower conic portion 312 increases from the bottom surface 314 to the upper conic portion 310. In a preferred embodiment, the lower conic portion 312 is relatively longer and narrower than the upper conic portion 310, which has a larger angle. In a preferred embodiment, the diameter of the upper conic portion 310 increases from the lower conic portion 312 to the middle portion 304.

In the preferred embodiment, the middle portion 304 houses a conventional geophone element 322, which inserts into the cavity 308 and rests on a bottom surface 324. The geophone element 322 may include any number of commercially available seismic detectors suitable for geophone systems. In a preferred embodiment, the external diameter of the middle portion 304 increases from the bottom portion 302 to the top portion 306, and partially into the top portion 306.

The top portion 306 includes the cavity 308, a printed circuit board 326, a slot 328, and a chamfer 329. The cavity 308 expands at a plane 327 thereby forming a ridge 330. The inner and outer diameters of the top portion 306 are constant from the plane 327 to a top surface 332. The printed circuit board 326, having receptacles 334,–336, is removably mounted within the cavity 308 at an area 338. The printed circuit board 326 may include any number of commercially available single or multi-layer circuit boards adapted to provide the predetermined electrical connections for the geophone element 322.

The slot 328 cuts through the top portion 306 adjacent to the top surface 332, and extends to a flat base 340. The flat base 340 parallels the plane 327 at an offset 342. As will be described in detail, the slot 328 facilitates the mounting of the cabling 110 to the geophone 105. In a preferred embodiment, slot 328 is substantially rectangular shaped. In alternative embodiments, the slot 328 could be V-shaped, circular, or some combination of these shapes. In a particularly preferred embodiment, the hollow body 202 includes a chamfer 329 adjacent the top surface 332 to facilitate mounting the cap 204 onto the hollow body 202.

Figure 4A:
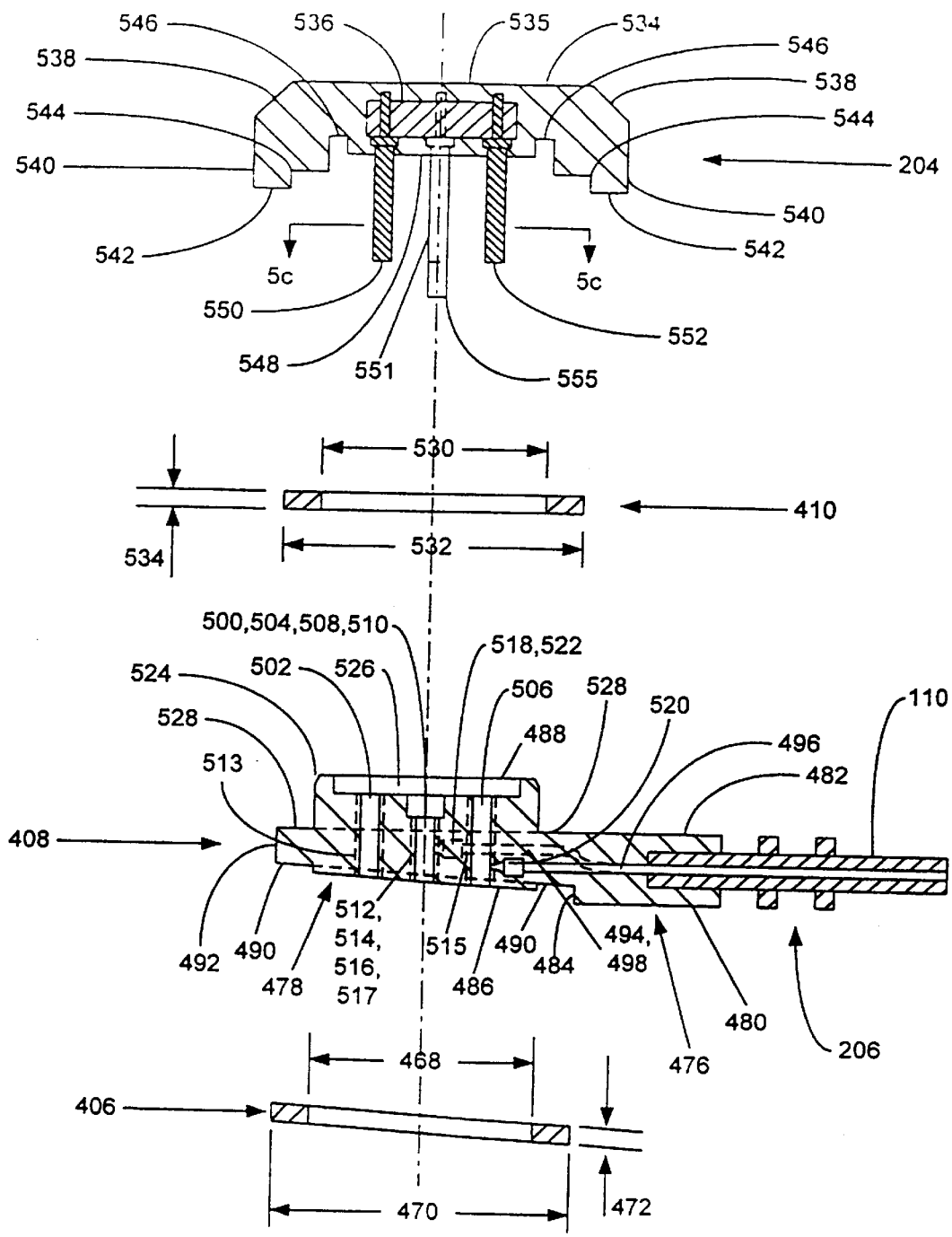
FIGS. 4a and 4b are exploded, cross-sectional side views of the geophone of FIG. 2 illustrating the design of the mounted cable connectors.
Figure 4B:
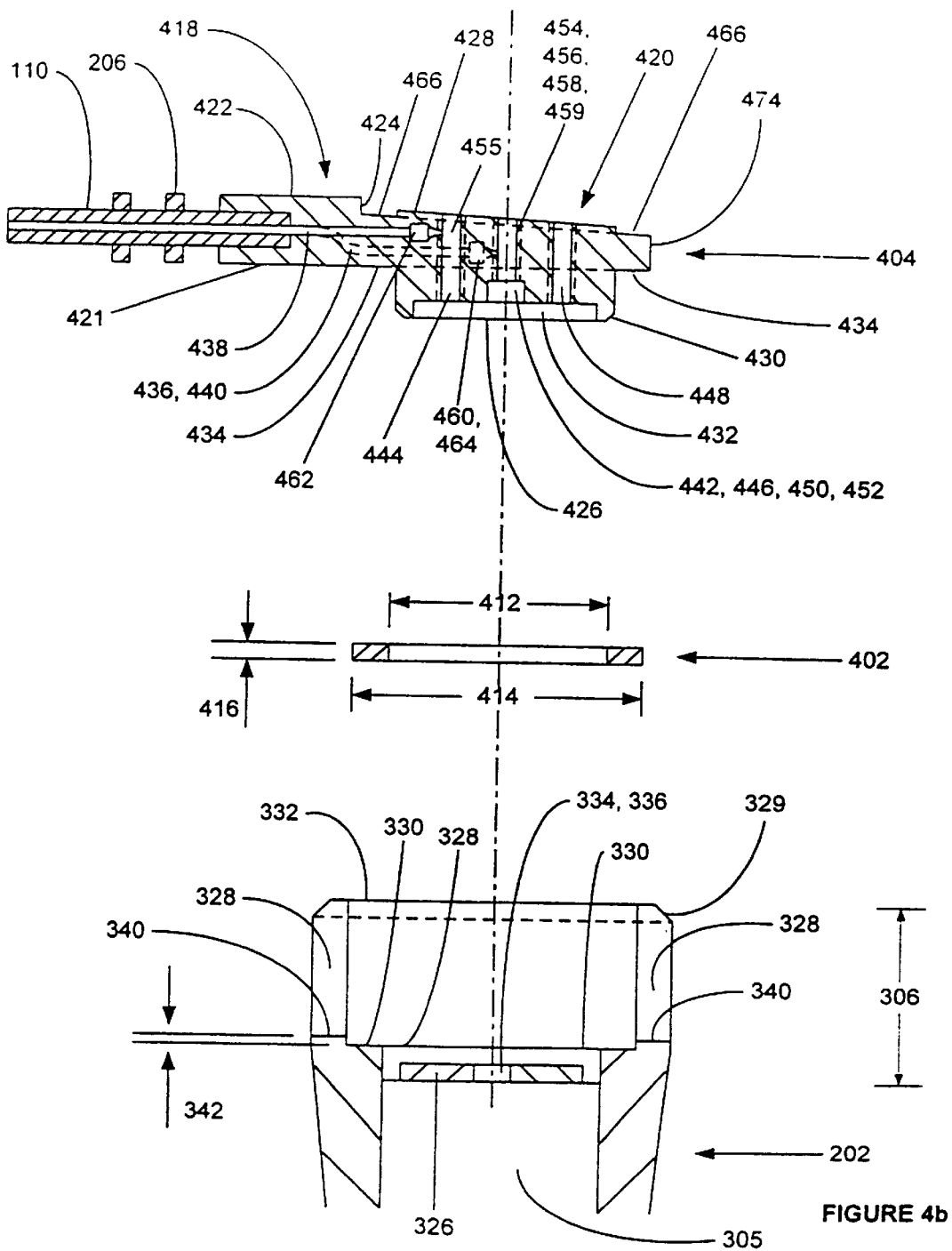

FIGS. 4a and 4b illustrate a preferred embodiment of the geophone 105, viewed in a direction parallel to FIG. 1. The hollow body 202 and the cap 204 jointly house an O-ring 402, a cable connector 404, an O-ring 406, a cable connector 408, and an O-ring 410, all within the top portion 306.

The O-ring 402 includes an inner diameter 412, an outer diameter 414, and a thickness 416. The O-ring 402 may be fabricated from any number of commercially available materials suitable for sealing.

The O-ring 402 engages the hollow body 202 at the ridge 330. In a preferred embodiment, the O-ring 402 fits flush against the ridge 330. In a preferred embodiment, the inner diameter 412 and the outer diameter 414 fit flush with the cavity 305, before and after expansion, respectively. In a preferred embodiment, the O-ring 402 is substantially parallel to the flat base 340 and the offset 342 matches the thickness 416 of the O-ring.

The cable connector 404 is mounted into the hollow body 202 through the slot 328, and is mounted therein adjacent to the O-ring 402. The cable connector 404 may be fabricated from any number of commercially available materials suitable for electrical connectors using any number of conventional processes.

The cable connector 404 includes a box-shaped section 418 and a diskshaped head 420. The box-shaped section 418 preferably mates with the slot 328, which guides the cable connector 404 into the top portion 306. The box-shaped section 418 has a flat bottom 421, a flat top 422, and a curved inner surface 424. The flat bottom 421 fits flush with the flat base 340. The flat top 422 fits flush with the top surface 332. Finally, the curved inner surface 424 fits flush with the cavity 305 inside the top portion 306.

The disk-shaped head 420 has a level side 426 and an angled side 428. The level side 426 includes a chamfered edge 430, a cavity 432, and an O-ring groove 434. The chamfered edge 430 guides the cable connector 404 beyond the ridge 330 to position the cavity 432 over the printed circuit board 326. Finally, the O-ring groove 434 engages the O-ring 402 at the flat base 340.

Additionally, the disk-shaped head 420 contains conductors 436, 438, and 440, receptacles 442, 444, 446, 448, 450 and 452, bushings 454–459, and crimp fittings 460, 462 and 464. The conductors 436, 438 and 440 enter the disk-shaped head 420 from the box-shaped section 418. Once inside the box-shaped section 418, the conductors 436, 438 and 440 disperse from the cable 110. In alternative embodiments, any number of conductors could be utilized.

The conductors 436, 438, and 440 may be fabricated from any number of commercially available materials suitable for electrical devices.

The receptacles 442, 444, 446, 448, 450 and 452 may be fabricated from any number of commercially available materials suitable for electrical devices.

The bushings 454–459 may be fabricated from any number of commercially available materials suitable for electrical devices.

The crimp fittings 460, 462 and 464 may be fabricated from any number of commercially available materials suitable for electrical devices.

The receptacles 442, 444, 446, 448, 450 and 452 extend through the disk-shaped head 420, in a direction substantially perpendicular to the level side 426. The bushings 454–459 jacket the interior surfaces of the receptacles 442, 444, 446, 448, 450 and 452 respectively. The bushings 454–459 may be mounted within the receptacles 442, 444, 446, 448, 450 and 452 using any number of conventional processes suitable for electrical devices.

The conductors 436, 438 and 440 are attached to the bushings 454–456 via the crimp fittings 460, 462 and 464, respectively. The conductors 436, 438 and 440 may be attached to the bushings 454–456 via the crimp fittings 460, 462 and 464 using any number of conventional processes suitable for electrical devices.

The angled side 428 of the mounted connector 404 has an O-ring groove 466, wherein the O-ring 406 seats. The O-ring 406 includes an inner diameter 468, an outer diameter 470, and a thickness 472. The O-ring 406 may be fabricated from any number of commercially available materials suitable for sealing.

In a preferred embodiment, the outer diameter 470 fits flush with the curved inner surface 424 and a curved outer surface 474. In a preferred embodiment, only about fifty percent of the thickness 472 fits into the O-ring groove 466.

The cable connector 408, which preferably horizontally and vertically mirrors the cable connector 404, engages both the cable connector 404 and the O-ring 406. The cable connector 408 may be fabricated from any number of commercially available materials suitable for electrical connectors.

The cable connector 408 includes a box-shaped section 476 and a disk-shaped head 478. The box-shaped section 476 preferably mates with the slot 328, which guides the cable connector 408 into the top portion 306. The boxshaped section 476 has a flat bottom 480, a flat top 482, and a curved inner surface 484. In a preferred embodiment, the flat bottom 480 fits flush with the flat base 340. In a preferred embodiment, the flat top 482 fits flush with the top surface 332. In a preferred embodiment, the curved inner surface 484 fits flush with the cavity 305 inside the top portion 306.

The disk-shaped head 478 has an angled side 486 and a level side 488, both relative to the box-shaped section 476. The angled side 486 has an O-ring groove 490, wherein the O-ring 406 fits. In a preferred embodiment, the outer diameter 470 fits flush with the curved inner surface 484 and a curved outer surface 492. In a preferred embodiment, only about fifty percent of the thickness 472 fits into the O-ring groove 490. In a preferred embodiment, the angled side 486 of the connector 408 contacts the angled side 428 of the connector 404 with only about fifty percent of the O-ring 406 positioned in the O-ring groove 466 and about fifty percent positioned in the O-ring groove 490.

Additionally, the disk-shaped head 478 contains conductors 494, 496, and 498, receptacles 500, 502, 504, 506, 508 and 510, bushings 512–517, and crimp fittings 518, 520 and 522. The receptacles 500, 502, 504, 506, 508 and 510 of the connector 408 are aligned with the receptacles 442, 444, 446, 448, 450 and 452 of the connector 404, respectively.

The conductors 494, 496, and 498 may be fabricated from any number of commercially available materials suitable for electrical devices.

The receptacles 500, 502, 504, 506, 508 and 510 may be fabricated from any number of commercially available materials suitable for electrical devices.

The bushings 512–517 may be fabricated from any number of commercially available materials suitable for electrical devices.

The crimp fittings 518, 520 and 522 may be fabricated from any number of commercially available materials suitable for electrical devices.

The conductors 494, 496, and 498 enter the disk-shaped head 478 from the box-shaped section 476. After entering the box-shaped section 476, the conductors 494,; 496, and 498 disperse from the cable 110. In a preferred embodiment, the receptacles 500, 502, 504, 506, 508 and 510 extend through the disk-shaped head 478 in a direction substantially perpendicular to the level side 488.

The bushings 512–517 jacket the interior surfaces of the receptacles 500, 502, 504, 506, 508 and 510, respectively. The bushings 512–517 may be mounted within the receptacles 500, 502, 504, 506, 508 and 510 using any number of conventional processes suitable for electrical devices.

The conductors 494, 496, and 498 are attached to the bushings 516, 515, and 517 via the crimp fittings 518, 520, 522, respectively. The conductors 494, 496, and 498 may be attached to the bushings 516, 515, and 517 via the crimp fittings 518, 520, 522 using any number of conventional processes suitable for electrical devices.

The level side 488 preferably has a chamfered edge 524, a cavity 526, and an O-ring groove 528, wherein the O-ring 410 seats. The O-ring 410 includes an inner diameter 530, an outer diameter 532, and a thickness 534. The O-ring 410 may be fabricated from any number of commercially available materials suitable for sealing. The outer diameter 532 preferably fits substantially flush with the curved outer surface 492.

The cap 204 mates with the hollow body 202 adjacent to the O-ring 410. The cap 204 includes a molded housing 534 and a printed circuit board 536. The printed circuit board 536 may include any number of commercially available single or multi-layer printed circuit boards modified in accordance with the teachings of the present disclosure.

The molded housing 534 includes a top surface 535, a chamfered edge 538, a curved outer surface 540, a bottom surface 542, an O-ring groove 544, an inner groove 546, and a middle area 548. Pins 550–555 protrude from the printed circuit board 536, and align with the receptacles 442, 444, 446, 448, 450 and 452 of the mounted connector 404 and the receptacles 500, 502, 504, 506, 508 and 510 of the mounted connector 408 respectively. The pins 550–555 extend through the middle area 548, and outwardly from the molded housing 534. Additionally, pins 554 and 555 extend relatively further than the pins 550–553.

The pins 550–555 may include any number of commercially available conductive connector pins modified in accordance with the teachings of the present disclosure.

Figure 5A:
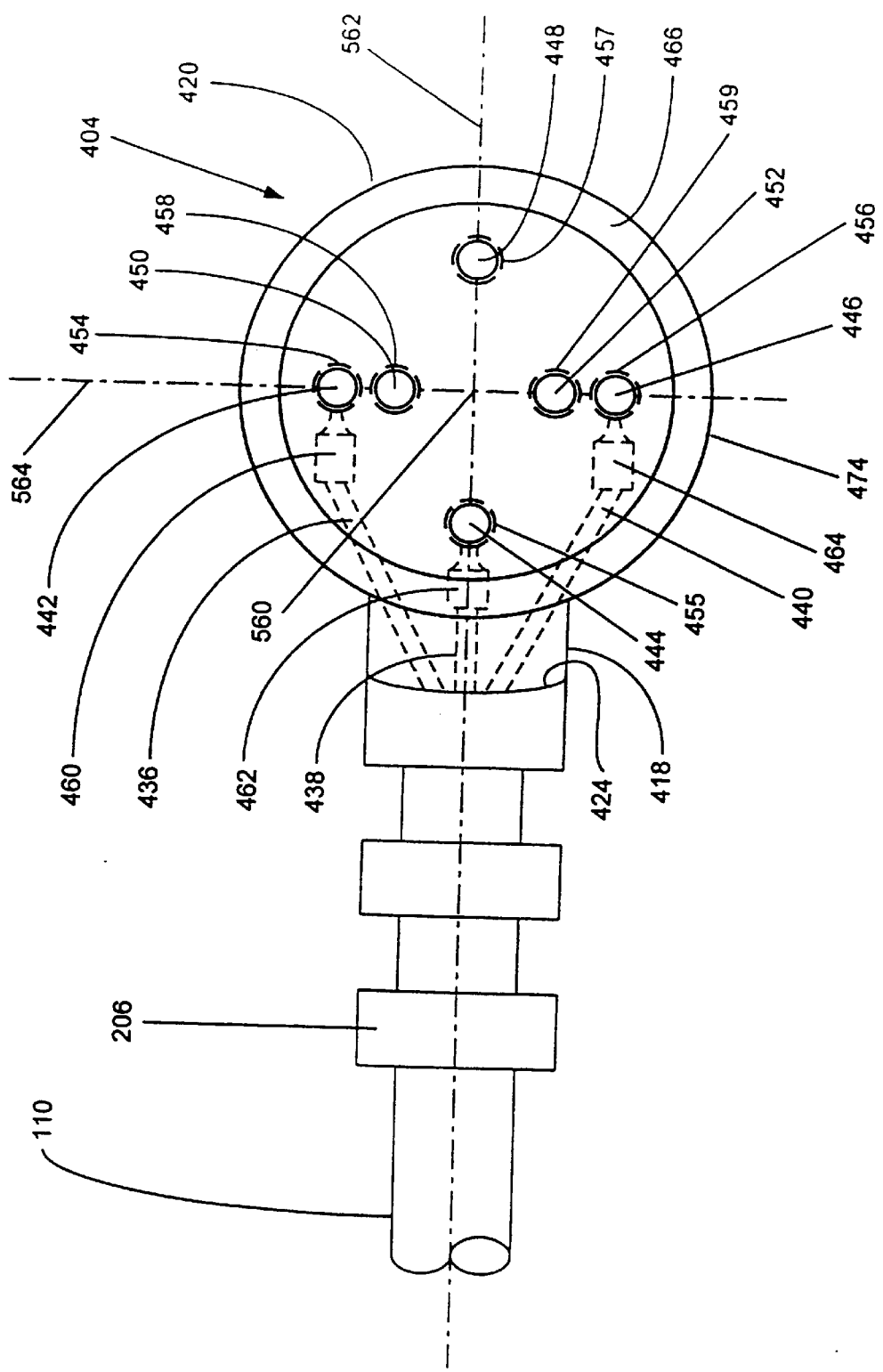
FIG. 5a is a top view of one of the mounted cable connectors shown in FIGS. 4a and 4b.

As illustrated in FIG. 5a, the disk-shaped head 420 of the mounted connector 404 has a center 560, an axis 562, and an axis 564. The axis 562 preferably parallels the cabling 110, and extends through the center 560. The axis 564 extends through the center 560 and is preferably perpendicular to the axis 562.

Preferably arranged symmetrically about the center 560, the receptacles 444 and 448 preferably lie on the axis 562, while the receptacles 442, 446, 450, and 452 preferably lie on the axis 564. In a preferred embodiment, the receptacles 442, 444, 446, 448, 450 and 452 all lie within the boundaries of the O-ring groove 466. In a preferred embodiment, the receptacle 444 lies nearest the box-shaped section 418, while the receptacle 448 lies equidistant from the center 560 rotated 180 degrees about the center 560. Referring to the axis 564, in a preferred embodiment, the receptacles 442 and 446 lie near the O-ring groove 466, while the receptacles 450 and 452 lie relatively closer to the center 560. Relative to the center 560, in a preferred embodiment, the receptacles 442 and 450 are oriented 90 degrees counterclockwise from the receptacle 448, while the receptacles 452 and 456 are oriented 90 degrees clockwise from the receptacle 448.

Figure 5B:
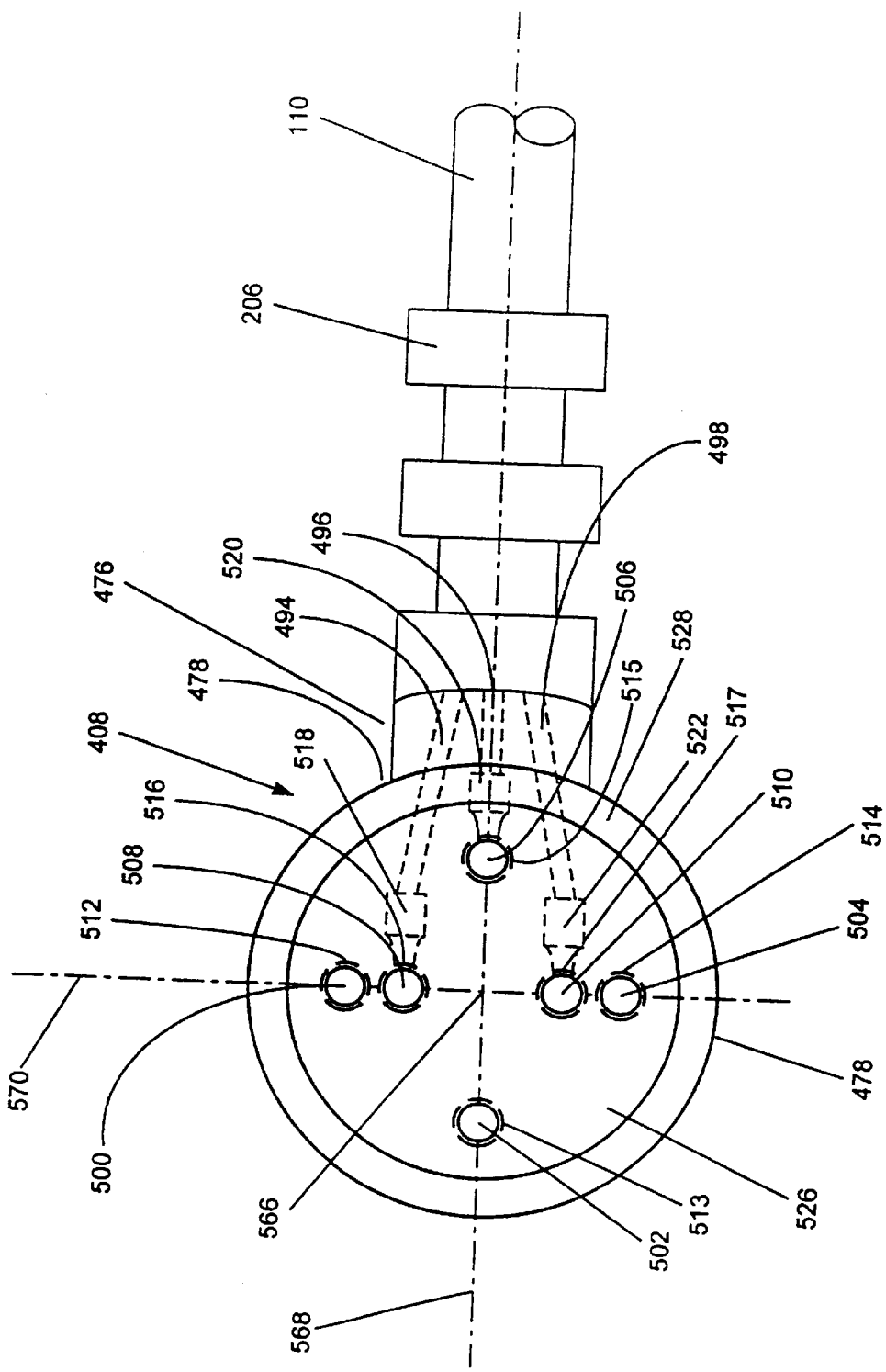
FIG. 5b is a top view of another one of the mounted cable connectors shown in FIGS. 4a and 4b.
Figure 5C:
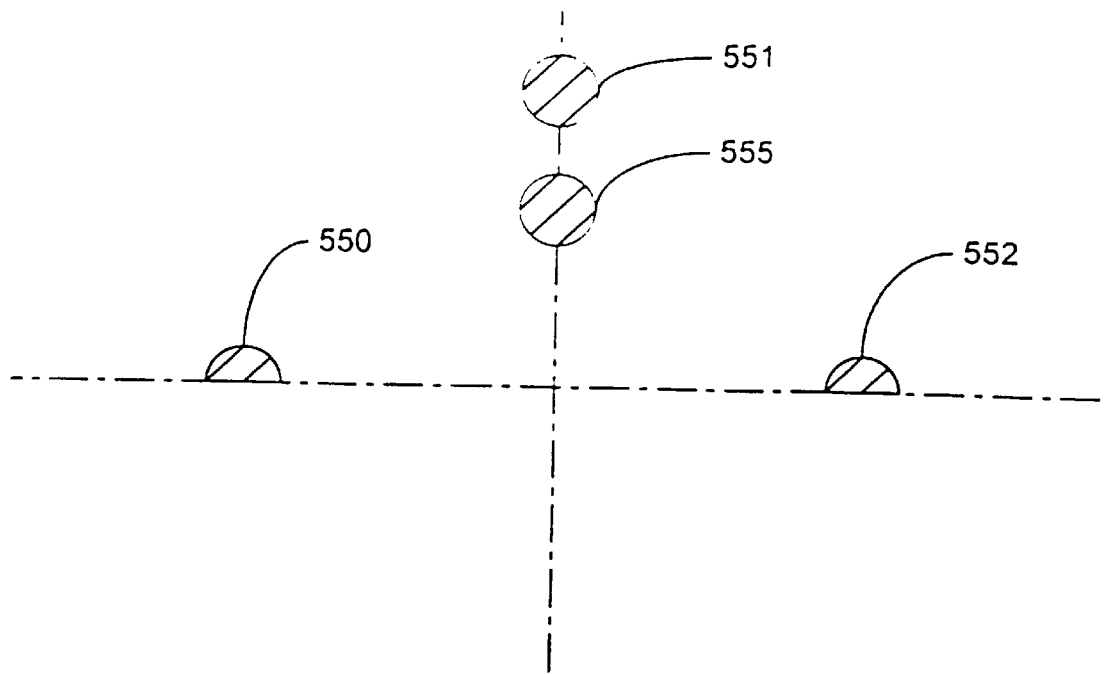
FIG. 5c is a cross-sectional view of the pins of FIGS. 4a and 4b.

As illustrated in FIG. 5b, the disk-shaped head 478 of the mounted connector 408 has a center 566, an axis 568, and an axis 570. The axis 568 preferably parallels the cabling 110, and extends through the center 566. The axis 570 extends through the center 566 and is perpendicular to the axis 568.

Arranged symmetrically about the center 566, in a preferred embodiment, the receptacles 502 and 506 lie on the axis 568, while the receptacles 500, 504, 508 and 510 lie on the axis 570. In a preferred embodiment, the receptacles 500, 502, 504, 506, 508 and 510 all lie within the boundaries of the O-ring groove 528. In a preferred embodiment, the receptacle 506 lies nearest the box-shaped section 476, while the receptacle 502 lies equidistant from the center 566 rotated 180 degrees about the center 566. Referring to the axis 570, in a preferred embodiment, the receptacles 500 and 504 lie near the O-ring groove 528, while the receptacles 508 and 510 lie relatively closer to the center 566. Relative to the center 566, in a preferred embodiment, the receptacles 500 and 508 are oriented 90 degrees counterclockwise from the receptacle 506, while the receptacles 504 and 510 are oriented 90 degrees clockwise from the receptacle 506.

Thus, in a preferred embodiment, the receptacles 442, 444, 446, 448, 450 and 452 of the mounted connector 404 and the receptacles 500, 502, 504, 506, 508 and 510 of the mounted connector 408 are aligned.

As illustrated in FIGS. 5a, 5b, 5c, 6 and 7, in operation, pin 550 engages the mounted connector 404 within the bushing 455 at the receptacle 444 and the mounted connector 408 within the bushing 513 at the receptacle 502. In operation, pin 551 engages the mounted connector 404 within the bushing 454 at the receptacle 442 and the mounted connector 408 within the bushing 512 at the receptacle 500. In operation, pin 552 engages the mounted connector 404 within the bushing 457 at the receptacle 448 and the mounted connector 408 within the bushing 515 at the receptacle 506. In operation, pin 553 engages the mounted connector 404 within the bushing 456 at the receptacle 446 and the mounted connector 408 within the bushing 514 at the receptacle 504. In operation, pin 554 engages the mounted connector 404 within the bushing 459 at the receptacle 452, the mounted connector 408 within the bushing 517 at the receptacle 510, and with the bushing 705 at one of the receptacles 334 of the printed circuit board 326. In operation, pin 555 engages the mounted connector 404 within the bushing 458 at the receptacle 450, the mounted connector 408 within the bushing 516 at the receptacle 508, and with the bushing 710 within another one of the receptacles 336 of the printed circuit board 326. In this manner, the pins 550–555 provide proper electrical connection from the cabling 110 to the printed circuit board 326 and the geophone element 322.

As illustrated in FIGS. 4a, 4b, 5a, 5b, 5c, 6 and 7, the pins 550–555 mate with the bushings 454–459, 512–517, 705 and 710. The mating relationship between the pins 550–555 and the bushings 454–459, 512–517, 705 and 710 may include a conventional spring-loaded interference fit for commercially available electrical connectors. In a preferred embodiment, the mating relationship between the pins 550–555 and the bushings 454–459, 512–517, and 705 and 710 may include spring-loaded interference fit.

Figure 6:
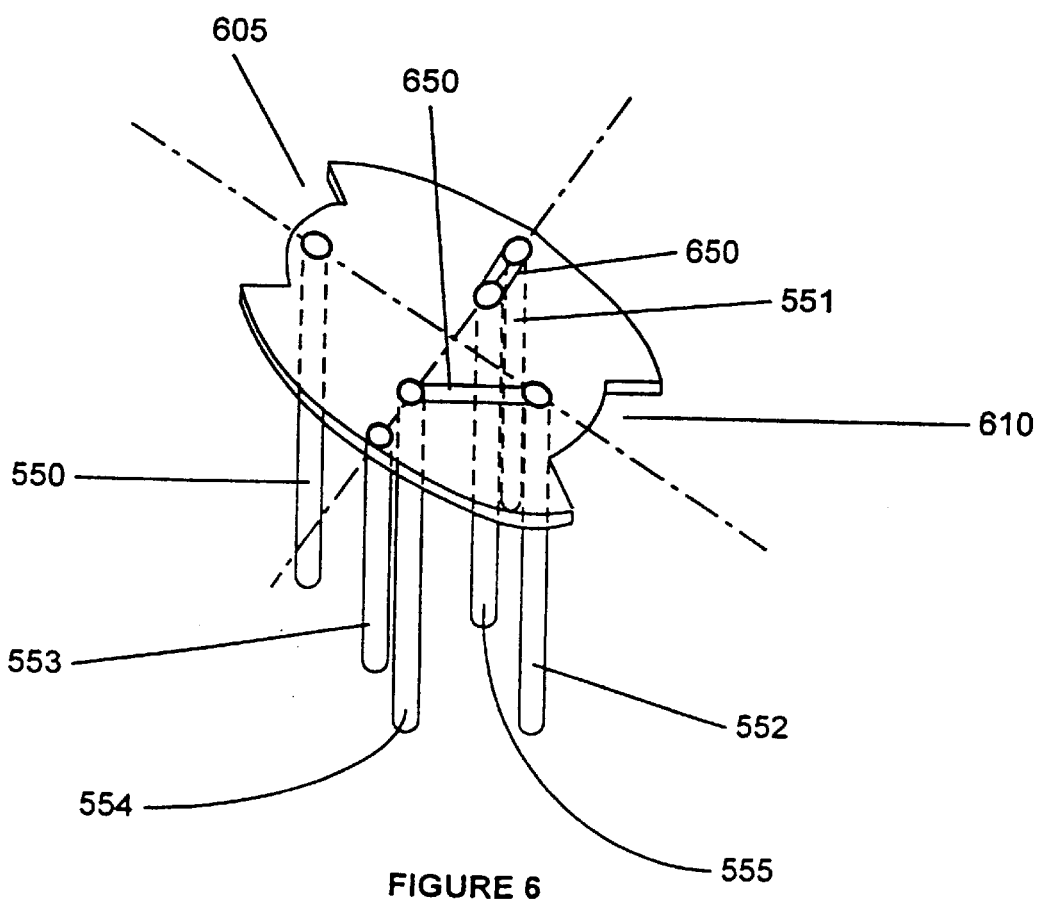
FIG. 6 is a three-dimensional view of a preferred embodiment of the printed circuit board mounted within the cap and pins.
Figure 7:
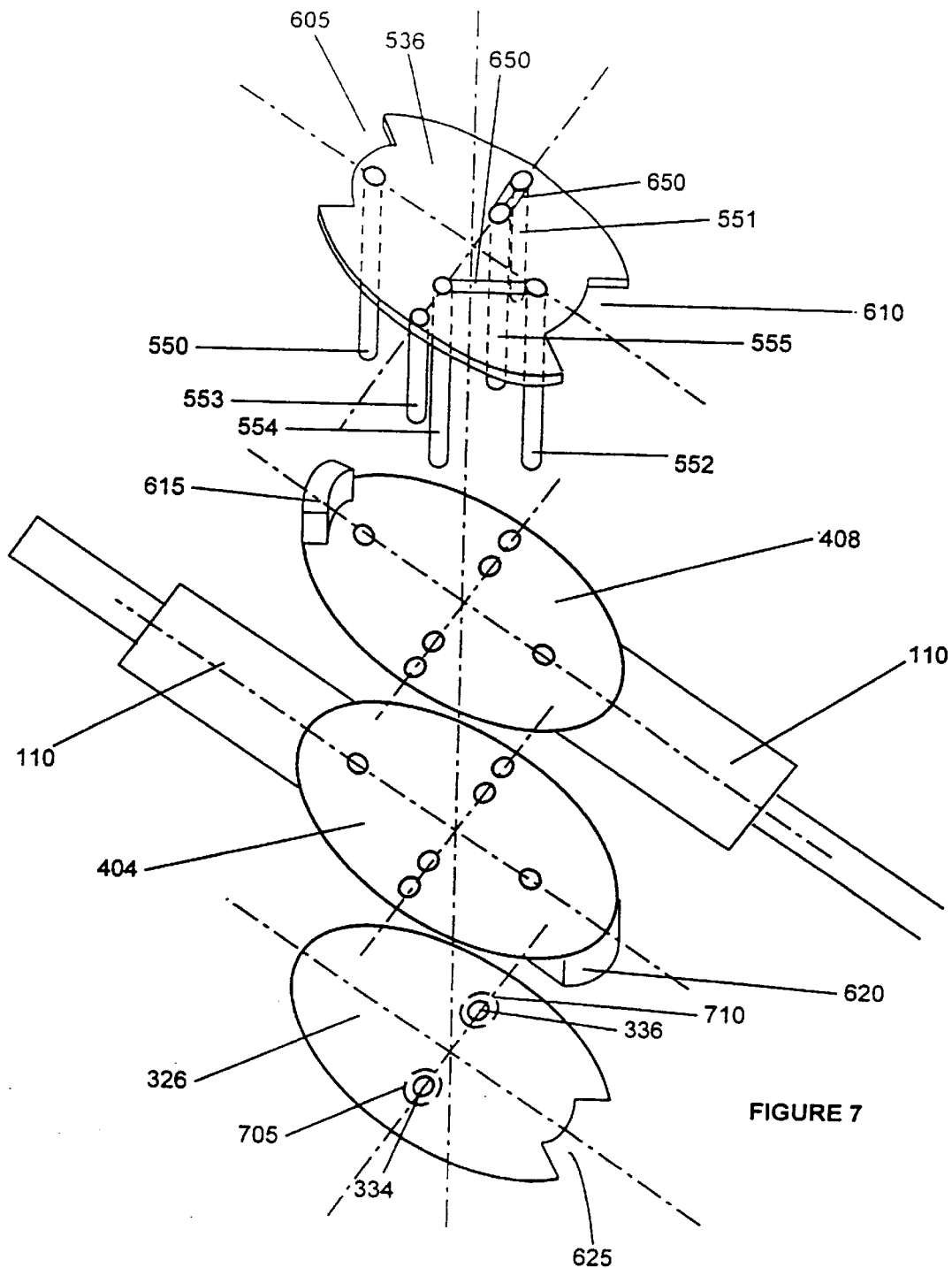
FIG. 7 is an exploded view illustrating the electrical connection of the printed circuit board within the cap, the pins, the mounted connectors, and the circuit board connected with the geophone.

As illustrated in FIGS. 6 and 7, in a particularly preferred embodiment, the printed circuit board 536 includes one or more keying members 605 and 610, the mounted connector 408 includes a keying member 615, the mounted connector 404 includes a keying member 620, and the printed circuit board 326 includes a keying member 625. These keying members ensure proper alignment of the printed circuit board 536, mounted connector 408, mounted connector 404, and the printed circuit board 326. In particular, the interlocking relationship of the keying members 605 and 615 and 620 and 625 ensure proper alignment of the printed circuit board 536, mounted connector 408, mounted connector 404, and the printed circuit board 326.

The keying members 605, 610, 615, 620, and 625 may include any number of conventional commercially available keying members modified in accordance with the teachings of the present disclosure.

In a particularly preferred embodiment, the molded housing 534 of the cap 204 includes one or more keying members (not illustrated) that interact with the keying members 605 and 610 of the printed circuit board 536. In a particularly preferred embodiment, the hollow body 202 includes one or more keying members (not illustrated) that interact with the keying member 625 of the printed circuit board 326.

Persons of ordinary skill in the art having the benefit of the present disclosure will recognize that any number or type of keying members may be utilized without departing from the teachings of the present disclosure.

As illustrated in FIGS. 6 and 7, in a particularly preferred embodiment, the printed circuit board includes one or more signal traces 650 that permit the electrical connection of the geophones 105 to be adjusted to parallel or serial depending upon the orientation of the cap 204 upon insertion. In this manner, the operator may program the operation of the geophone system 100 to two different modes of operations. In alternative embodiments, additional programing capabilities may be added by adjusting the arrangement of the pins and the receptacles of the connectors to permit more that two possible programing positions.

In the assembled geophone 105, the O-ring 402 is positioned between the ridge 330 of the hollow body 202 and the O-ring groove 434 of the connector 404 with the printed circuit board 326 contained within the cavity 432 of the connector 404. In the assembled geophone 105, the box-shaped section 418 of the connector 404 is positioned within the groove 328 of the hollow body 202. In the assembled geophone 105, the O-ring 406 is positioned between the O-ring groove 466 of the connector 404 and the O-ring groove 490 of the connector 408. In the assembled geophone 105, the box-shaped section 476 of the connector 408 is positioned within the other groove 328 of the hollow body 202. In the assembled geophone 105, the O-ring 410 is positioned between the O-ring groove 528 of the connector 408 and the O-ring groove 544 of the cap 204. In the assembled geophone 105, the chamfered edge 524 of the connector 408 guides the molded housing 534 of the cap 204 onto the mounted connector 408 with the chamfered edge 524 sliding into the inner groove 546. In the assembled geophone 105, the middle area 548 also mates with the cavity 526, the bottom surface 542 of the cap 204 contacts the top surface 332 of the hollow body 202. Thus, the O-rings 402, 406 and 410 and the interlocking mating relationship of the hollow body 202, connectors 404 and 408, and cap 204 provide a watertight enclosure providing protection to the internal components. The cap 204 may be removably coupled to the hollow body 202 using any number of conventional methods for removably connecting two members. In a preferred embodiment, the cap 204 is removably coupled to the hollow body 202 substantially as illustrated and described below in FIGS. 12a, 12b and 12c.

In an alternative embodiment, all or some of the cable connectors could be stacked on the same side of the hollow body 202. In another alternative embodiment, one or more cable connectors could be mounted within the hollow body 202. In still other alternative embodiments, the cable connectors can be equally or unequally spaced about the axial plane of the upper section 306 of the hollow body 202.

Figure 8:
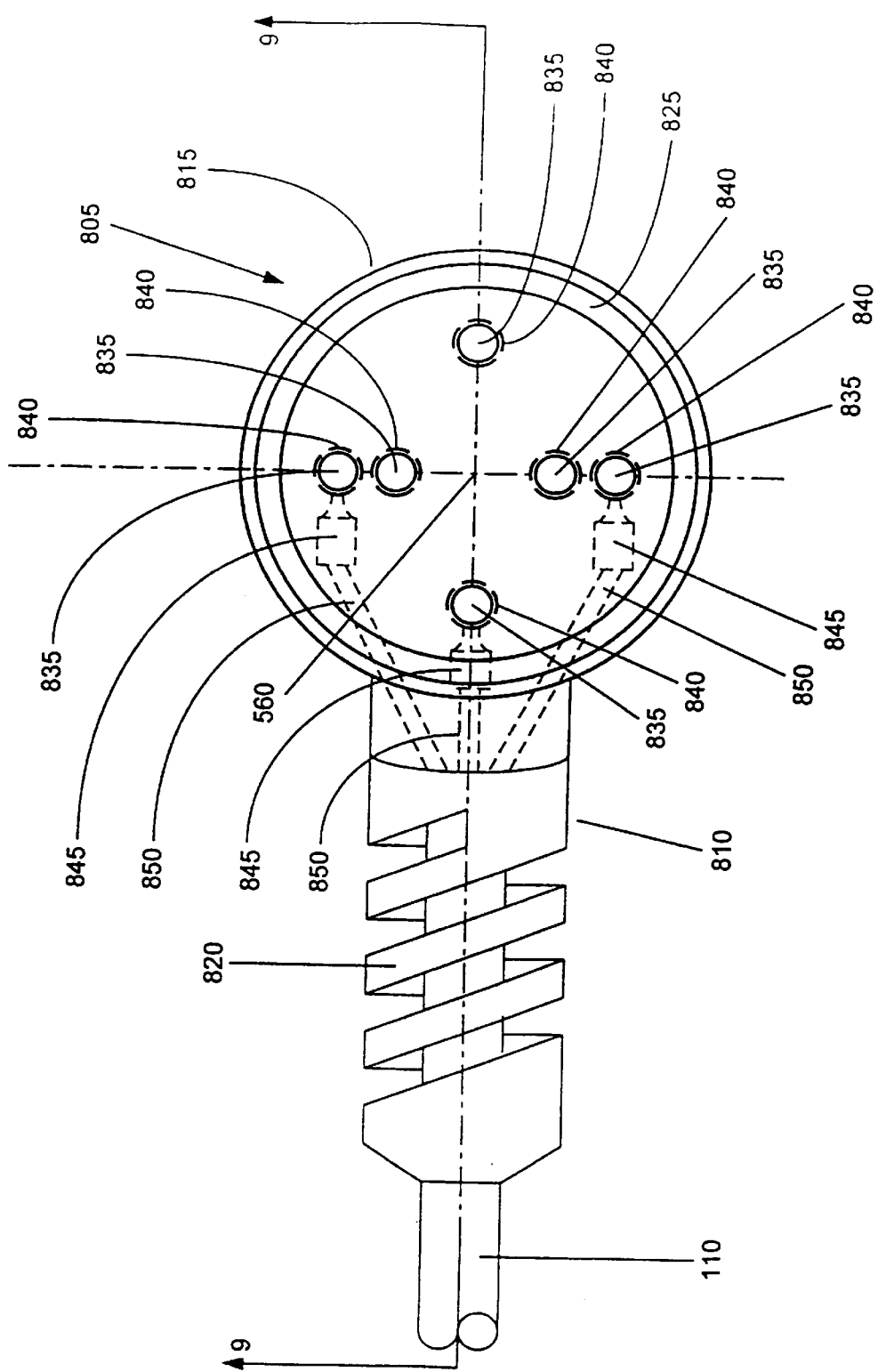
FIG. 8 is a top view of an alternative embodiment of a mounted connector.

Referring to FIGS. 8, 9a and 9b, an alternative embodiment of a mounted connector 805 will now be described. The connector 805 includes a box-shaped member 810 and a disk-shaped member 815.

The box-shaped member 810 includes a resilient spiral wrapping 820 that maintains the radius of curvature of the cabling 110 within acceptable predetermined limits. The resilient spiral wrapping 820 may include any number of commercially available resilient spiral wrappings.

The disk-shaped member 815 includes an upper O-ring groove 825 located on an upper surface 826, a lower O-ring groove 830 located on a lower surface 831, a plurality of receptacles 835, a plurality of bushings 840, crimp fittings 845, and conductors 850. The upper surface 826 and the lower surface 831 are substantially parallel. The design, construction and arrangement of the receptacles 835, bushings 840, crimp fittings 845, and conductors 850 of the mounted connector 805 is substantially identical to that of the mounted connectors 404 and 408. The principal differences in the design and construction of the mounted connector 805 versus the mounted connectors 404 and 408 is the use of the spiral wrapping 820 and the shape of the disk member 815.

In particular, as illustrated in FIG. 9b, the shape of the disk member 815 of the mounted connector 805 permits a plurality of such connectors to be stacked, separated by O-rings 905, in a plurality of orientations with adjustment in the pattern of the receptacles 835.

In alternative embodiments of the connector 805, spring loaded contacts may be provided instead of feed through holes. Such contacts are preferably self-cleaning contacts.

Figure 10:
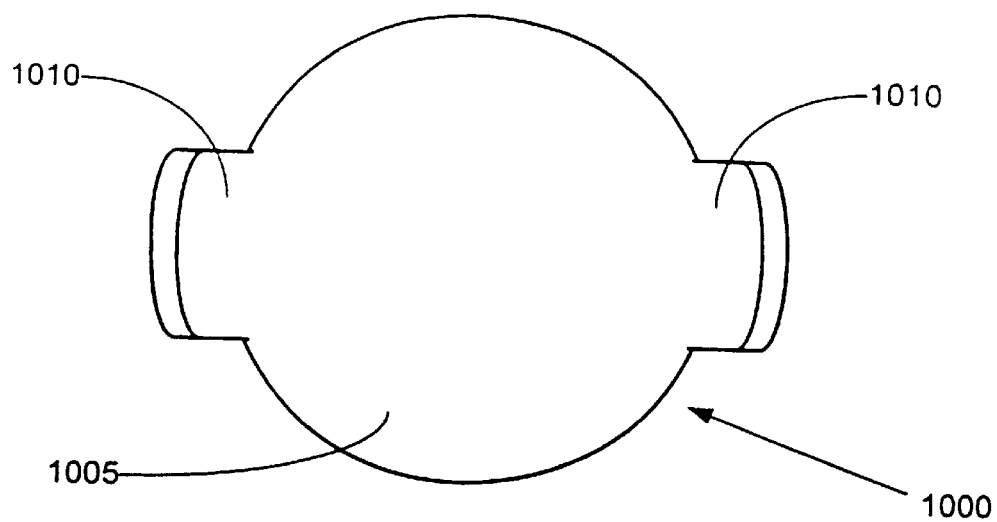
FIG. 10 is a top view of an alternative embodiment of the cap.
Figure 11:
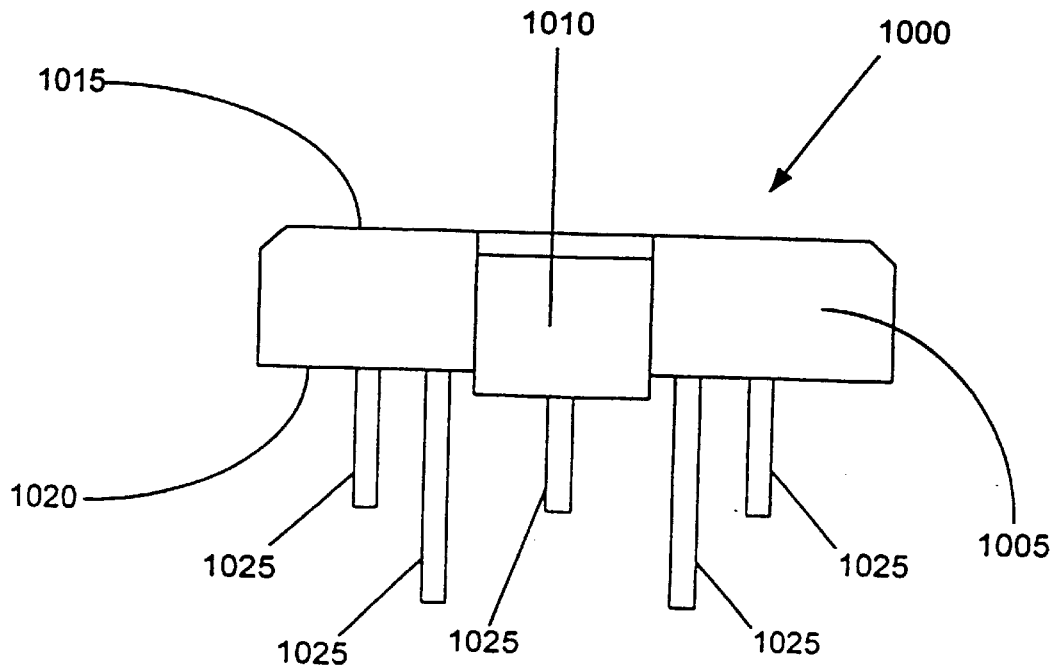
FIG. 11 is a side view of the cap of FIG. 10.

Referring to FIGS. 10 and 11, a preferred embodiment of a cap 1000 will be described. The cap 1000 includes a main body 1005, a number of extensions 1010 that extend in a radial direction outward from the main body 1005, a top surface 1015, a bottom surface 1020, and pins 1025. In a particularly preferred embodiment, the extensions 1010 are positioned over the cabling 110 in the assembled geophone 105 to provide support to the cabling 110.

Figures 12A, 12B, 12C:
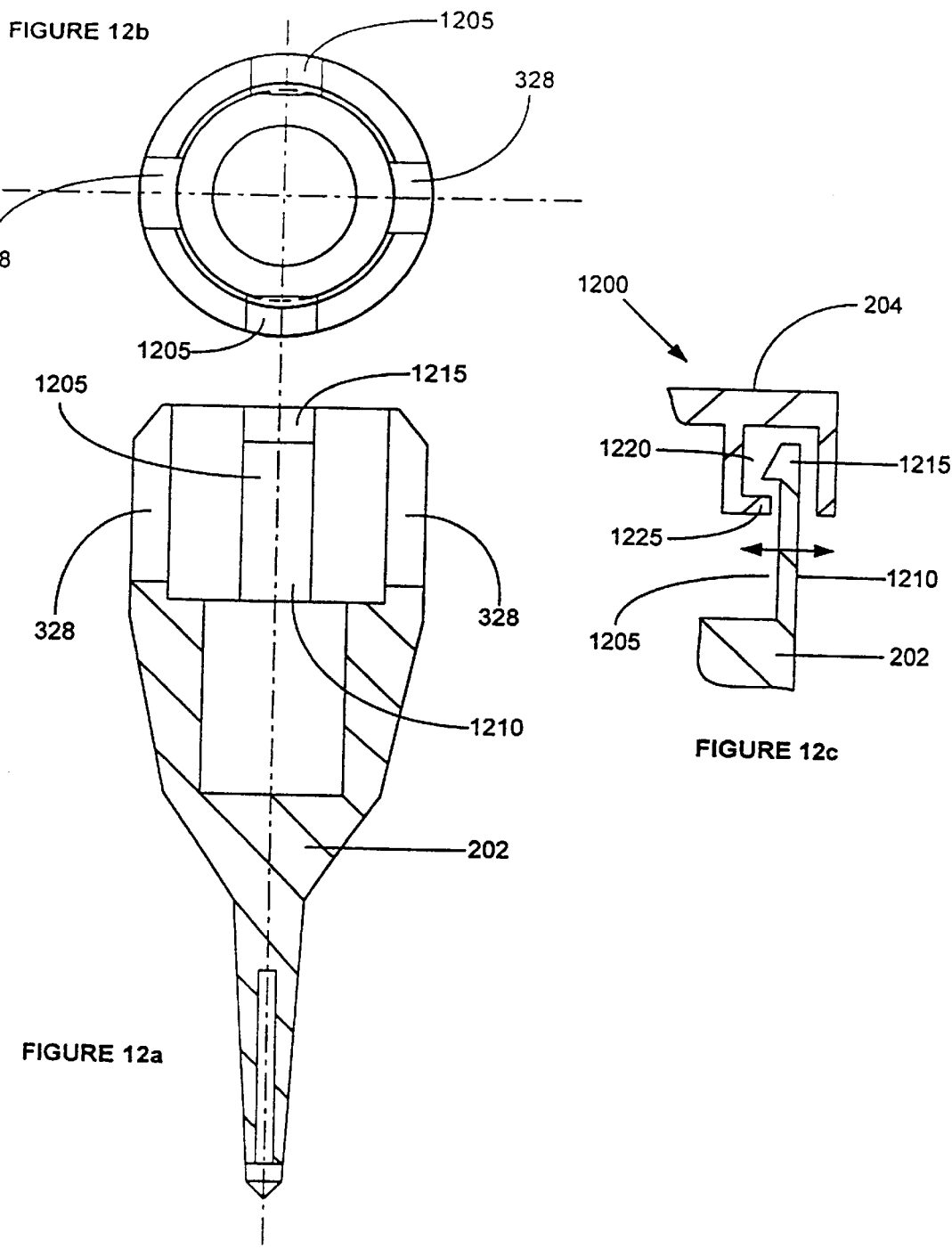
Figure 14A:
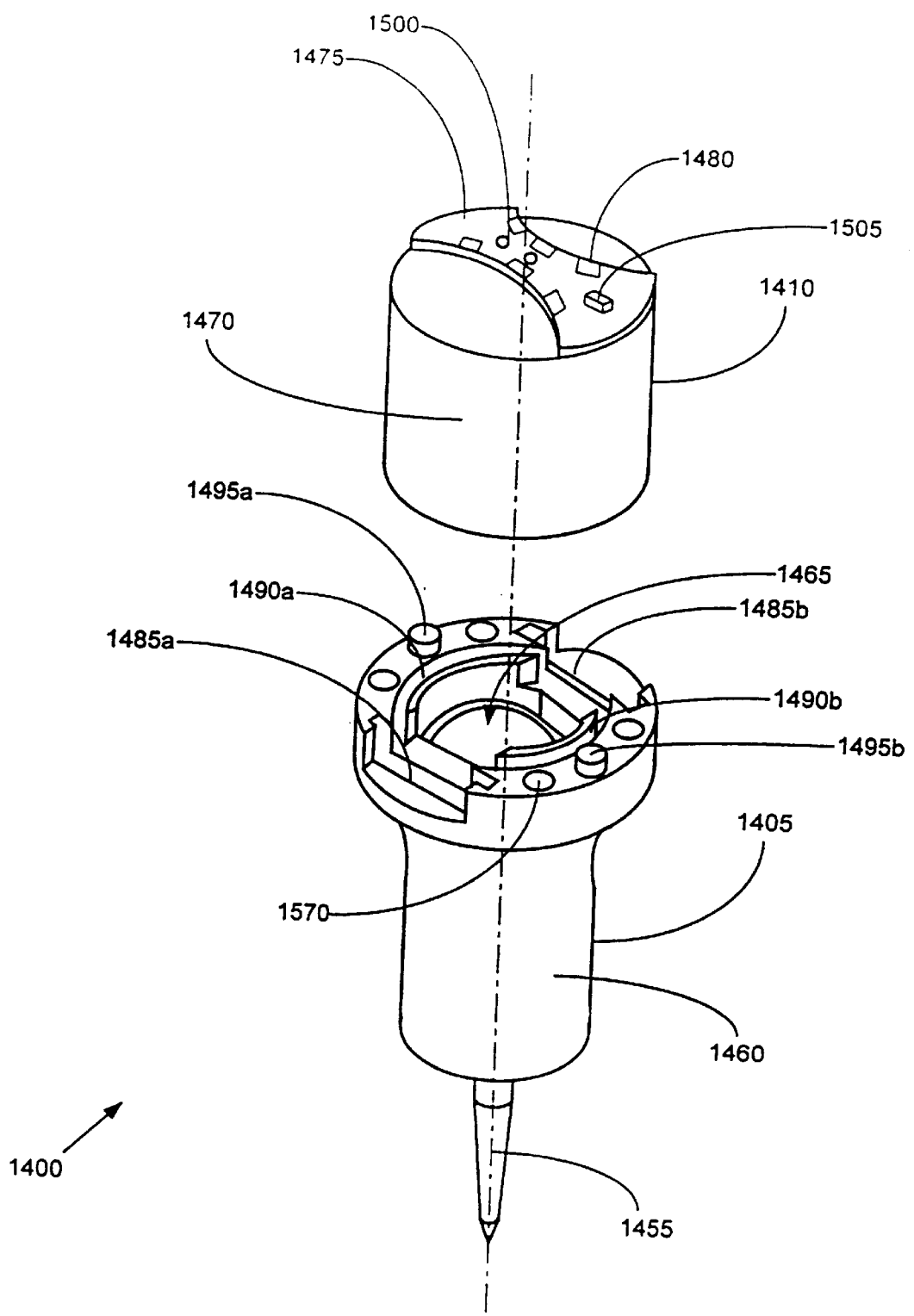
FIG. 14a is an exploded view of a portion of a preferred embodiment of a geophone with mounted connectors.
Figure 14B:
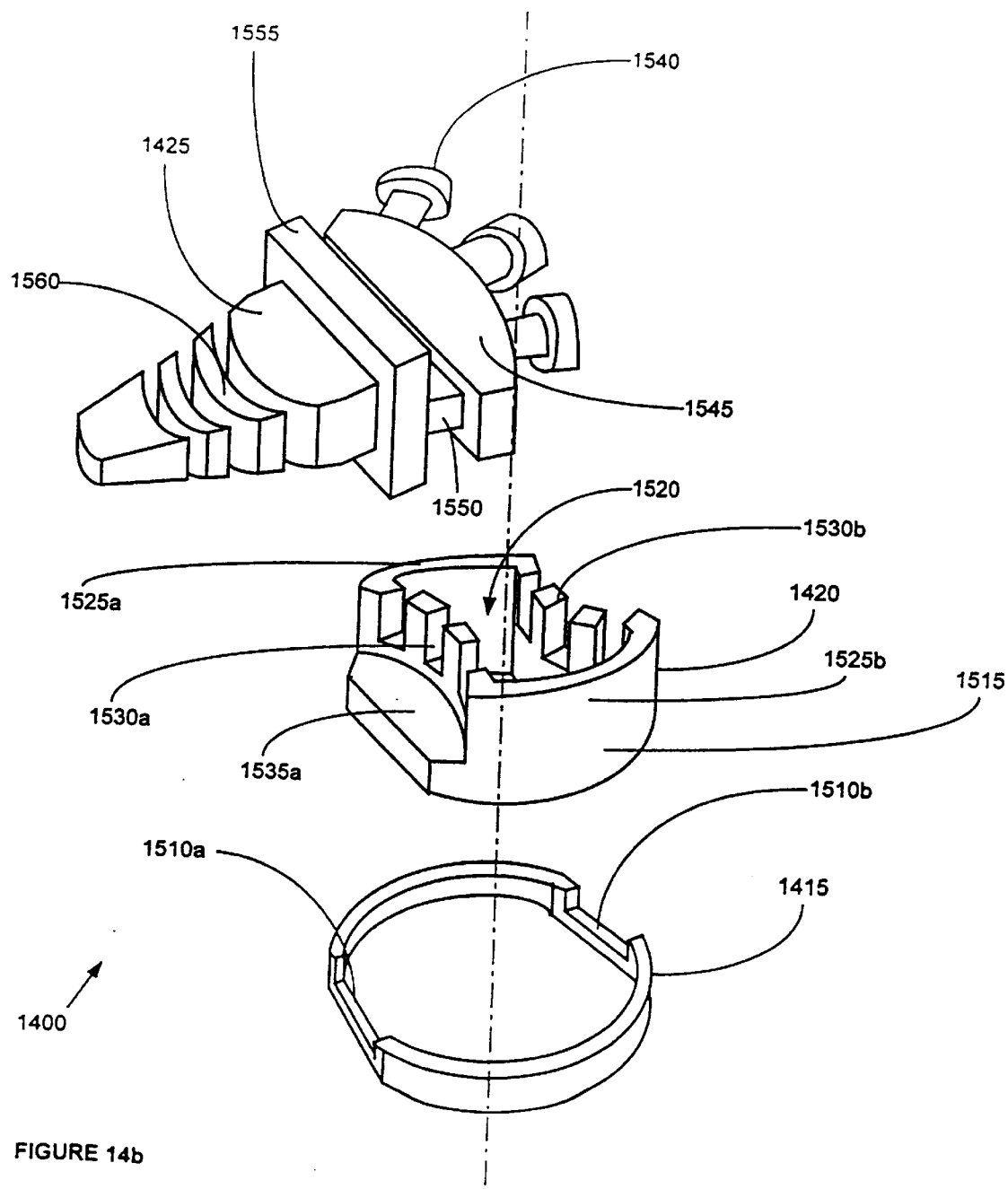
Figure 14C:
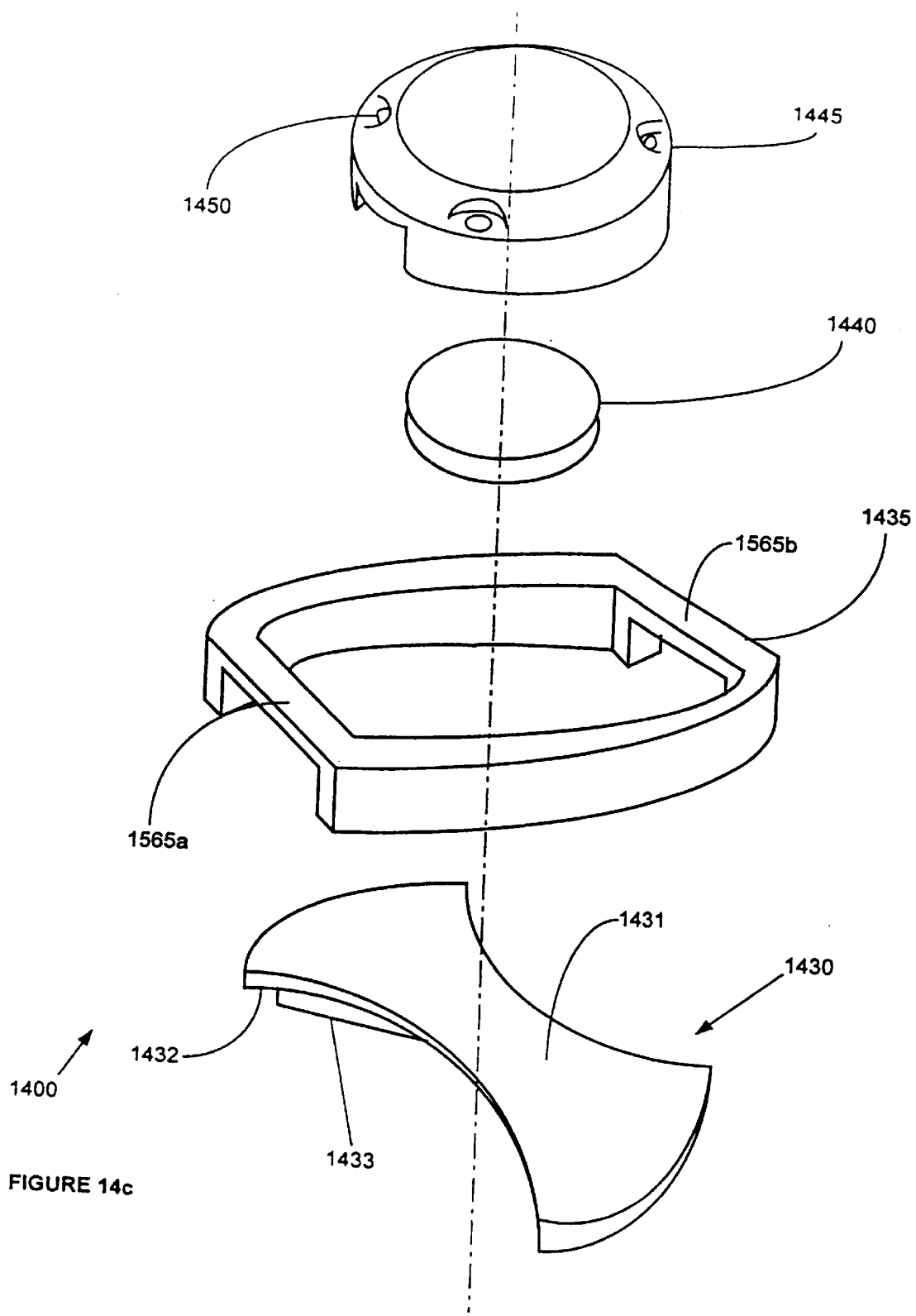
Figure 15:
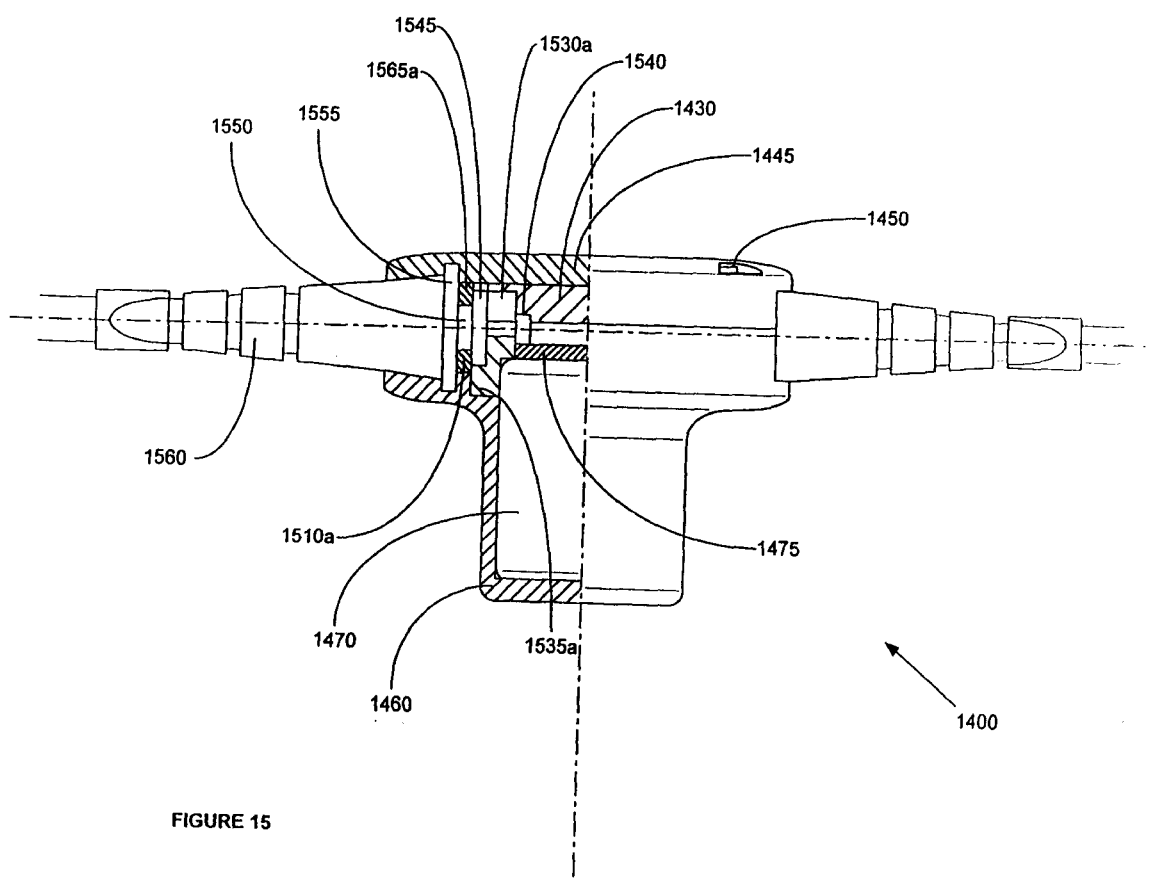
FIG. 15 is partial cross-sectional view of the geophone with mounted connectors of FIGS. 14a, 14b and 14c.
Figure 16A:
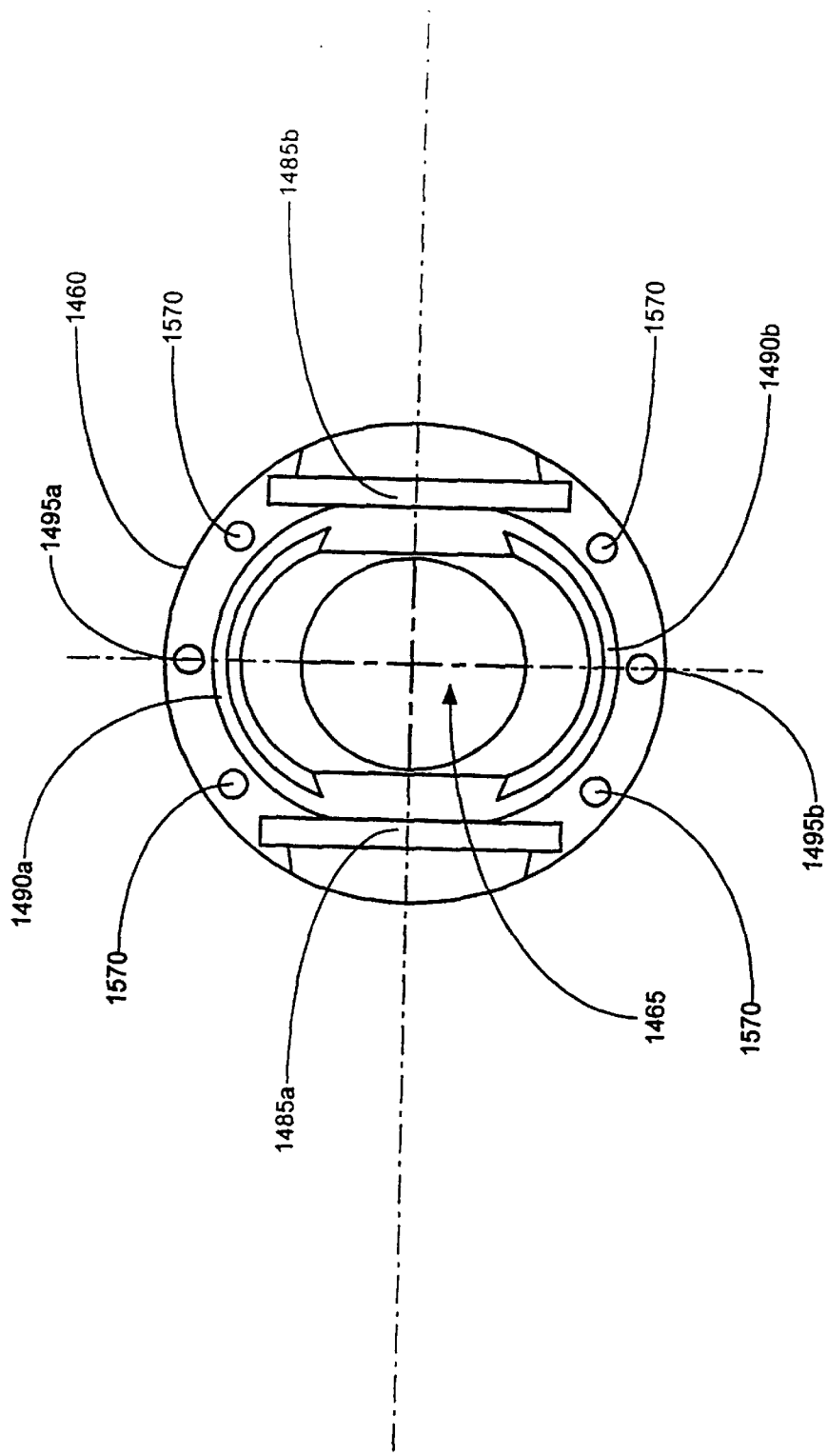
FIG. 16a is a top view of the geophone housing for the geophone of FIG. 15.
Figure 16B:
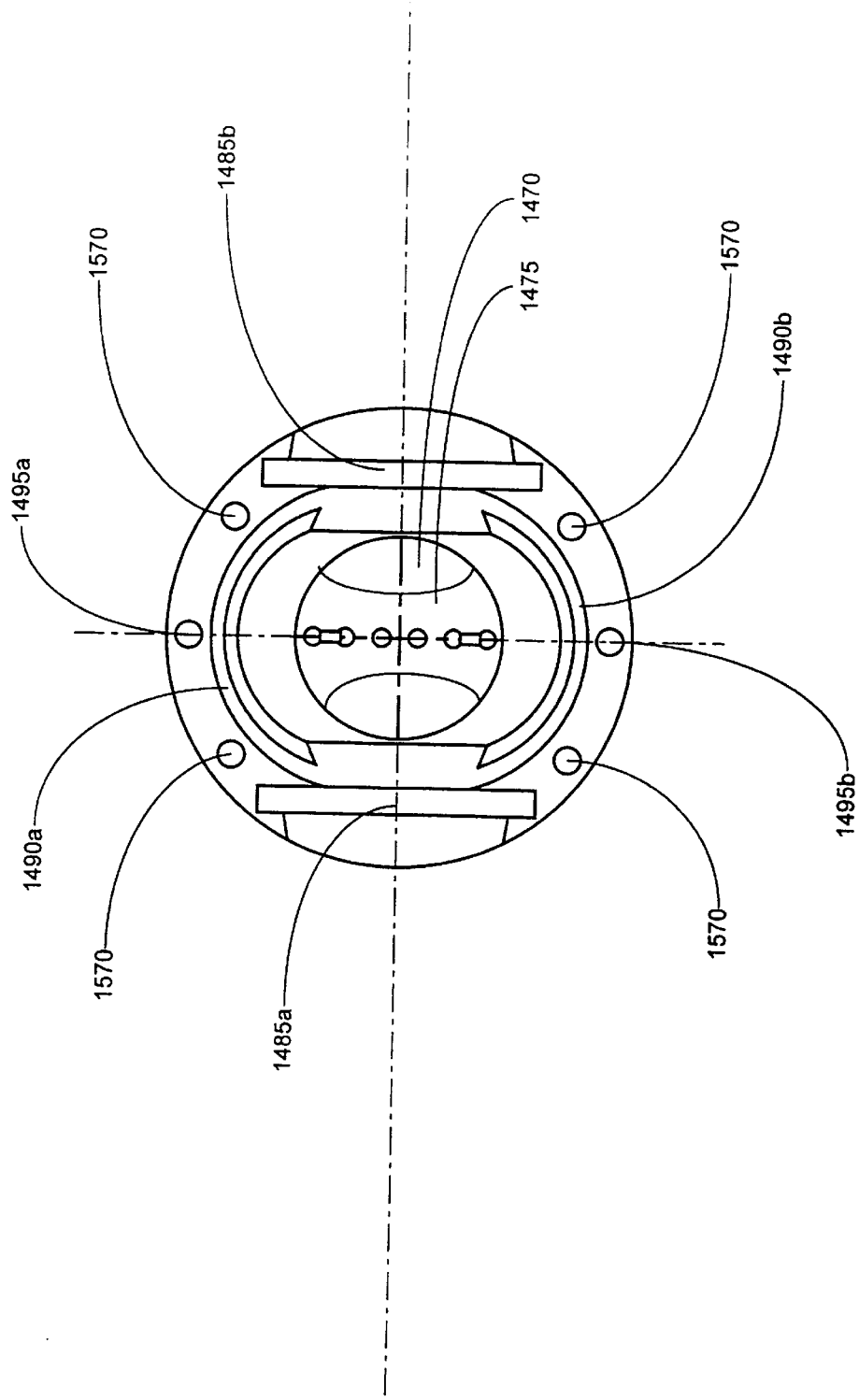
FIG. 16b is a top view of the geophone housing of FIG. 16a with a geophone assembled into the geophone housing.
Figure 16C:
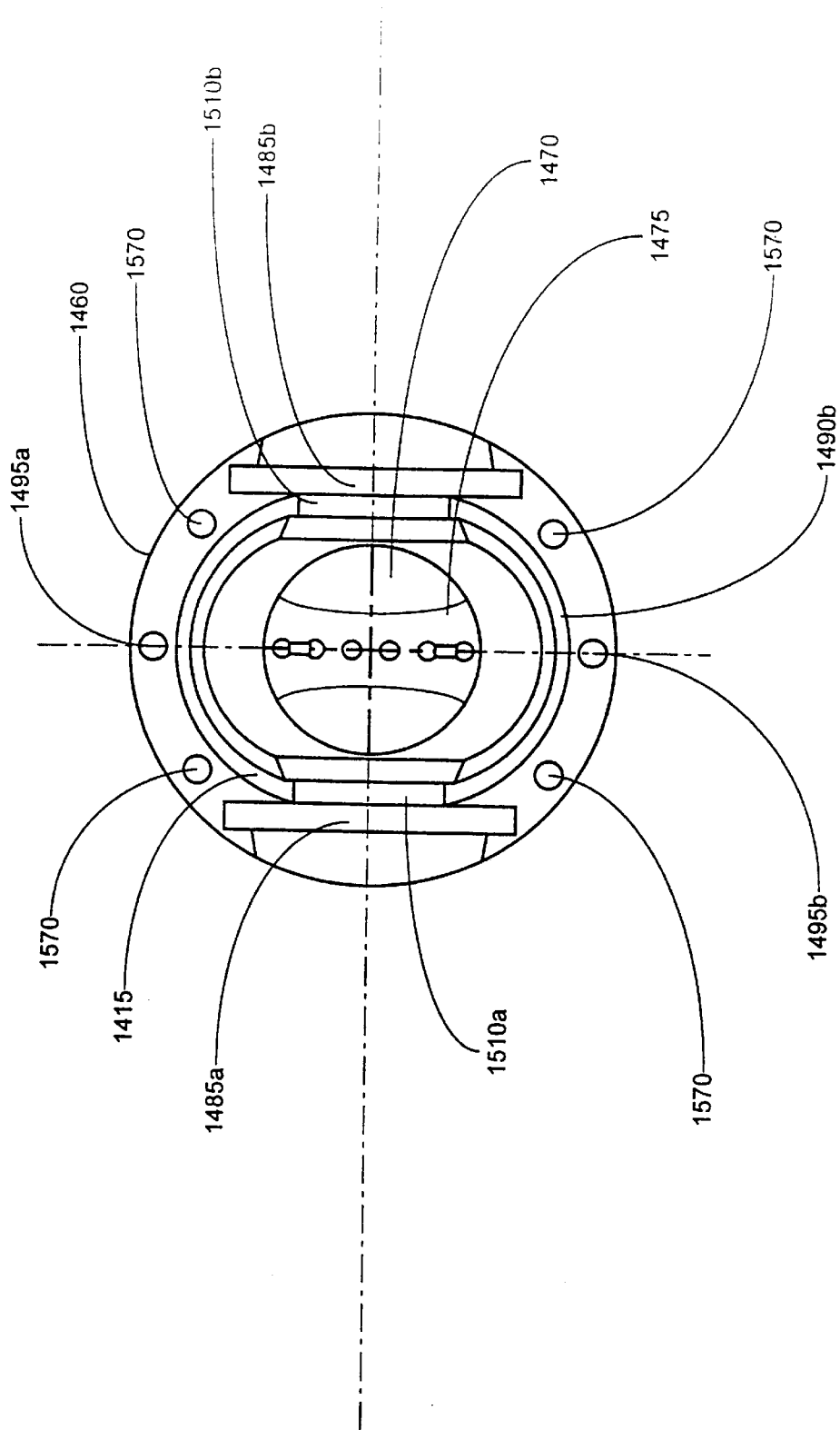
FIG. 16c is a top view of the geophone housing of FIG. 16a including the assembly of a geophone and a lower gasket into the geophone housing.
Figure 16D:
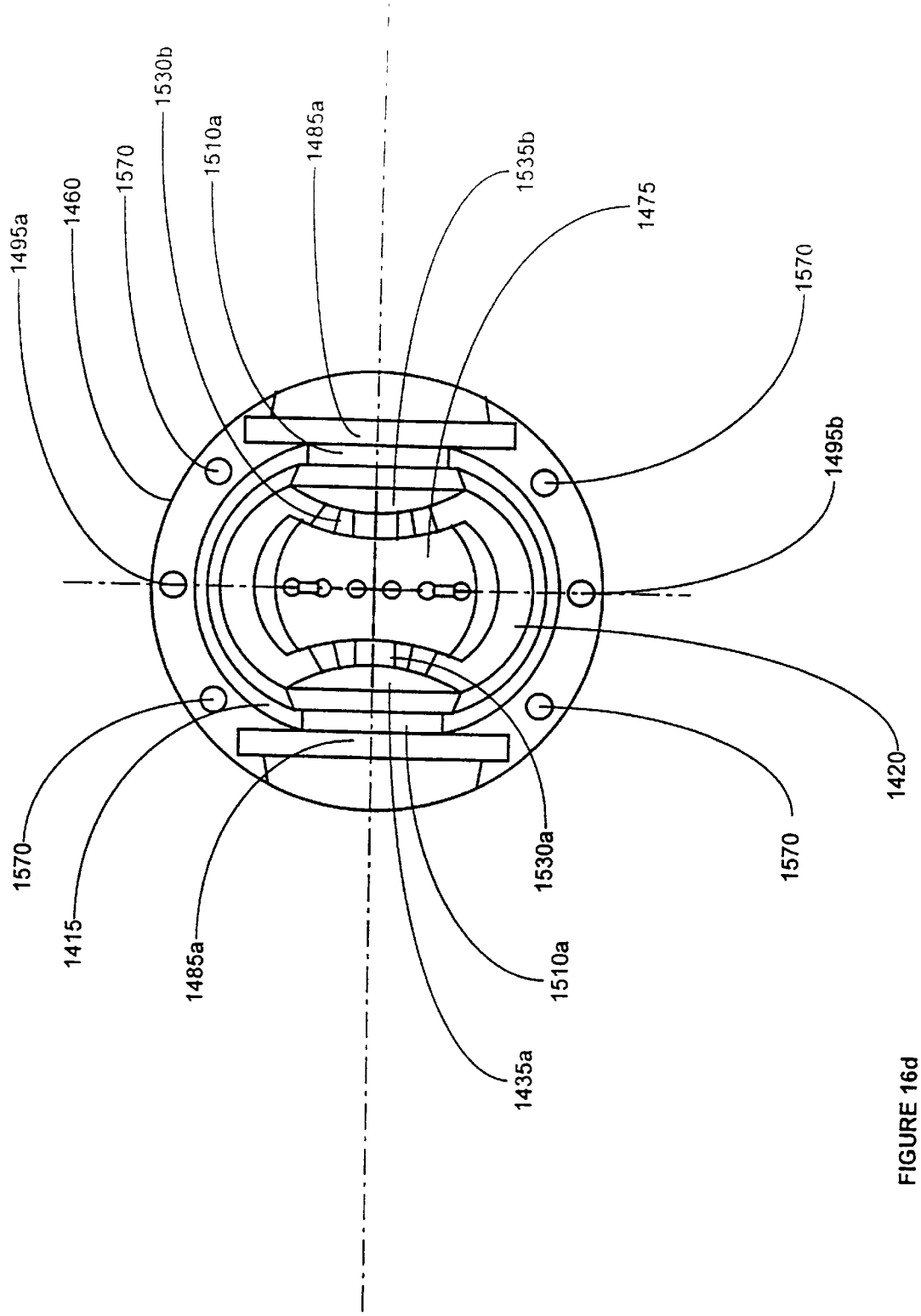
FIG. 16d is a top view of the geophone housing of FIG. 16a including the assembly of a geophone, a lower gasket, and a bridge into the geophone housing.
Figure 16E:
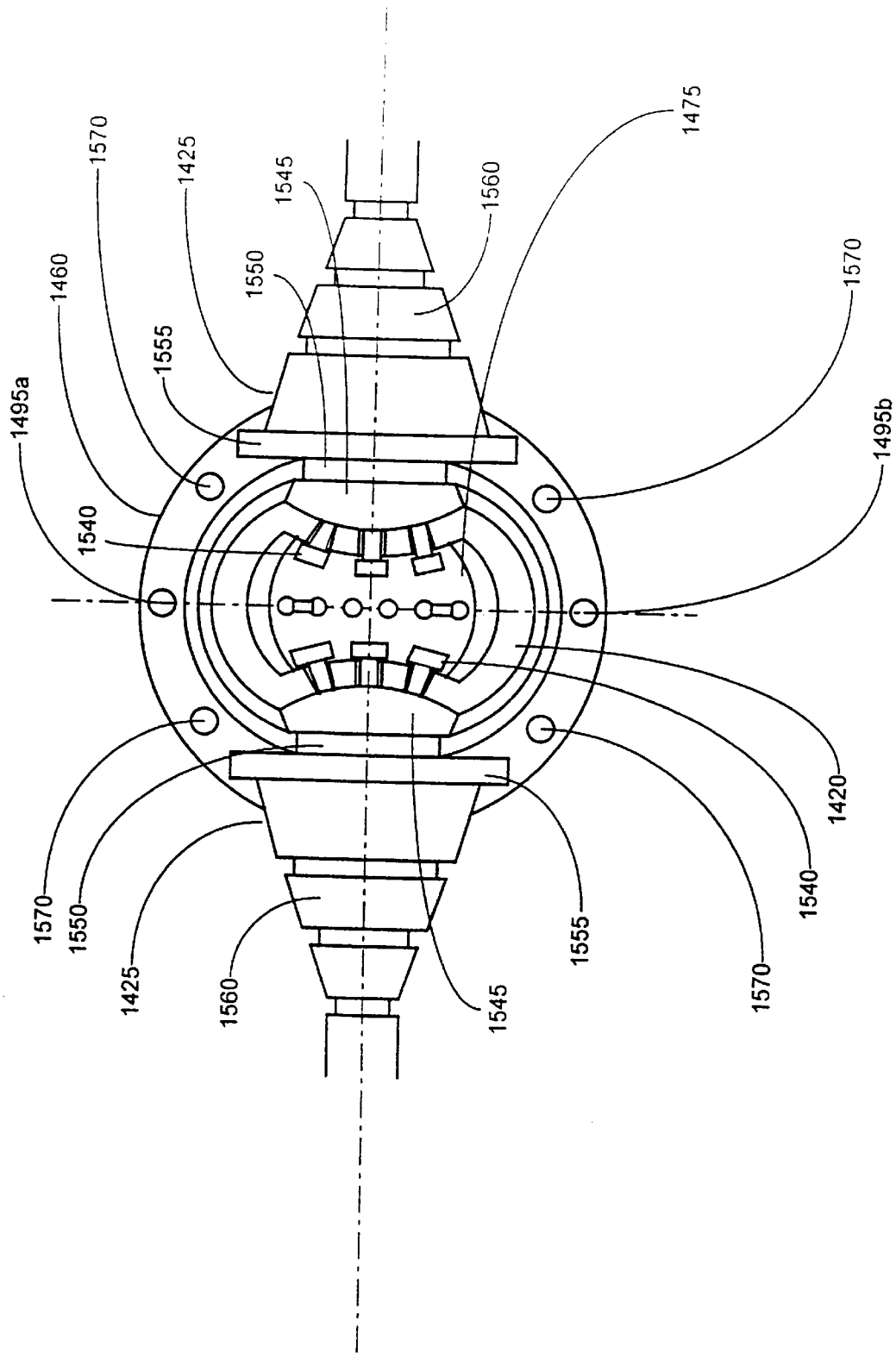
FIG. 16e is a top view of the geophone housing of FIG. 16a including the assembly of a geophone, a lower gasket, a bridge, and a pair of cables into the geophone housing.
Figure 16F:
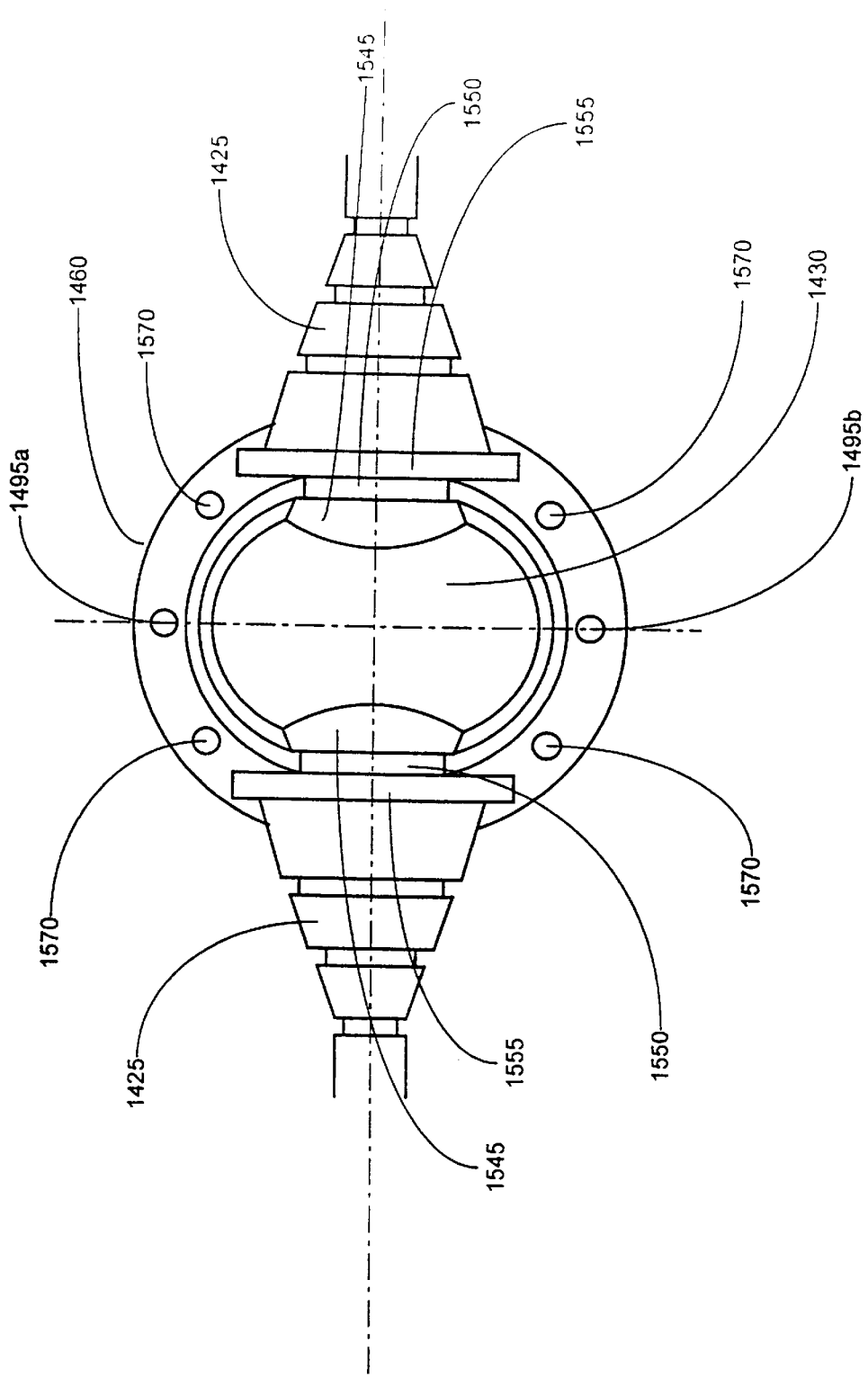
FIG. 16f is a top view of the geophone housing of FIG. 16a including the assembly of a geophone, a lower gasket, a bridge, a pair of cables, and a rubber seal into the geophone housing.
Figure 16G:
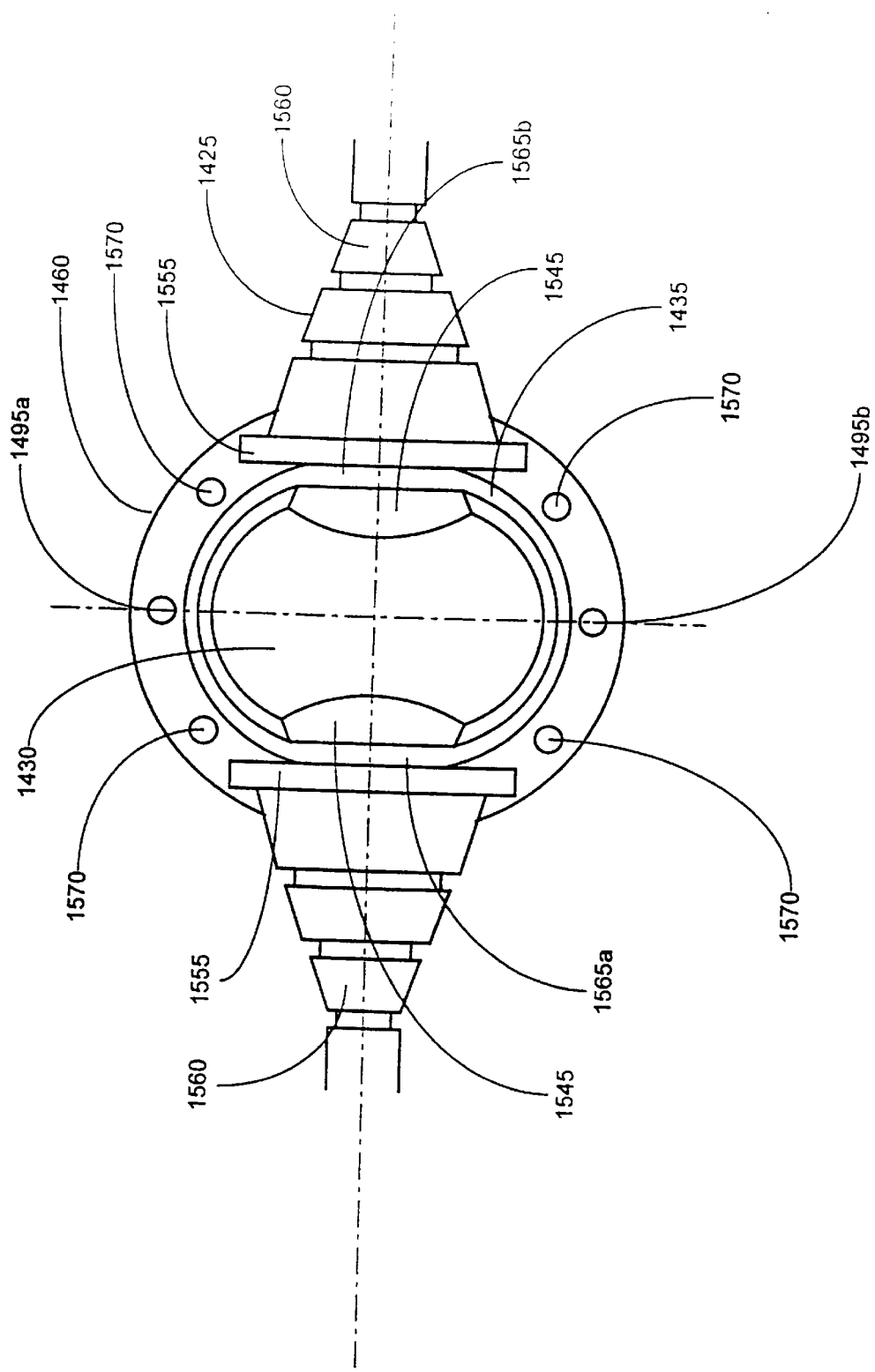
FIG. 16g is a top view of the geophone housing of FIG. 16a including the assembly of a geophone, a lower gasket, a bridge, a pair of cables, a rubber seal, and an upper gasket into the geophone housing.
Figure 16H:
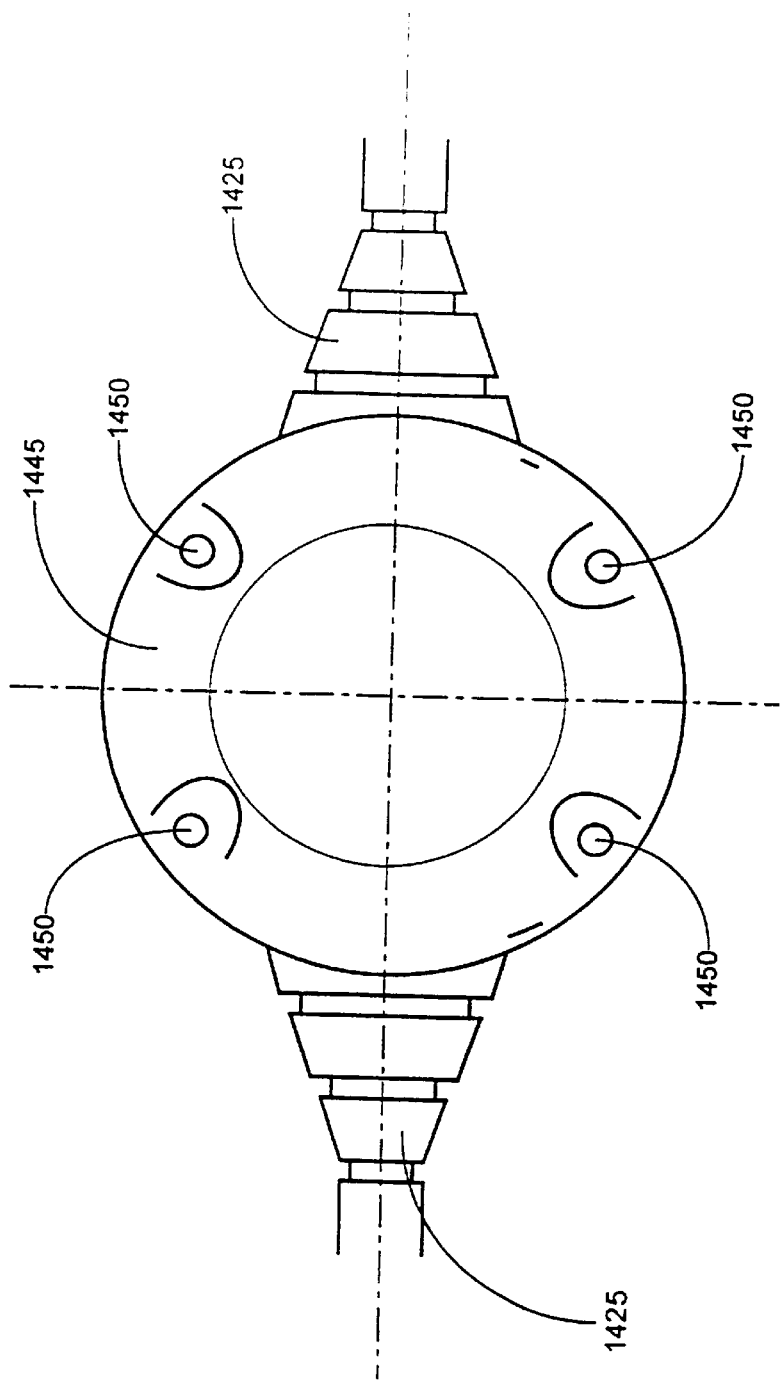
FIG. 16h is a top view of the geophone housing of FIG. 16a including the assembly of a geophone, a lower gasket, a bridge, a pair of cables, a rubber seal, an upper gasket, and a cover into the geophone housing.
Figure 17A:
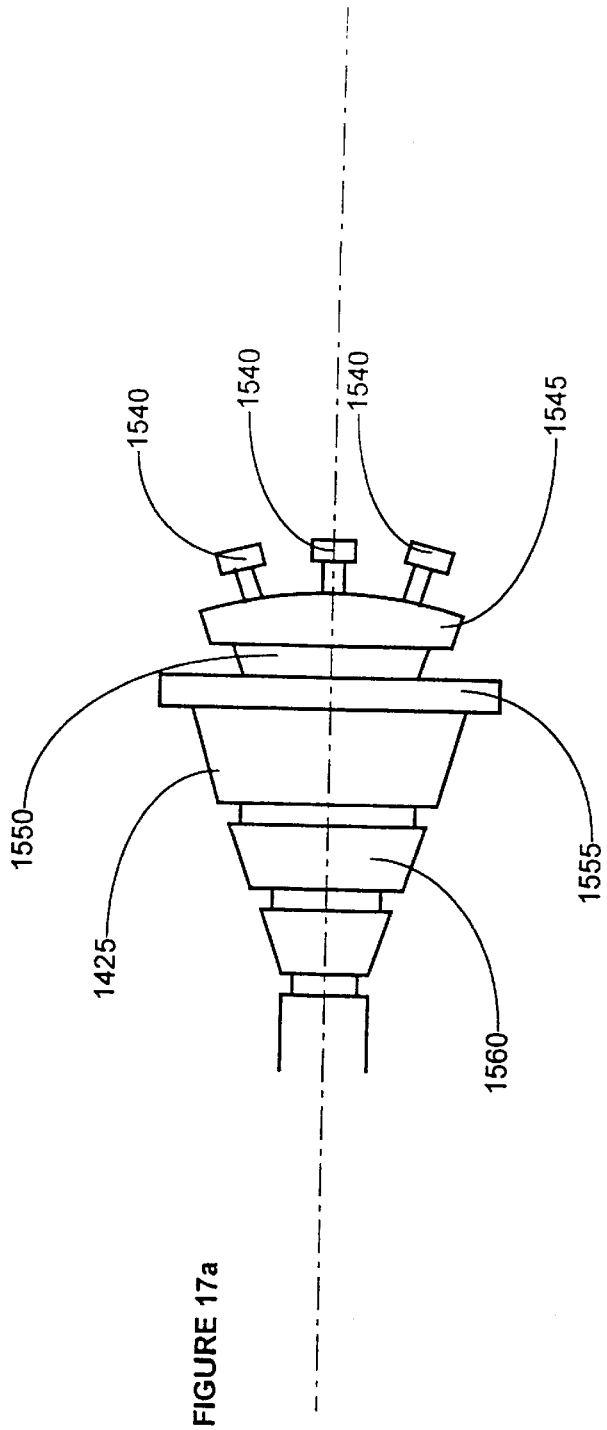
FIG. 17a is a top view of a preferred embodiment of a cable.
Figure 17B:
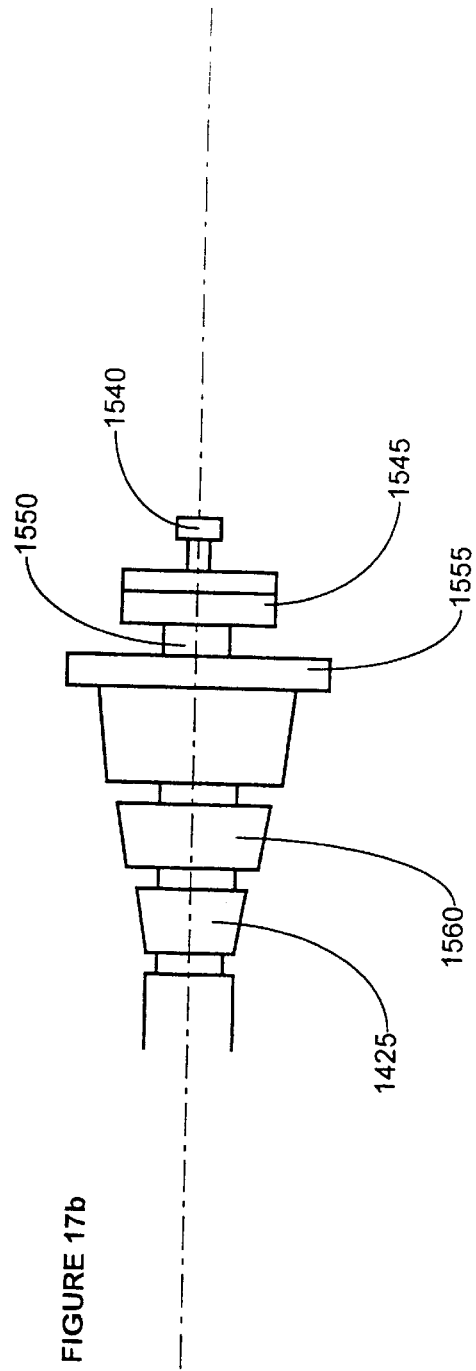
FIG. 17b is a side view of a preferred embodiment of a cable.

Referring to FIGS. 12a, 12b, and 12c, a preferred embodiment of a locking mechanism 1200 for locking the cap 204 onto the hollow body 202 will now be described. The locking mechanism 1200 includes one or more locking fingers 1205 that interlock with the cap 204. The locking fingers 1205 include a base section 1210 and a hook 1215. The base section 1210 is resiliently pivotally mounted to the hollow body 202 within the upper region 306. The hook 1215 interlocks with the cap 204 by locking on a recess 1220 provided within the cap 204. The cap 204 is locked onto the hollow body 202 by moving the cap 204 in an axial direction toward and relative to the hollow body 202. During assembly, the rim 1225 of the recess 1220 of the cap 204 forces the hook 1215 to pivot inwardly in a radial direction. Once the hook 1215 clears the rim 1225 of the recess 1220 of the cap 204, the hook 1215 pivots outwardly in a radial direction into the recess 1220.

Referring to FIGS. 13a, 13b, 13c and 13d, in an alternative preferred embodiment, the locking mechanism 1300 includes one or more locking fingers 1302 that interlock with the cap 204 by using a locking ring 1304. Each of the locking fingers 1302 extend in a longitudinal direction from the hollow body 202 and include a resilient base 1306 and a hook 1308. The cap 204 is modified to include a plurality of cavities 1310 having corresponding apertures 1312. During assembly of the geophone 105, the cavities 1310 receive the hooks 1308. The locking ring 1304 includes a resilient body 1314 and a plurality of locking members 1316. During assembly, the locking ring 1304 is placed onto the cap 204 to secure the cap 204 to the hollow body 202. In particular, the locking members 1316 are inserted into corresponding apertures 1312 of the cap 204 to lock the locking fingers 1302 into the cavities 1310. The locking ring 1304 may be fabricated by modifying any number of commercially available locking rings modified in accordance with the teachings of the present disclosure.

Referring to FIGS. 14a, 14b, 14c, 15, 16a, 16b, 16c, 16d, 16e, 16f, 16g, 16h, 17a, 17b, 18, and 18a a preferred embodiment of a geophone with mounted connectors 1400 will now be described. The geophone 1400 preferably includes a housing 1405, a geophone sensor 1410, a lower gasket 1415, a bridge 1420, one or more cables 1425, a rubber seal 1430, an upper gasket 1435, a tag 1440, a cover 1445, and screws 1450.

The housing 1405 preferably includes a metal spike 1455 and a body 1460 including an interior chamber 1465. The interior chamber 1465 of the housing 1405 is preferably adapted to receive and mate with the geophone sensor 1410, a lower gasket 1415, a bridge 1420, one or more cables 1425, a contact pressure rubber seal 1430, and upper gasket 1435. In this manner, the geophone sensor 1410 is preferably operably coupled to the metal spike 1455 to sense seismic energy.

The body 1460 preferably is fabricated from a high strength electrically insulative material.

The body 1460 of the housing 1405 preferably includes cable slots 1485a and 1485b, sealing slots 1490a and 1490b, and keying members 1495a and 1495b. The cable slots, 1485a and 1485b, are preferably adapted to mate with a corresponding cable 1425. The sealing slots 1490a and 1490b are preferably adapted to mate with the lower gasket 1415, the bridge 1420, the contact pressure rubber seal 1430, and the upper gasket 1435. In this manner, the electrical connection of the cables 1425 to the circuit board 1475 is preferably water-tight and protected from contamination. The body 1460 of the housing 1405 further preferably includes several screw holes 1570 for receiving threaded fasteners.

The geophone sensor 1410 preferably includes a sensor 1470 and a circuit board 1475. The circuit board 1475 is preferably operably coupled to the sensor 1470. The circuit board 1475 is further preferably adapted to couple with one or more cables 1425. In a preferred embodiment, the circuit board 1475 includes electrical contacts 1480 for coupling to the cables 1425. In a preferred embodiment, the circuit board 1475 further includes one or more operational keying member 1500 that can be programmed using a surface mount resistor 1505, or other similar device. In this manner, the operational features of the geophone 1400 can be selected and programmed. The circuit board 1475 preferably has a circular shape having a pair of opposing circular cut-outs. In this manner, the circuit board 1475 preferably mates with the bridge 1420. The sensor 1470 preferably includes a conventional geophone sensing element adapted to couple with the circuit board 1475.

The lower gasket 1415 preferably mates with and is supported within the sealing slots 1490a and 1490b of the body 1460 of the housing 1405. The lower gasket 1415 further includes cable sealing members 1510a and 1510b that preferably mate with the cables 1425. In this manner, the interface between the cables 1425 and the body 1460 of the housing 1405 is sealed.

The lower gasket 1415 is preferably fabricated from an electrically insulative material such as, for example, natural or synthetic rubber.

The bridge 1420 preferably includes a body 1515 having interior chamber 1520, exterior walls 1525a and 1525b, cable termination supports 1530a and 1530b, and cable rests 1535a and 1535b. The interior chamber 1520 is preferably adapted to mate with the circuit board 1475. The exterior walls 1525a and 1525b are preferably adapted to mate with the interior surfaces of the walls of the sealing slots 1490a and 1490b. In this manner, the bridge 1420 preferably is positioned within the walls of the body 1460 of the housing 1405 that define the sealing slots 1490a and 1490b. The cable termination support 1530a and 1530b are preferably adapted to mate with the exterior surfaces of the cables 1425, and the cable termination supports 1530a and 1530b further preferably include one or more slots for receiving and supporting a corresponding cable termination. In this manner, the cable termination supports 1530a and 1530b provide support for and define the position of the terminations of the cables 1425. In a preferred embodiment, the slots of the cable termination supports 1530a and 1530b align the terminations of the cables 1425 with the corresponding electrical contacts 1480 provided on the circuit board 1475. The cable rests 1535a and 1535b are preferably adapted to receive, support and mate with the cables 1425.

The bridge 1420 is preferably fabricated from a rigid electrically insulative material such as, for example, plastic, ceramic or composite materials.

The cable 1425 preferably includes a number of cable terminations 1540, a first cable housing 1545, a second cable housing 1550, a third cable housing 1555, and a fourth cable housing 1560. The cable terminations 1540 are preferably adapted to mate with the slots in the cable termination supports 1530a and 1530b of the bridge 1420. In a preferred embodiment, the cable terminations 1540 provide electrical contacts for the cable 1425. In a preferred embodiment, the cable terminations 1540 provide stress relief for the cable 1425. The first cable housing 1545 is preferably adapted to mate with the outside surface of the cable termination supports 1530a and 1530b and the cable rests 1535a and 1535b. The second cable housing 1550 is preferably adapted to mate with the lower gasket 1415 and the upper gasket 1435. In this manner, the interface between the cables 1425 and the body 1460 of the housing 1405 is sealed. The third cable housing 1555 is preferably adapted to mate with the cable slots 1485a and 1485b. In this manner, the cable 1425 is secured to and supported by the body 1460 of the housing 1405.

The housings, 1545, 1550 and 1555, of the cable 1425 are preferably fabricated from an electrically insulative material such as, for example, plastic or synthetic rubber.

The contact pressure rubber seal 1430 preferably mates with the top of the interior chamber 1520 of the bridge 1420. In this manner, the interior chamber 1520 of the bridge 1420, which includes the circuit board 1475 and cable terminations 1540, is sealed and protected from contamination.

In a preferred embodiment, the contact pressure rubber seal 1430 includes a top surface 1431, a bottom surface 1432, and a pressure device 1433 positioned on the bottom surface 1432. In a preferred embodiment, the pressure device 1433 is an extension of the contact pressure rubber seal 1430 and is used to apply pressure to ensure sufficient contact between the cables 1425 and the electrical contacts 1480 on the circuit board 1475.

The contact pressure rubber seal 1430 is preferably fabricated from an electrically insulative material such as, for example, natural or synthetic rubber.

The upper gasket 1435 preferably mates with and is supported within the sealing slots 1490a and 1490b of the body 1460 of the housing 1405. The upper gasket 1435 further includes cable sealing members 1565a and 1565b that preferably mate with the third cable housing 1550 of the cables 1425. In this manner, the interface between the cables 1425 and the body 1460 of the housing 1405 is sealed.

The upper gasket 1435 is preferably fabricated from an electrically insulative material such as, for example, natural or synthetic rubber.

The tag 1440 is preferably adapted to mate with the cover 1450. The tag 1440 preferably identifies the operating configuration of the geophone 1400.

The cover 1445 is preferably adapted to mate with the body 1460 of the housing 1405. The cover 1445 preferably includes corresponding female keying members that mate with the keying members 1495a and 1495b. The cover 1445 preferably includes several openings for receiving a screw 1450 for fastening the cover securely to the body 1460 of the housing 1405.

The cover 1445 preferably is fabricated from a durable electrically insulative materials such as, for example, plastic, ceramic or a composite material.

Figure 18:
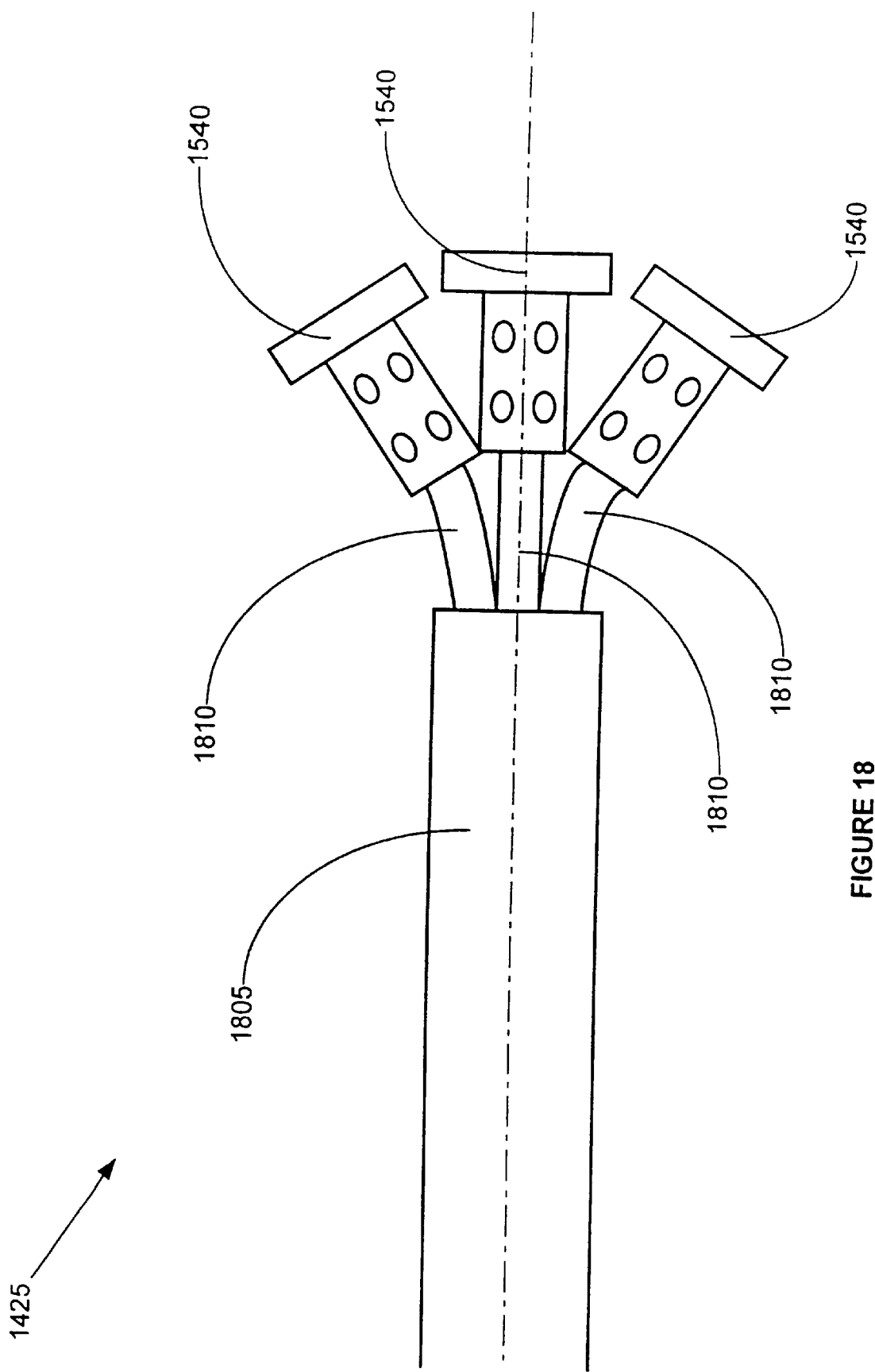
FIG. 18 is a top view of wire terminations used in the cables of FIGS. 17a and 17b.

As illustrated in FIG. 18, in a preferred embodiment, the cables 1425 include a conductor cable 1805 with one or more conductors 1810. Each of the conductors preferably include a termination 1540. The conductor cable 1805 and conductors 1810 with terminations 1540 are preferably molded into the cable housings 1545, 1550, 1555 and 1560.

The terminations 1540 preferably include crimp on terminations having an opening for receiving an electrical conductor and a body having a smaller cylindrical element and a larger cylindrical element.

Figure 18A:
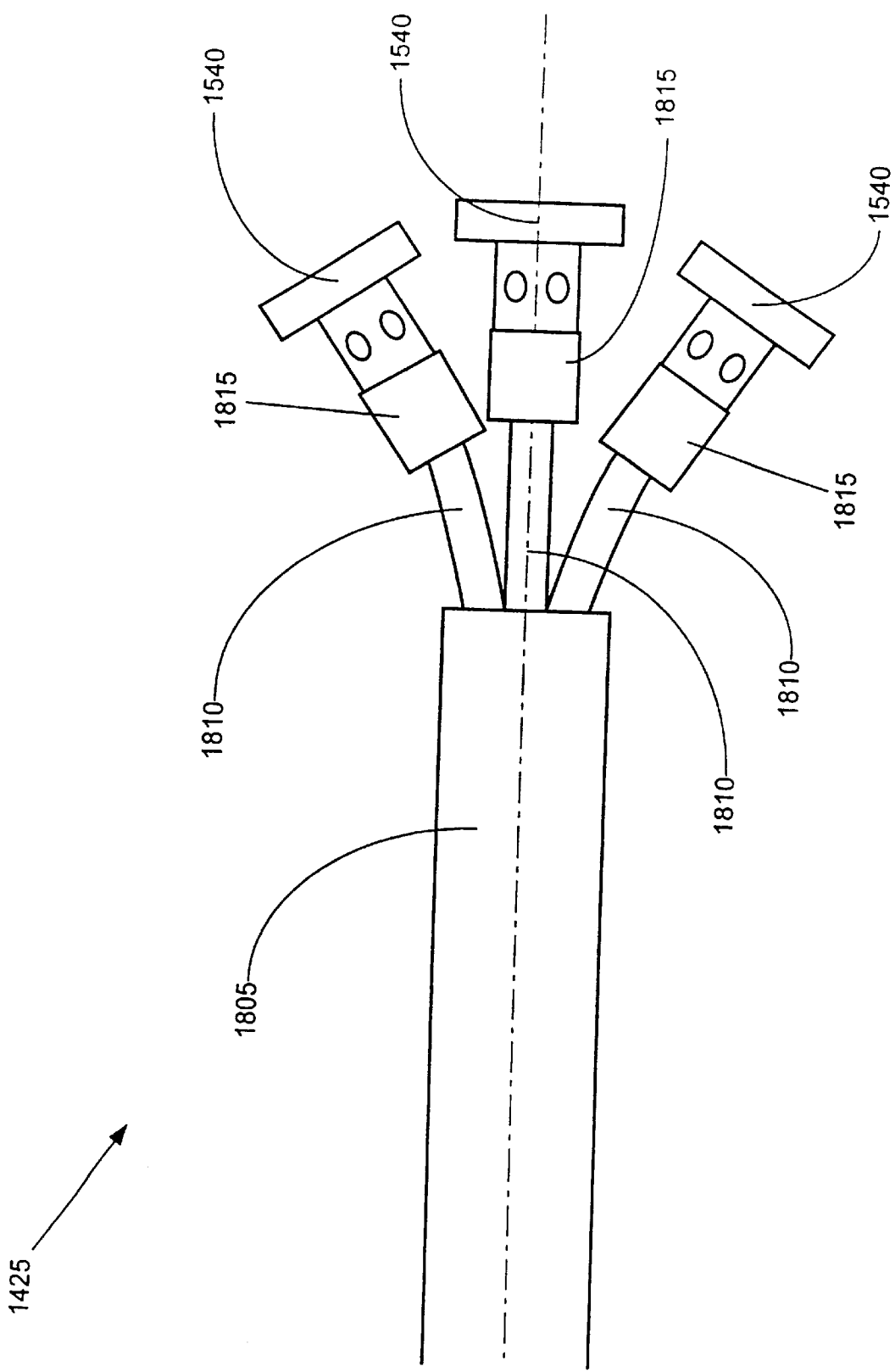
FIG. 18a is a top view of the wire terminations of FIG. 18 including shrink sleeves.

As illustrated in FIG. 18a, in a preferred embodiment, the cables 1425 further include one or more shrink sleeves 1815 for providing a seal between the conductors 1810 and the terminations 1540. The shrink sleeves 1815 preferably prevent fluids from within the cable 1425 from entering the geophone 1400. The shrink sleeves 1815 may include any number of conventional commercially available shrink sleeves such as, for example, ES 100* glue filled shrink sleeves, 3M glue filled shrink sleeves, or RAYCHEM glue filled shrink sleeves. In a preferred embodiment, the shrink sleeves 1815 include ES 100* glue filled shrink sleeves.

Referring to FIGS. 19a, 19b, 19c, 19d, 19e, 19f, 19g, 19h, 19i, 19j, 19k, 19l, 19m, 19n, 19o, 19p, 19q, 19r, 19s, 19t, 20, 21a, 21b, 21c, 21d, 21e, 21f, 22a, 22b, 23, and 23a, a preferred embodiment of a geophone with mounted connectors 1900 will now be described. The geophone 1900 preferably includes a housing 1905, a geophone sensor 1910, a bridge 1920, one or more cables 1925, a gasket device 1935, a cover 1945, and screws 1951.

The housing 1905 preferably includes a metal spike 1955 and a body 1960 including an interior chamber 1965. The interior chamber 1965 of the housing 1905 is preferably adapted to receive and mate with the geophone sensor 1910, a bridge 1920, one or more cables 1925, and a gasket device 1935. In this manner, the geophone sensor 1910 is preferably operably coupled to the metal spike 1955 to sense seismic energy.

The body 1960 preferably is fabricated from a high strength electrically insulative material.

As illustrated in FIGS. 19a, 19d, 19e, and 19f, the body 1960 of the housing 1905 preferably includes cable slots 1985a and 1985b, sealing slots 1990a and 1990b, a keying slot 1991, and a keying member 1992. The cable slots, 1985a and 1985b, are preferably adapted to mate with a corresponding cable 1925. In a preferred embodiment, the cable slots 1985a and 1985b include angled edges 1986a and 1986b. The angled edges 1986a and 1986b are preferably designed to match an angled edge on the cable 1925. The keying slot 1991 is preferably adapted to mate with a keying member on the gasket device 1935. The keying member 1992 is preferably adapted to mate with a circuit board on the geophone sensor 1910. In another preferred embodiment, the body 1960 includes a second keying member 1998 to mate with the circuit board and the bridge 1920. The sealing slots 1990a and 1990b are preferably adapted to mate with the bridge 1920 and the gasket device 1935. In this manner, the electrical connection of the cables 1925 to the circuit board 1975 is preferably water-tight and protected from contamination. The body 1960 of the housing 1905 further preferably includes several screw holes 2070 for receiving threaded fasteners.

Figure 19A:
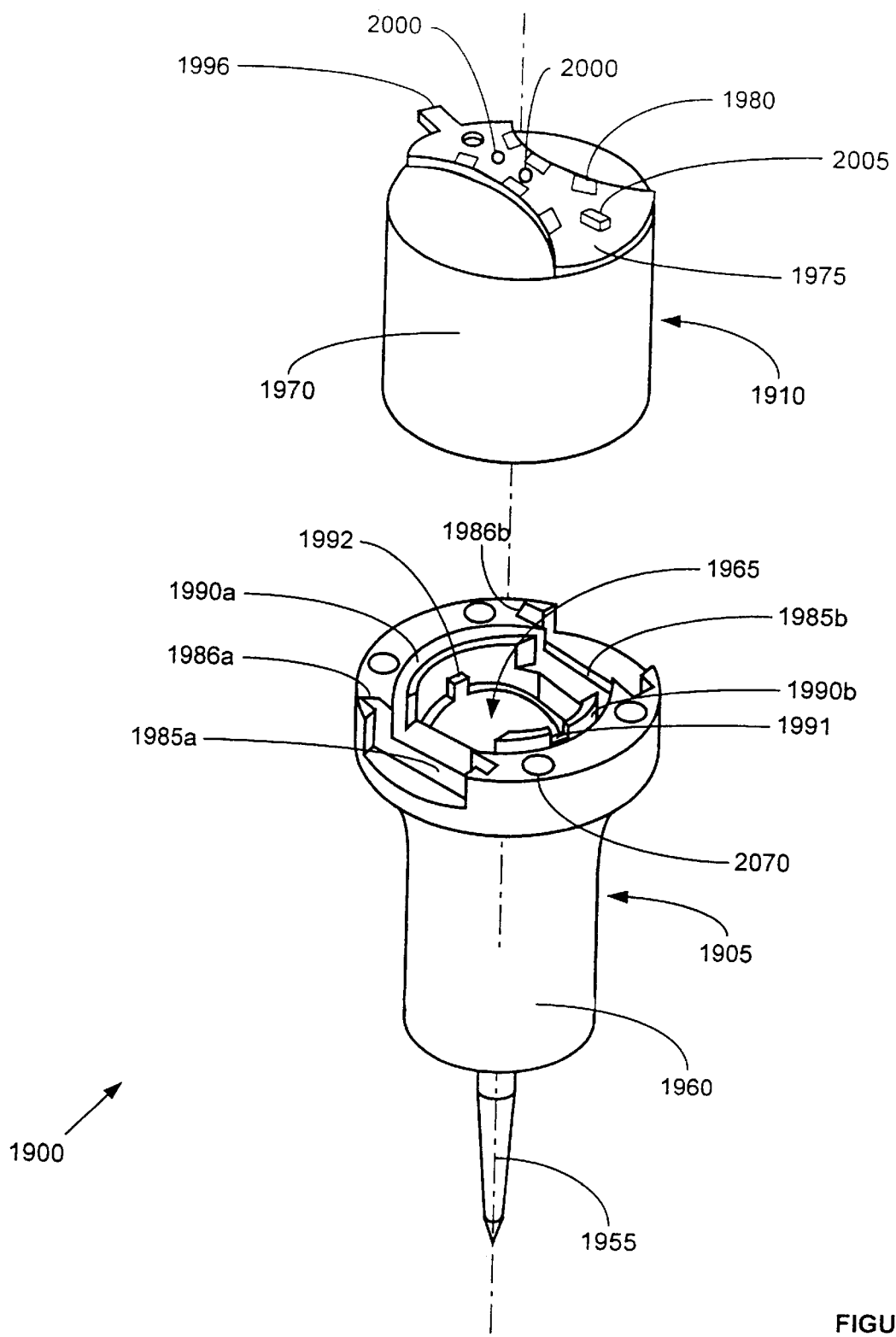
FIG. 19a is an exploded view of a portion of a preferred embodiment of a geophone with mounted connectors.

The geophone sensor 1910 preferably includes a sensor 1970 and a circuit board 1975. The circuit board 1975 is preferably operably coupled to the sensor 1970. The circuit board 1975 is further preferably adapted to couple with one or more cables 1925. In a preferred embodiment, as illustrated in FIG. 19a, the circuit board 1975 includes electrical contacts 1980 for coupling to the cables 1925. In a preferred embodiment, as illustrated in FIGS. 19g, 19h, and 19i, the circuit board 1975 further includes one or more operational keying members 2000 and one or more operational pathways 1981. In a preferred embodiment, the operational pathways 1981 are coupled to the operational keying members 2000 and the electrical contacts 1980. The operational pathways 1981 may be reprogrammed by a surface mount resistor 2005, or other similar device, to change the mode of operation of the circuit board 1975. In this manner, the operational features of the geophone 1900 can be selected and programmed. The circuit board 1975 preferably has a circular shape having a pair of opposing circular cut-outs. In this manner, the circuit board 1975 preferably mates with the bridge 1920. In a preferred embodiment, the circuit board 1975 includes a keying member 1996 that mates with the keying member 1992 in the body 1960 of the housing 1905 as well as a keying slot in the bridge 1920. The sensor 1970 preferably is a conventional geophone sensing element adapted to couple with the circuit board 1975.

Figure 19B:
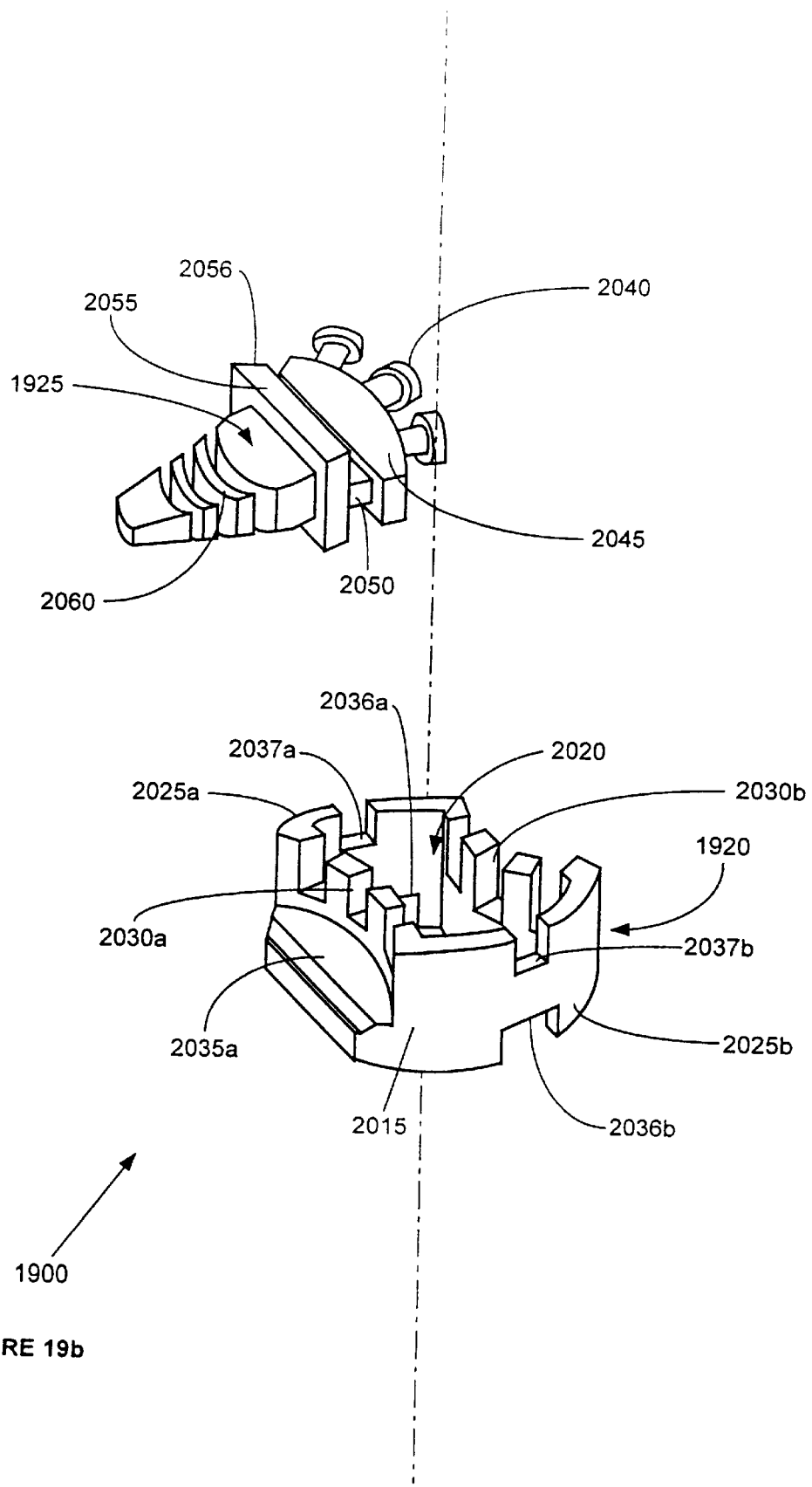
Figure 19C:
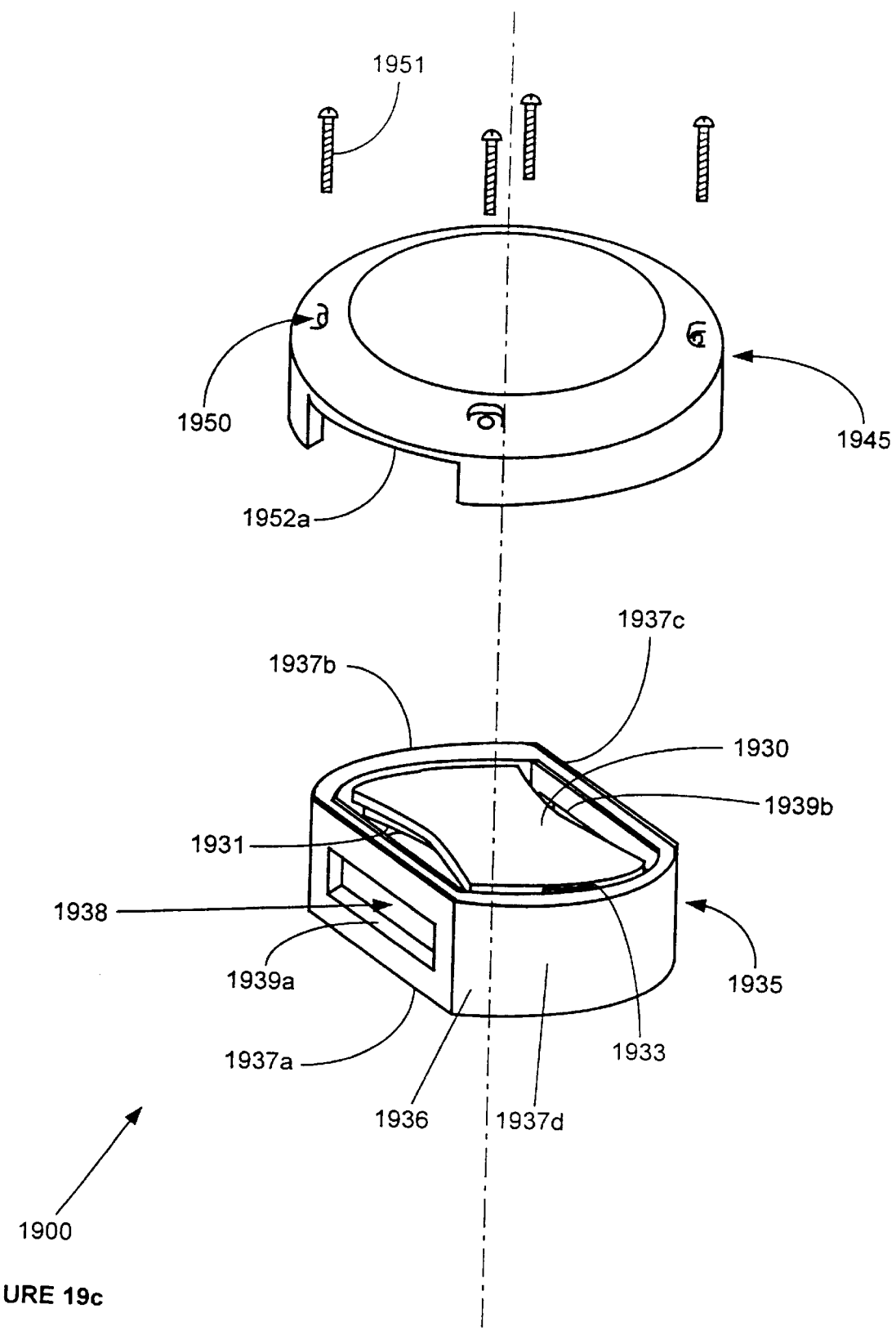
Figures 19G, 19H, 19I:
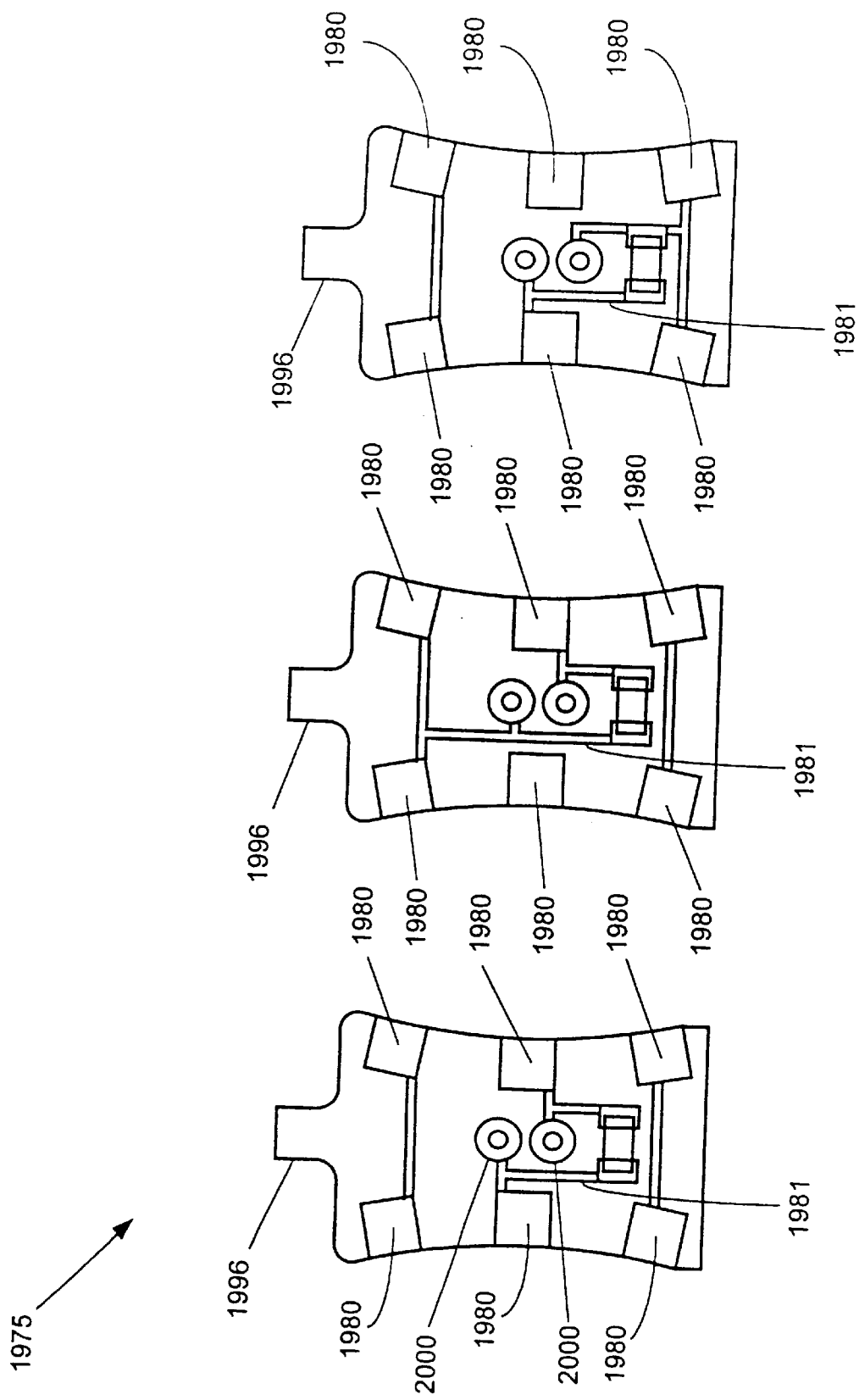
Figure 19O:
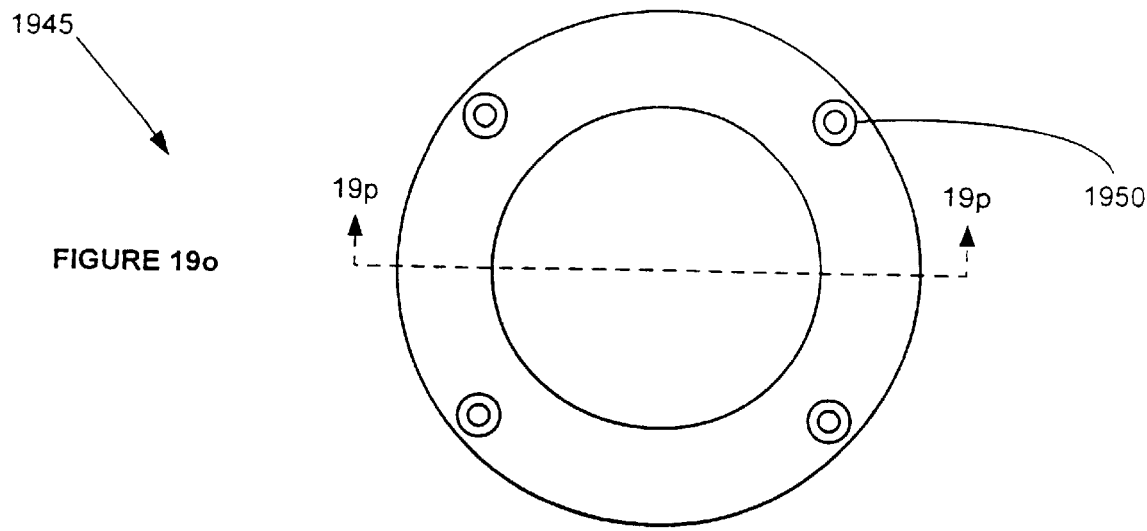
FIG. 19o is a top view of a preferred embodiment of a cover included within the geophone with mounted connectors of FIG. 19c.
Figure 19P:
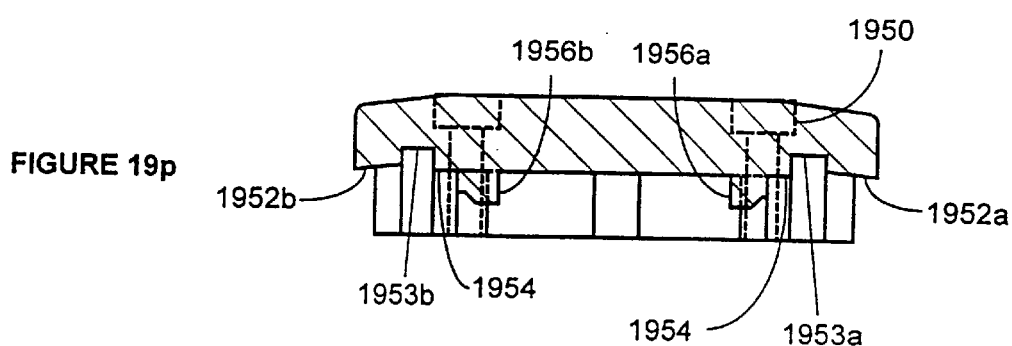
FIG. 19p is a cross-sectional view of the cover of FIG. 19o.
Figure 19Q:
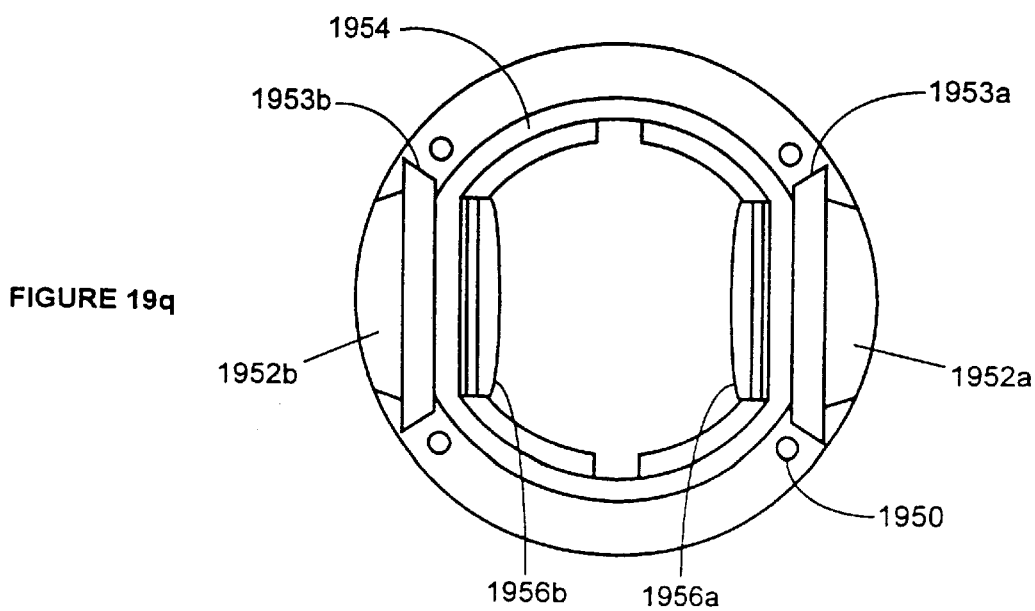
FIG. 19q is a bottom view of the cover of FIG. 19o.
Figure 19T:
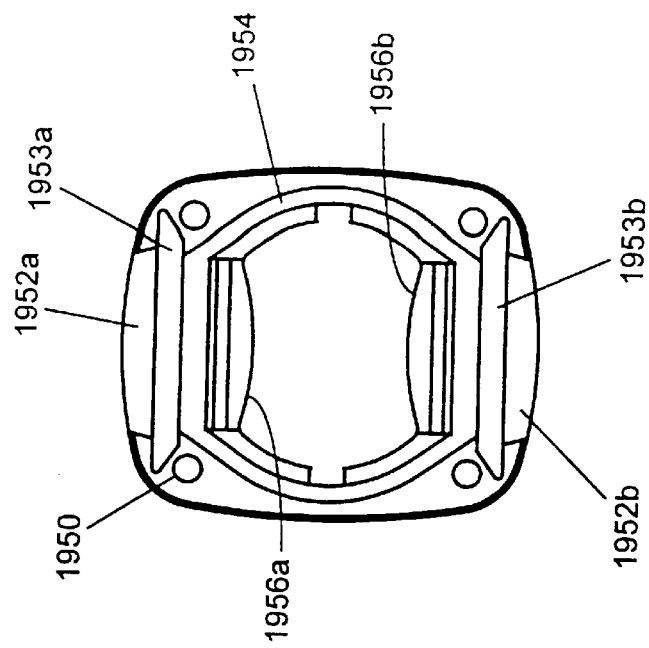
FIG. 19t is a bottom view of the cover of FIG. 19r.
Figure 19S:
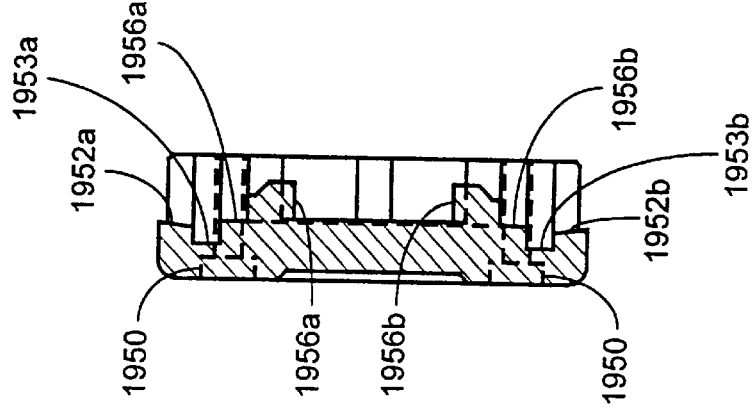
FIG. 19s is a cross-sectional view of the cover of FIG. 19r.
Figure 19R:
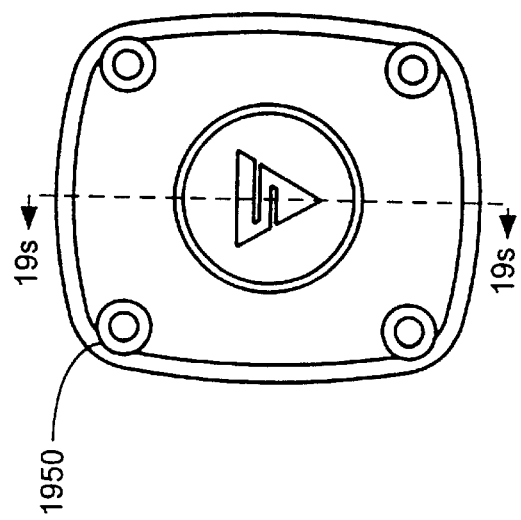
FIG. 19r is a top view of another preferred embodiment of a cover included within the geophone with mounted connectors of FIG. 19c.
Figure 20:
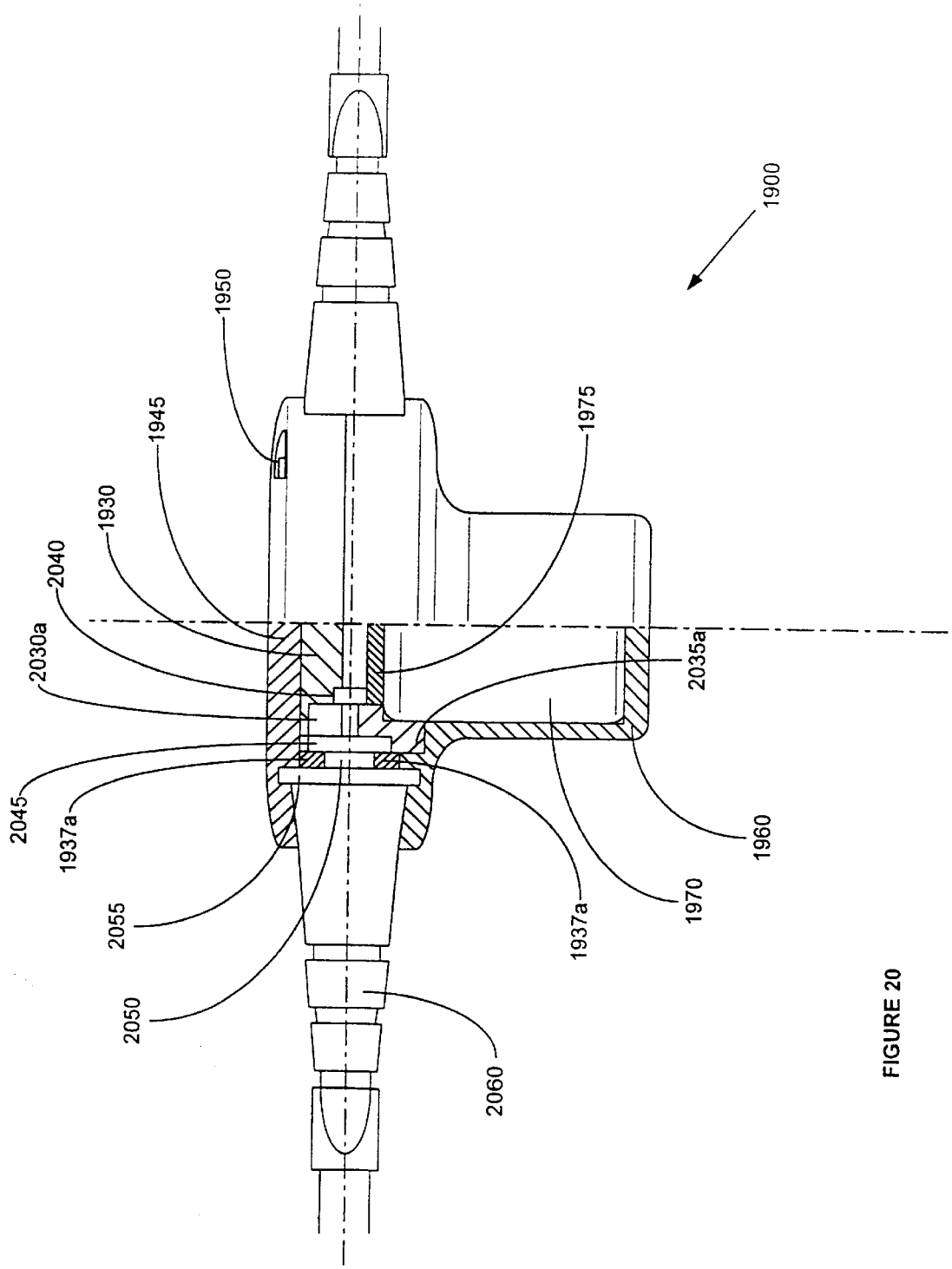
FIG. 20 is partial cross-sectional view of the geophone with mounted connectors of FIGS. 19a, 19b and 19c.
Figure 21A:
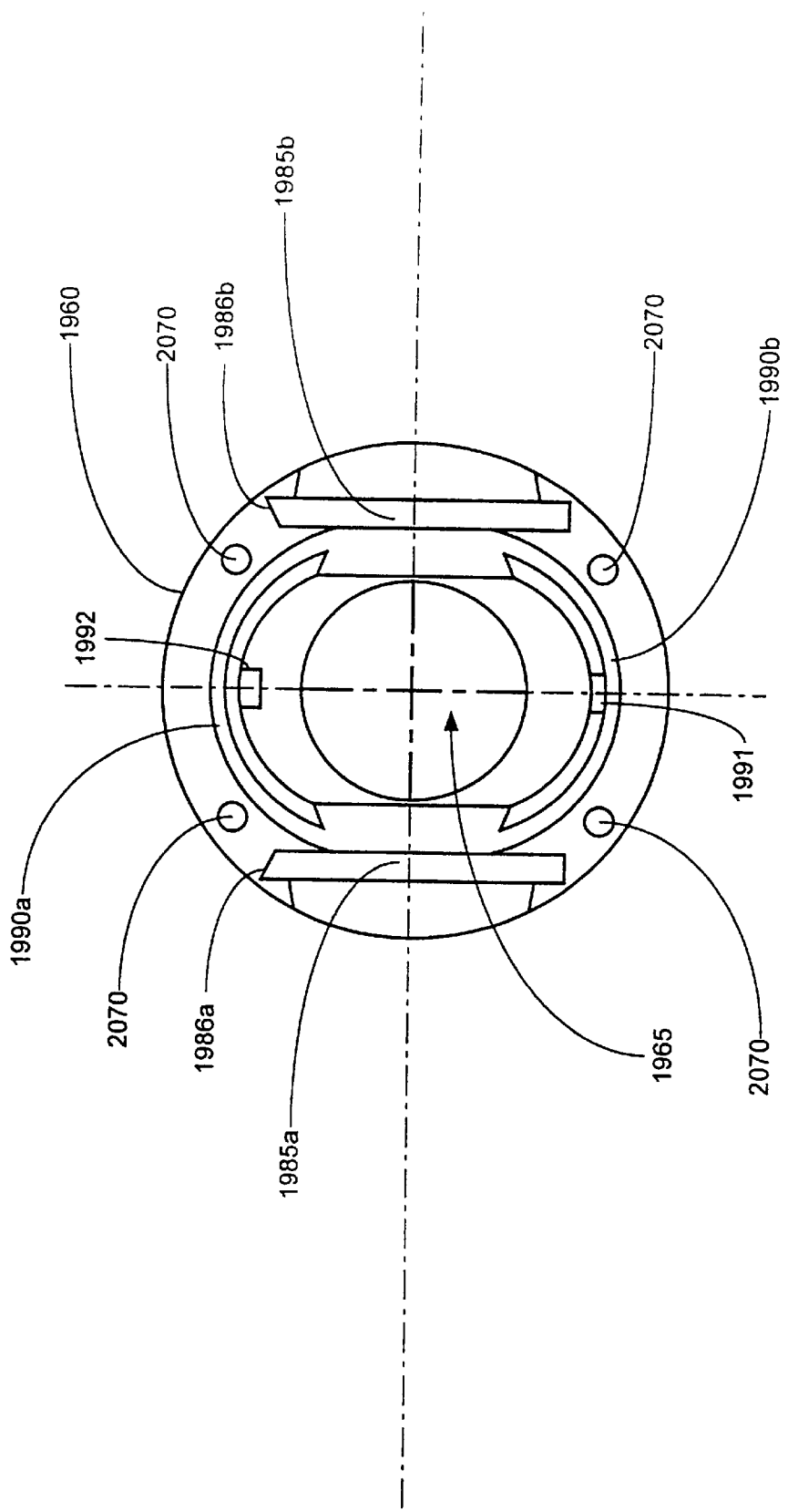
FIG. 21a is a top view of the geophone housing for the geophone of FIG. 20.
Figure 21B:
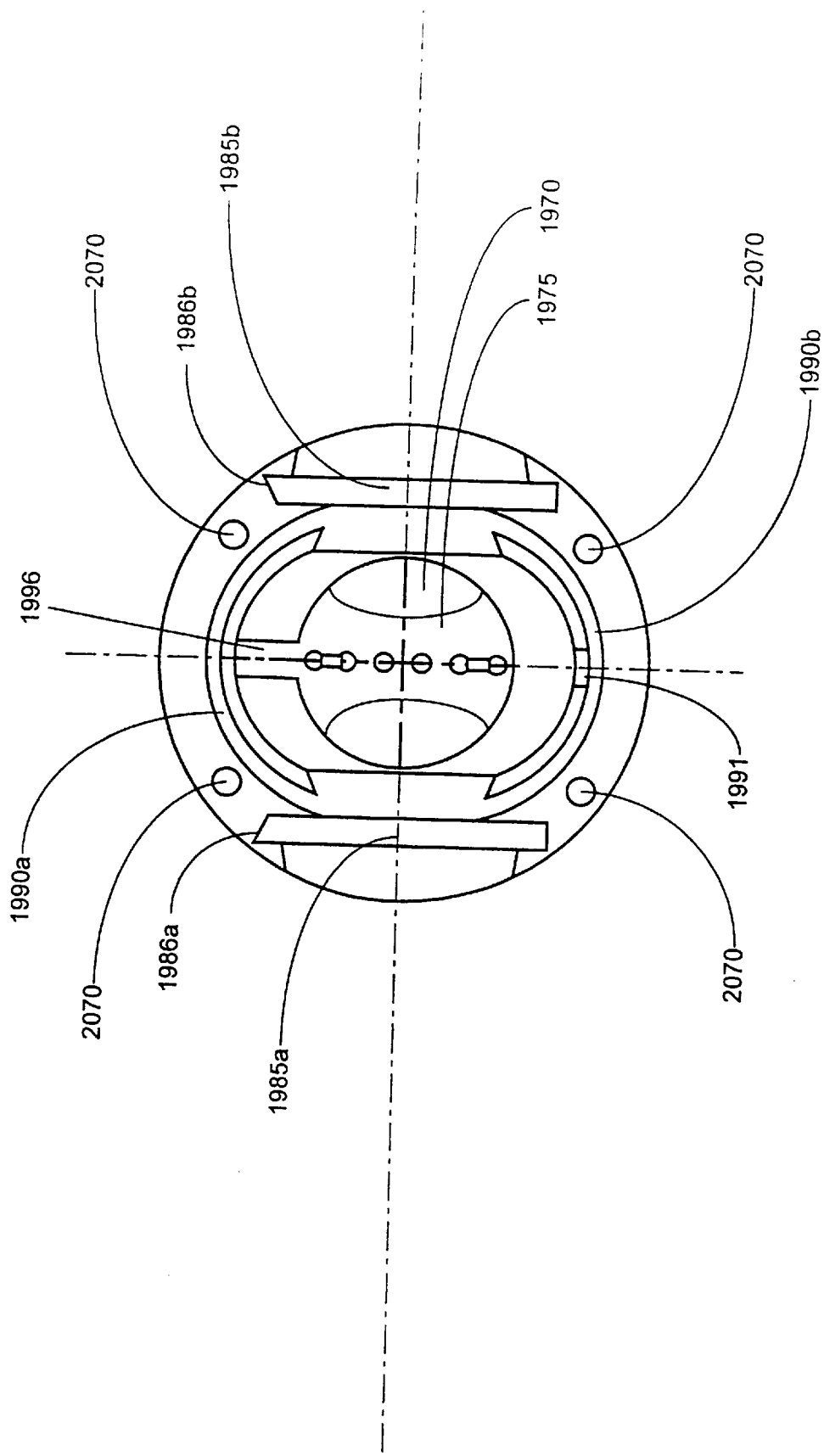
FIG. 21b is a top view of the geophone housing of FIG. 21a with a geophone assembled into the geophone housing.
Figure 21C:
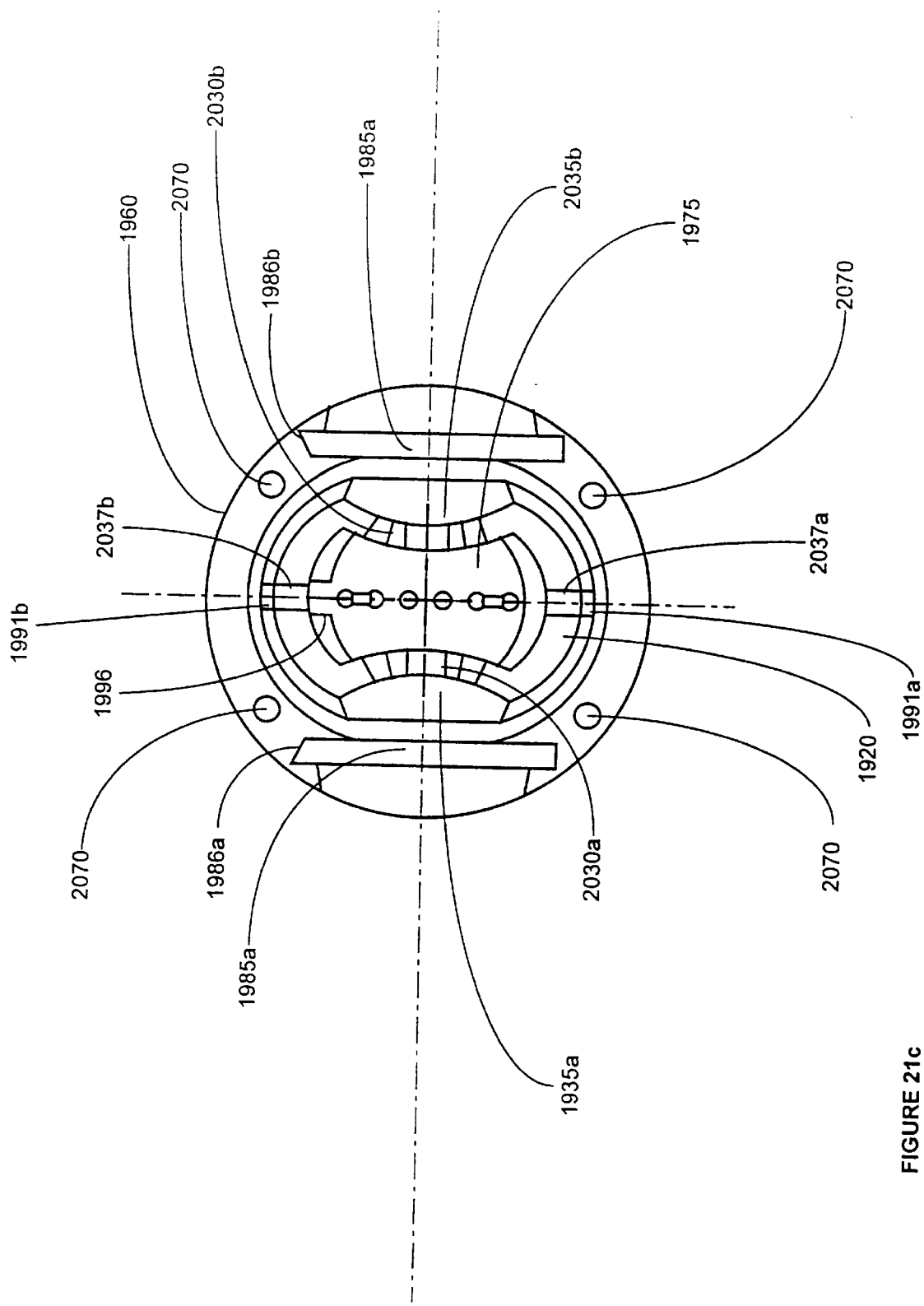
FIG. 21c is a top view of the geophone housing of FIG. 21a including the assembly of a geophone and a bridge into the geophone housing.
Figure 21D:
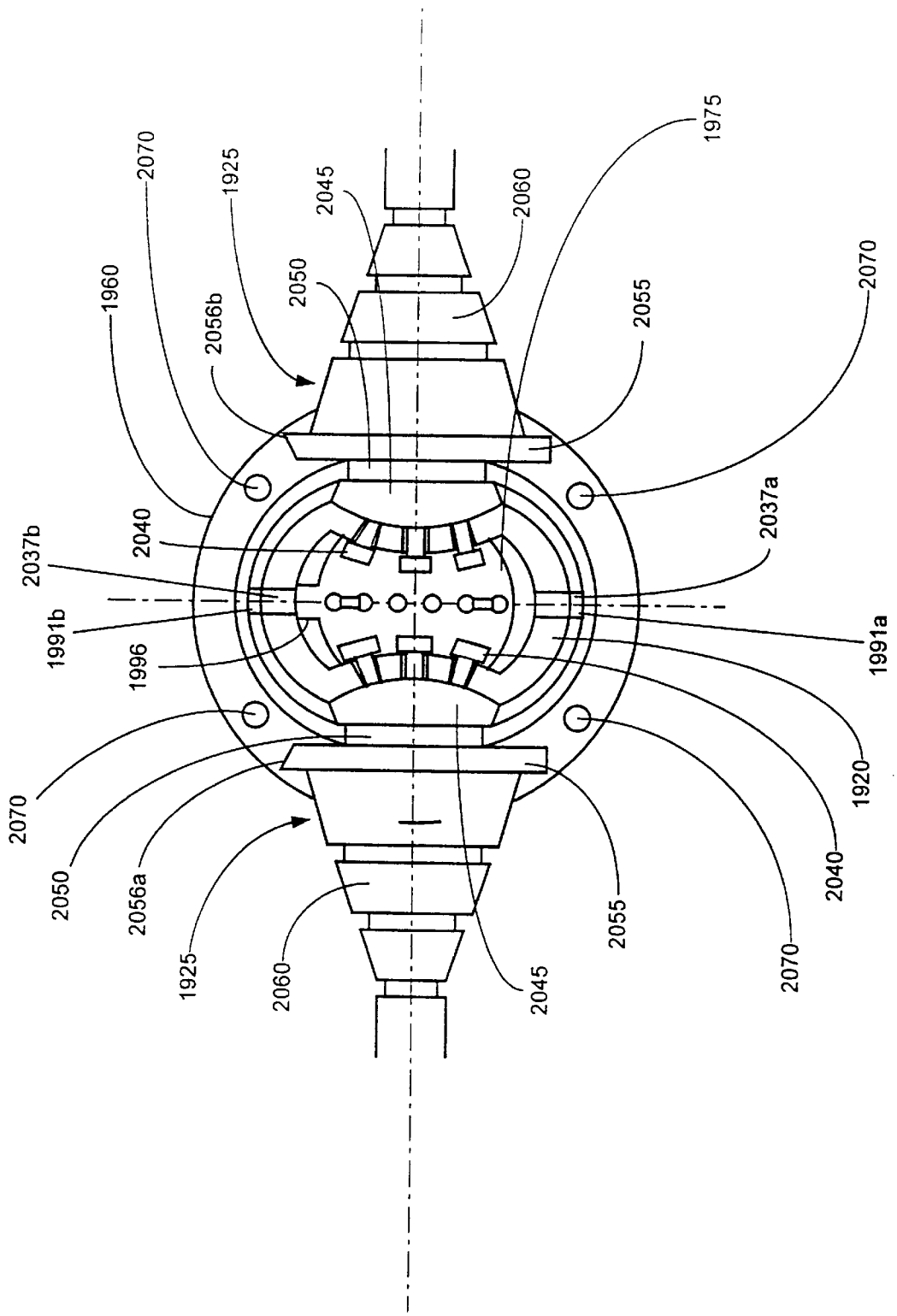
FIG. 21d is a top view of the geophone housing of FIG. 21a including the assembly of a geophone, a bridge, and a pair of cables into the geophone housing.
Figure 21E:
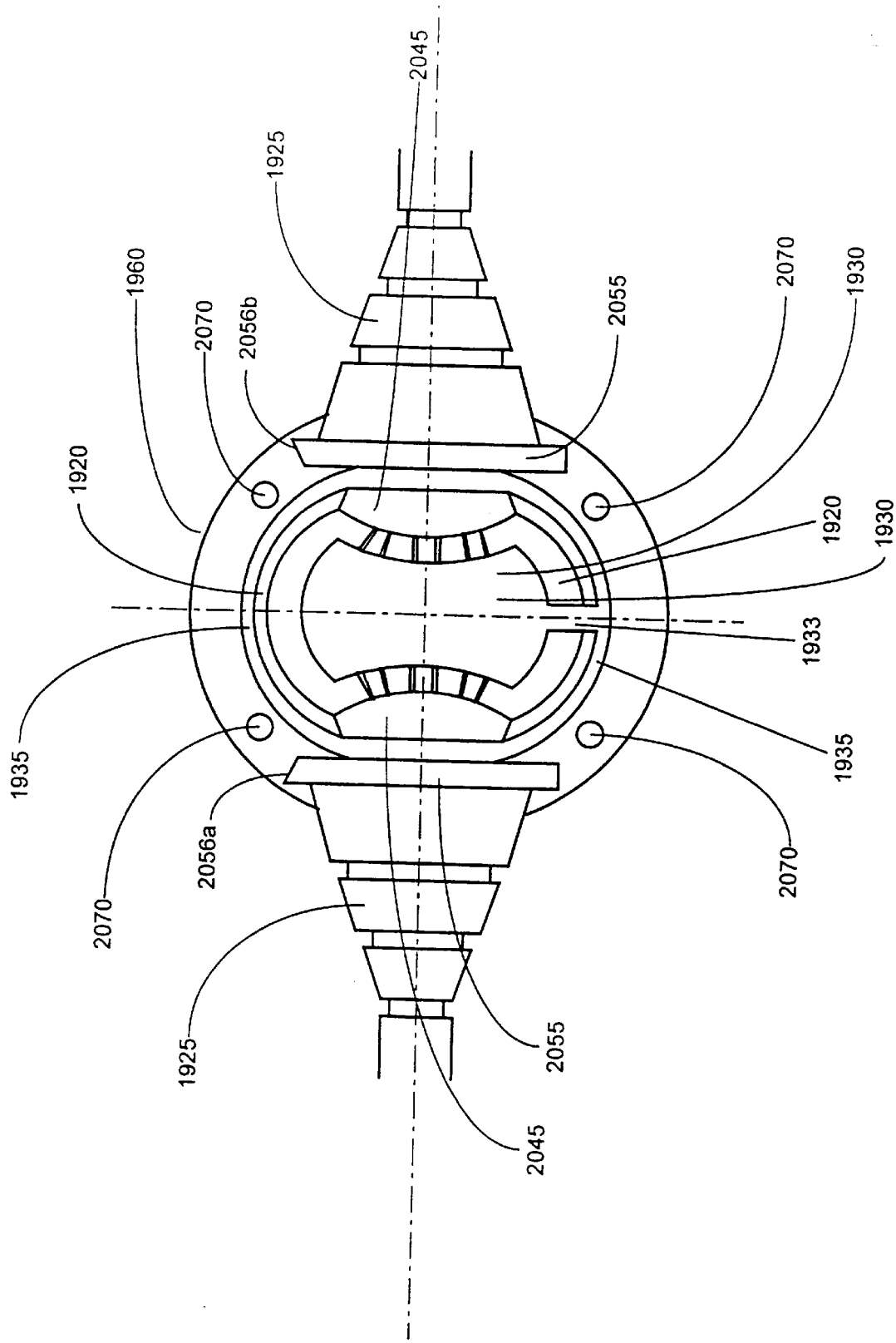
FIG. 21e is a top view of the geophone housing of FIG. 21a including the assembly of a geophone, a-bridge, a pair of cables, and a gasket device into the geophone housing.
Figure 21F:
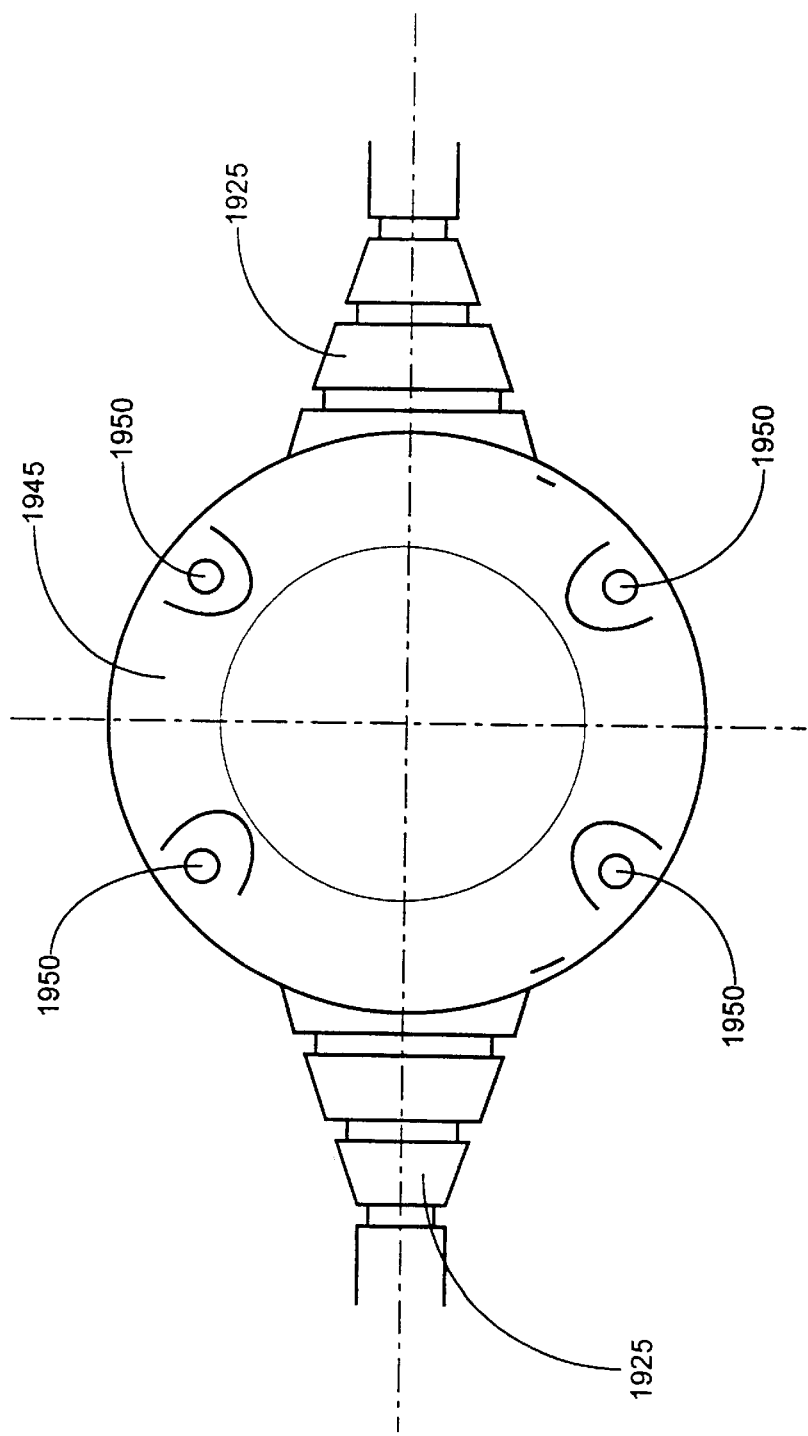
FIG. 21f is a top view of the geophone housing of FIG. 21a including the assembly of a geophone, a bridge, a pair of cables, a gasket device, and a cover into the geophone housing.
Figure 22C:
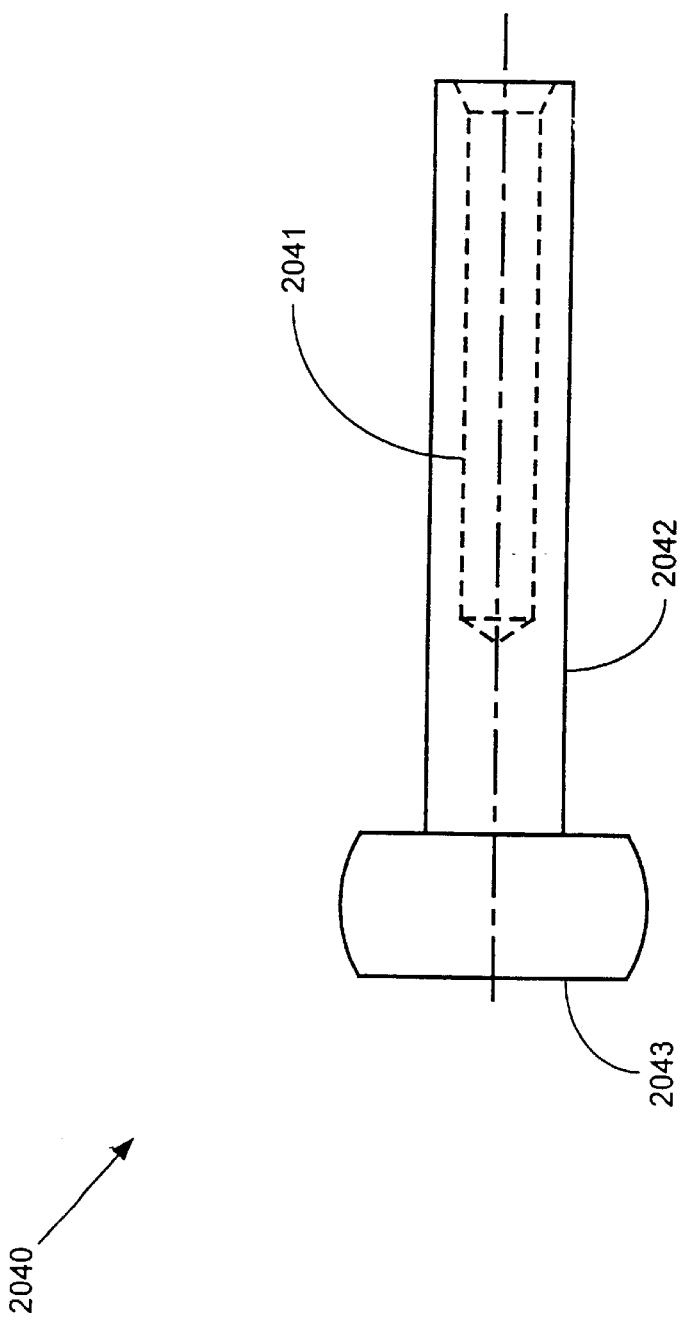
Figure 22D:
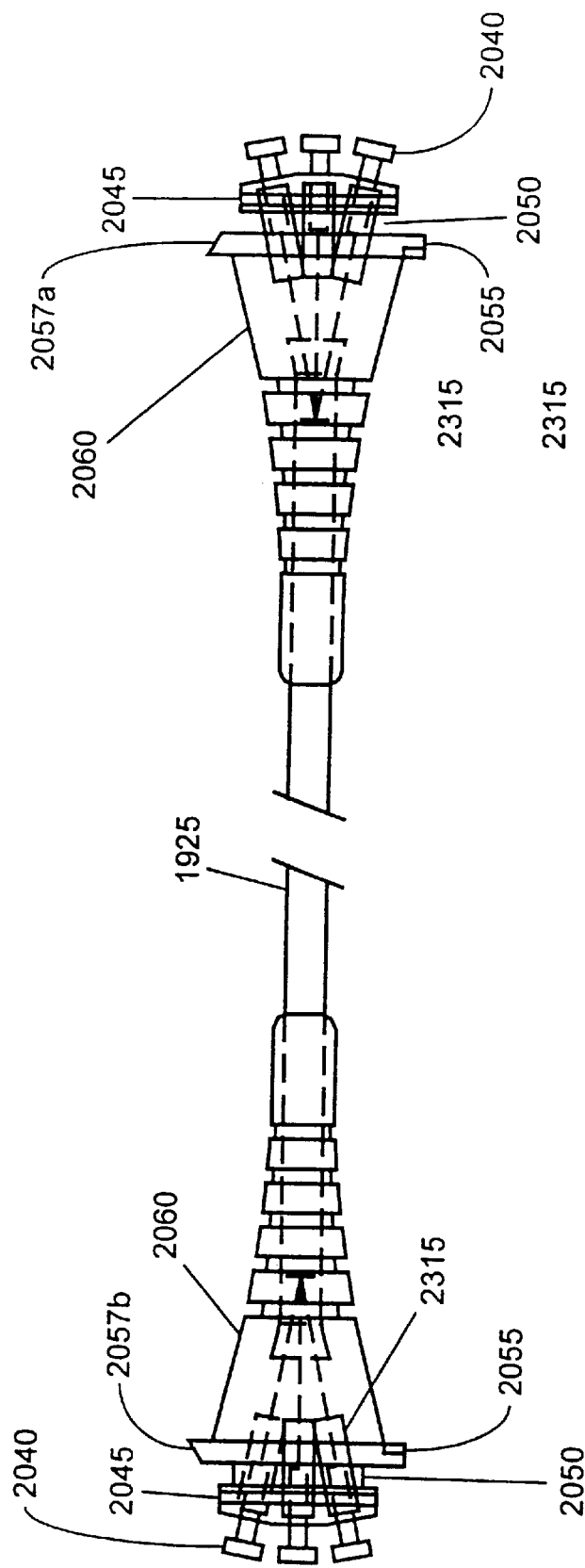

As illustrated in FIGS. 19b 19j, and 19k, the bridge 1920 preferably includes a body 2015 having interior chamber 2020, exterior walls 2025a and 2025b, cable termination supports 2030a and 2030b, cable rests 2035a and 2035b, keying slots 2036a and 2036b in the exterior wall 2025a, and keying slots 2037a and 2037b in the exterior wall 2025b. The interior chamber 2020 is preferably adapted to mate with the circuit board 1975. The exterior walls 2025a and 2025b are preferably adapted to mate with the interior surfaces of the walls of the sealing slots 1990a and 1990b. The keying slots 2036a and 2036b are preferably adapted to mate with the keying member 1992 in the body 1960 of the housing 1905 and the keying member 1996 on the circuit board 1975. In another preferred embodiment, the keying slots 2036a and 2036b are further adapted to mate with the keying member 1998 in the body 1960 of the housing 1905. In this manner, the bridge 1920 preferably is positioned within the walls of the body 1960 of the housing 1905 that define the sealing slots 1990a and 1990b. The cable termination supports 2030a and 2030b are preferably adapted to mate with the exterior surfaces of the cables 1925, and the cable termination supports 2030a and 2030b further preferably include one or more slots for receiving and supporting a corresponding cable termination. In this manner, the cable termination supports 2030a and 2030b provide support for and define the position of the terminations of the cables 1925. In a preferred embodiment, the slots of the cable termination supports 2030a and 2030b align the terminations of the cables 1925 with the corresponding electrical contacts 1980 provided on the circuit board 1975. The cable rests 2035a and 2035b are preferably adapted to receive, support and mate with the cables 1925.

The bridge 1920 is preferably fabricated from a rigid electrically insulative material such as, for example, plastic, ceramic or composite materials.

As illustrated in FIGS. 19b, 22a, 22b, 22c, and 22d, the cable 1925 preferably includes a number of cable terminations 2040, a first cable housing 2045, a second cable housing 2050, a third cable housing 2055, and a fourth cable housing 2060. The terminations 2040 preferably include crimp-on terminations having an opening 2041 for receiving an electrical conductor and a body having a smaller cylindrical element 2042 and a larger cylindrical element 2043.

The cable terminations 2040 are preferably adapted to mate with the slots in the cable termination supports 2030a and 2030b of the bridge 1920. The cable terminations 2040 preferably provide electrical contacts for the cable 1925. The cable terminations 2040 preferably provide stress relief for the cable 1925. The first cable housing 2045 is preferably adapted to mate with the outside surface of the cable termination supports 2030a and 2030b and the cable rests 2035a and 2035b. The second cable housing 2050 is preferably adapted to mate with the gasket device 1935. In this manner, the interface between the cables 1925 and the body 1960 of the housing 1905 is sealed. The third cable housing 2055 is preferably adapted to mate with the cable slots 1985a and 1985b. In a preferred embodiment, the third cable housing 2055 includes an angled edge 2056 adapted to mate with the angled edges 1986a and 1986b of the cable slots 1985a and 1985b. In a preferred embodiment, the cable 1925 includes cable terminations 2040 at both ends of the cable 1925. In a preferred embodiment, the angled edges 2056 are designed to mate with both cable slots 1985a and 1985b. In another preferred embodiment, the cable 1925 includes angled edges 2057a and 2057b. The angled edge 2057b is preferably adapted to mate with cable slot 1985b, and the angled edge 2057a is preferably adapted to mate with cable slot 1985a. The alignment of angled edge 2057a with cable slot 1985a, and angled edge 2057b with cable slot 1985b preferably prevents the incorrect connection of the cable 1925 and the geophone sensor 1910. In this manner, the cable 1925 is secured to and supported by the body 1960 of the housing 1905.

The housings, 2045, 2050 and 2055, of the cable 1925 may be fabricated from an electrically insulative material such as, for example, plastic or synthetic rubber.

As illustrated in FIGS. 19c, 19l, 19m, and 19n, the gasket device 1935 preferably includes a body 1936 including exterior walls 1937a, 1937b, 1937c, and 1937d, an interior chamber 1938, sealing slots 1939a and 1939b within the exterior walls 1937a and 1937c, and a rubber contact pressure device 1930 positioned within the interior chamber 1938. In another preferred embodiment, the gasket device 1935 further includes a keying ridge 2039 for mating with the cover 1945. The gasket device 1935 preferably mates with and is supported within the sealing slots 1990a and 1990b of the body 1960 of the housing 1905. The sealing slots 1939a and 1939b in the exterior walls 1937a and 1937c of the gasket device 1935 are preferably adapted to mate with the second cable housing 2050. In this manner, the interface between the cables 1925 and the body 1960 of the housing 1905 is sealed. The rubber contact pressure device 1930 is preferably coupled to the exterior wall 1937d by a keying member 1933. The keying member 1933 is preferably adapted to mate with the keying slots 2037a and 2037b in the exterior wall 2025b of the bridge 1920 and the keying slot 1991 in the body 1960 of the housing 1905. The rubber contact pressure device 1930 preferably mates with the top of the interior chamber 2020 of the bridge 1920. In this manner, the interior chamber 2020 of the bridge 1920, which includes the circuit board 1975 and cable terminations 2040, is sealed and protected from contamination. In a preferred embodiment, the rubber contact pressure device 1930 includes a pressure ridge 1931 adapted to supply pressure to the cable terminations 2040 to improve the coupling between the cable terminations 2040 and the electrical contacts 1980 on the circuit board 1975.

The gasket device 1935 may be fabricated from any electrically insulative material such as, for example, natural or synthetic rubber.

In a preferred embodiment, as illustrated in FIGS. 19c, 19o, 19p, 19q, 19r, 19s, and 19t, the cover 1945 is adapted to mate with the body 1960 of the housing 1905. The cover 1945 preferably includes several openings 1950 for receiving a screw 1951, keying slots 1952a, 1952b, 1953a, 1953b, and 1954, and keying ridges 1956a and 1956b. In a preferred embodiment, the openings 1950 receive screws 1951 for fastening the cover securely to the body 1960 of the housing 1905. The openings 1950 are preferably adapted to align with the screw holes 2070 in the body 1960 of the housing 1905. The keying slots 1952a and 1952b are preferably adapted to mate with the fourth cable housing 2060. The keying slots 1953a and 1953b are preferably adapted to mate with the third cable housing 2055. The keying slot 1954 is preferably adapted to mate with the exterior walls 1937a, 1937b, 1937c, and 1937d of the gasket device 1935. The keying ridges 1956a and 1956b are preferably adapted to fit between the exterior walls 1937a, 1937b, 1937c, and 1937d of the gasket device 1935 and the rubber contact pressure device 1930 positioned within the interior chamber 1938 of the gasket device 1935.

The cover 1945 may be fabricated from any durable electrically insulative materials such as, for example, plastic, ceramic or a composite material.

Figure 23:
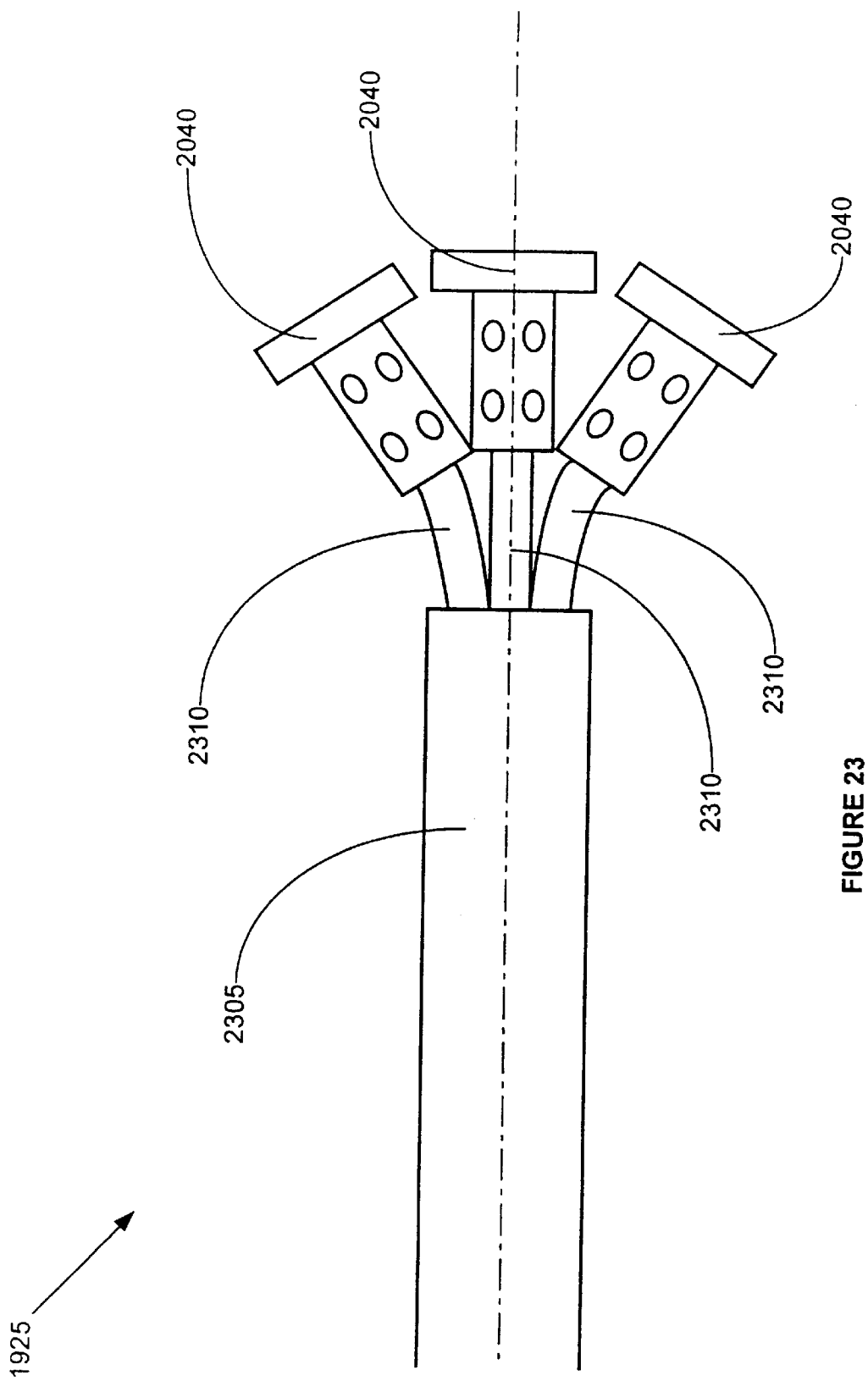

As illustrated in FIG. 23, in a preferred embodiment, the cables 1925 include a conductor cable 2305 with one or more conductors 2310. Each of the conductors preferably include a termination 2040. The conductor cable 2305 and conductors 2310 with terminations 2040 are preferably molded into the cable housings 2045, 2050, 2055 and 2060.

The terminations 2040 preferably include crimp-on terminations having an opening 2041 for receiving an electrical conductor and a body having a smaller cylindrical element 2042 and a larger cylindrical element 2043.

Figure 23A:
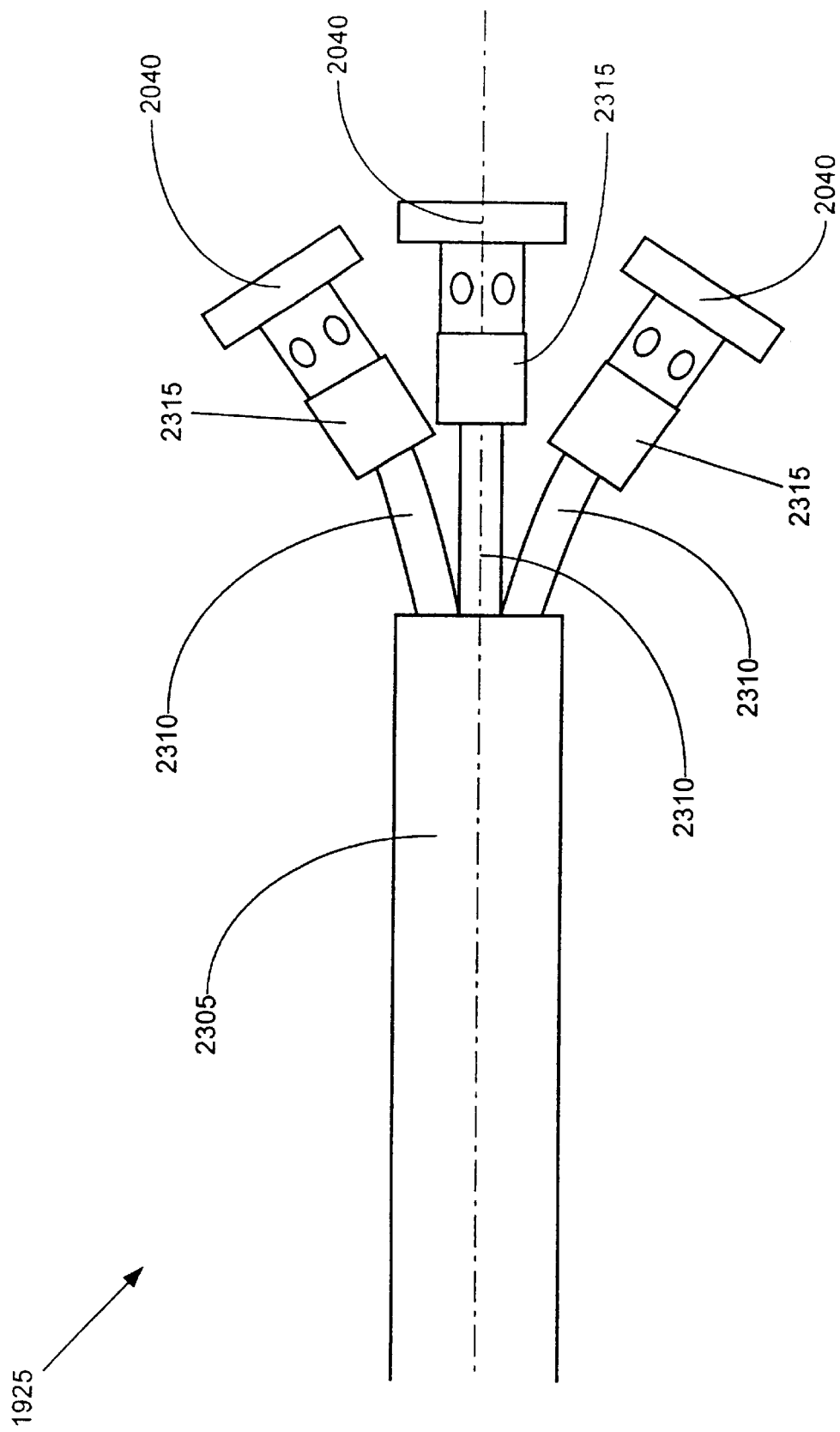
FIG. 23a is a top view of the wire terminations of FIG. 23 including shrink sleeves.

As illustrated in FIG. 23a, in a preferred embodiment, the cables 1925 further include one or more shrink sleeves 2315 for providing a seal between the conductors 2310 and the cable terminations 2040. The shrink sleeves 2315 preferably prevent fluids from within the cable 1925 from entering the geophone 1900. The shrink sleeves 2315 may include any number of conventional commercially available shrink sleeves such as, for example, ES100* glue filled shrink sleeves, 3M-glue filled shrink sleeves, or RAYCHEM glue filled shrink sleeves. In a preferred embodiment, the shrink sleeves 2315 are ES100* glue filled shrink sleeves.

Figure 24C:
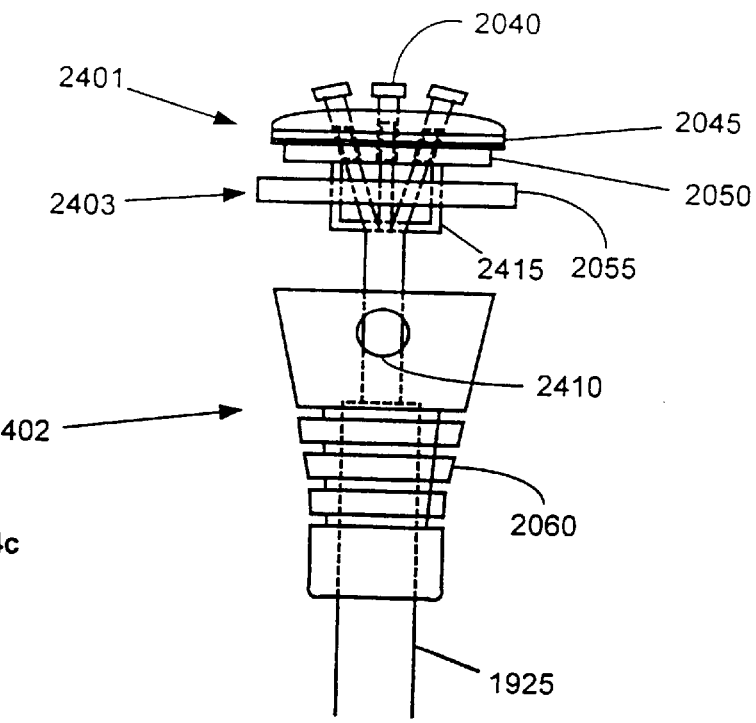
FIG. 24c is a top view of another preferred embodiment of a cabling assembly including three unassembled sections.
Figure 24D:
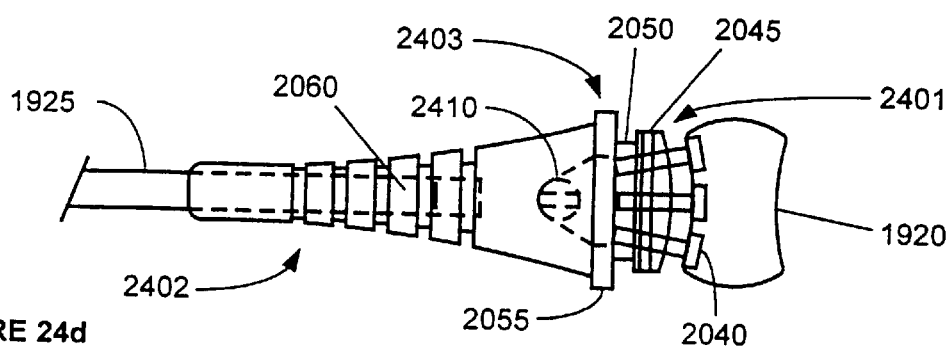
FIG. 24d is a top view of the cabling of FIG. 24c after assembly of the sections.
Figure 24E:
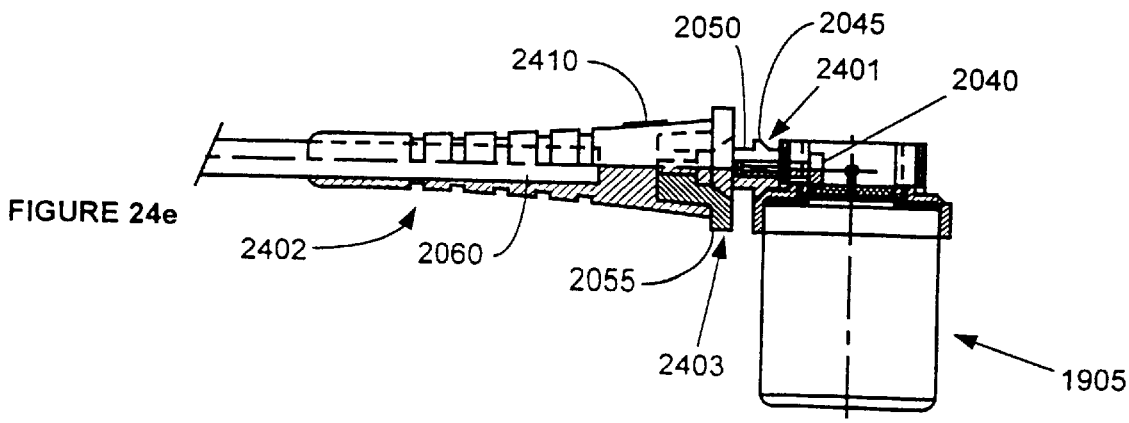
FIG. 24e is a side view of the assembled cabling of FIG. 24d after the cabling is inserted into a geophone with mounted connectors.

The housing for the cable 1925 may be divided into two or more housing sections. In a preferred embodiment, as illustrated in FIGS. 24a and 24b the housing for the cable 1925 is divided into two housing sections 2401 and 2402. In another preferred embodiment, as illustrated in FIGS. 24c, 24d, and 24e, the cable 1925 is divided into three housing sections 2401, 2402, and 2403.

The first housing section 2401 preferably includes the cable terminations 2040, the first cable housing 2045, the second cable housing 2050, the third cable housing 2055 and a connection loop 2415. The connection loop 2415 may include any number of conventional commercially available devices suitable for providing a connection mechanism between the first housing section 2401 and the second housing section 2402. In a preferred embodiment, the connection loop 2415 is fabricated from plastic. In another preferred embodiment, the connection loop 2415 is fabricated from synthetic rubber.

In another preferred embodiment, the third cable housing 2055 is separated from the first housing section 2401 to form the third housing section 2403.

The second housing section 2402 preferably includes the fourth cable housing 2060 and a connection conduit 2410.

In a preferred embodiment, the first housing section 2401 and the second housing section 2402 are connected by inserting the connection loop 2415 into the second housing section 2410 and aligning the connection loop 2415 and the connection conduit 2410. The connection is then secured by inserting a connection pin 2405 into the connection conduit 2410 to hold the first housing section 2401 and the second housing section 2402 in place around the cable 1925. In this configuration, stress relief is preferably provided for the cable 1925 by diverting a portion of the stress to the connection loop 2415 and away from the cable housings 2045, 2050, 2055, 2060 and the cable terminations 2040.

Figure 25:
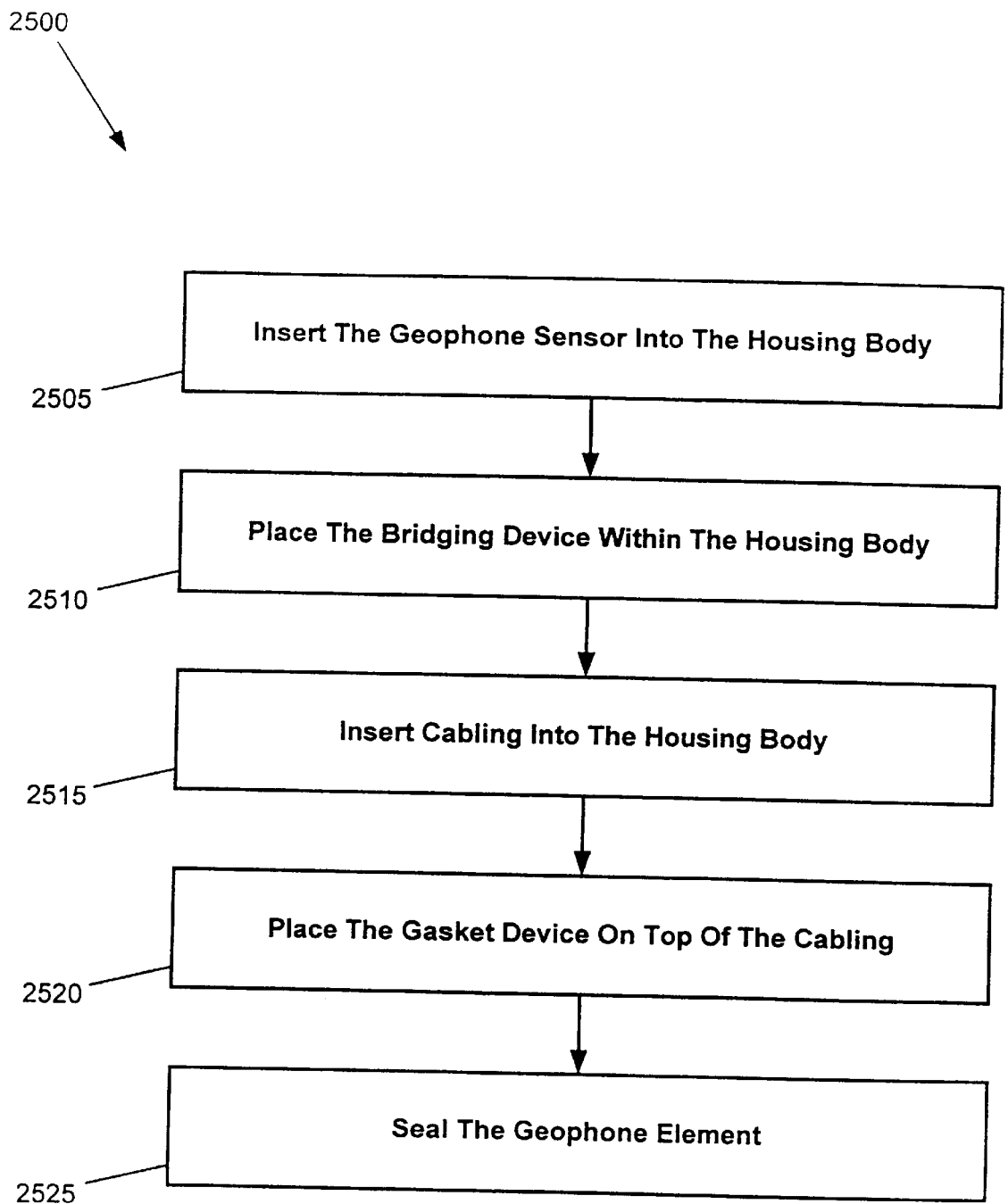
FIG. 25 is an embodiment of a method of assembling a geophone assembly.

Referring to FIG. 25, a preferred method 2500 of assembling the geophone assembly 1900 will now be described. In a preferred embodiment, as illustrated in FIG. 25, the method 2500 includes: inserting the geophone sensor 1910 into the housing body 1905 in step 2505, placing the bridging device 1920 within the housing body 1905 in step 2510, inserting the cabling 1925 into the housing body 1905 in step 2515, placing the gasket device 1935 on top of the cabling 1925 in step 2520, and sealing the geophone assembly 1900 in step 2525.

In a preferred embodiment, in step 2505 the geophone sensor 1910 is inserted into the housing body 1905. The geophone sensor 1910 may be inserted into the housing body 1905 using any number of methods suitable for installing the geophone sensor 1910 in the housing body 1905. In a preferred embodiment, the geophone sensor 1910 is inserted into the interior chamber 1965 within the body 1906 of the housing 1905. In a preferred embodiment, the geophone sensor 1910 is inserted into the interior chamber 1965 by aligning the keying member 1996 on the circuit board 1975 with the keying member 1992 within the body 1906 of the housing 1905.

In a preferred embodiment, in step 2510 the bridge 1920 is inserted into the housing body 1905. The bridge 1920 may be inserted into the housing body 1905 using any suitable method. In a preferred embodiment, the bridge 1920 is placed on top of the geophone sensor 1910 and mates with the interior surfaces of the walls of the sealing slots 1990*a* and 1990*b*. In a preferred embodiment, the keying slots 2036*a* and 2036*b* in the bridge 1920 align with the keying member 1992 on the body 1906 of the housing 1905 and the keying member 1996 on the circuit board 1975.

In a preferred embodiment, in step 2515 the cabling 1925 is inserted into the body 1960 of the housing 1905. The cabling 1925 may be inserted into the body 1960 of the housing 1905 using any suitable method. In a preferred embodiment, the cabling 1925 is inserted into the housing body 1905 by placing the cabling 1925 on top of the bridge 1920. In a preferred embodiment, the cabling 1925 is placed on top of the bridge 1920 by inserting the cable terminations 2040 into the cable termination supports 2030*a* and 2030*b*. In this configuration, the cable terminations 2040 are preferably coupled to the electrical contacts 1980 on the circuit board 1975 and provide stress relief for the cabling 1925 as a whole.

In a preferred embodiment, in step 2520 the gasket device 1935 is placed on top of the cabling 1925. The gasket device 1935 may be placed on the cabling 1925 any number of conventional commercially available methods. In a preferred embodiment, the gasket device 1935 is placed around the cabling 1925 by inserting the second cable housing 2050 into the slots 1939*a* and 1939*b* in the exterior walls 1937*a* and 1937*c* of the gasket device 1935. The gasket device 1935 preferably mates with and is supported within the sealing slots 1990*a* and 1990*b* of the body 1960 of the housing 1905. In addition, the keying member 1933 on the gasket device 1935 is preferably aligned with the keying slots 2037*a* and 2037*b* on the bridging device 1920. In a preferred embodiment, the rubber contact pressure device 1930 within the gasket device 1935 is positioned within the interior chamber 2020 of the bridge 1920 above the cable terminations 2040. The pressure ridge 1931 on the contact pressure device 1930 preferably supplies pressure to the cable terminations 2040 to improve the coupling between the cable terminations 2040 and the electrical contacts 1980 on the circuit board 1975.

In a preferred embodiment, in step 2525 the geophone assembly 1900 is sealed. The geophone assembly 1900 may be sealed using any number of conventional commercially available methods of sealing a geophone assembly 1900. In a preferred embodiment, the geophone assembly 1900 is sealed by affixing the cover 1945 to the body 1906 of the housing 1905. In a preferred embodiment, the cover 1945 is affixed to the body 1906 of the housing 1905 by inserting the screws 1951 into the openings 1950 in the cover 1945 and into the screw holes 2070 in the body 1906 of the housing 1905.

Figure 26:
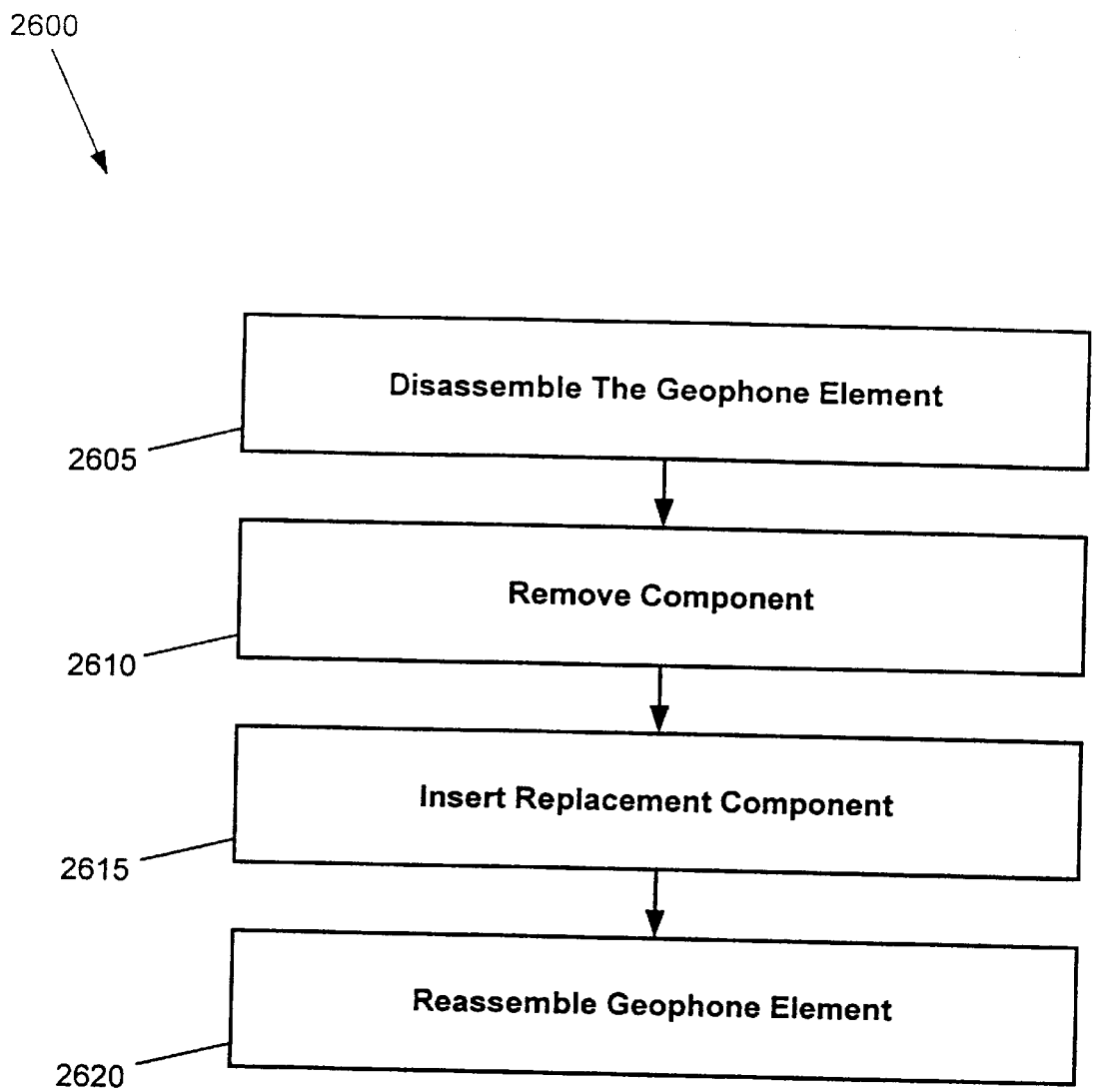
FIG. 26 is an embodiment of a method of replacing a component within a geophone assembly.

Referring to FIG. 26, a preferred method 2600 of replacing components from within a geophone assembly 1900 will now be described. In a preferred embodiment, as illustrated in FIG. 26, the method 2600 of replacing components from within a geophone assembly 1900 includes: disassembling the geophone assembly 1900 in step 2605, removing the component to be replaced in step 2610, inserting a replacement component in place of the removed component in step 2615, and reassembling the geophone assembly 1900 in step 2620.

In a preferred embodiment, in step 2605 the geophone assembly 1900 is disassembled. In a preferred embodiment, the geophone assembly 1900 includes the housing 1905, the geophone sensor 1910, the bridge 1920, one or more cables 1925, the gasket device 1935, the cover 1945, and the screws 1951. In another preferred embodiment, the geophone assembly 1400 includes the housing 1405, the geophone sensor 1410, the lower gasket 1415, the bridge 1420, one or more cables 1425, the rubber seal 1430, the upper gasket 1435, the tag 1440, the cover 1445, and the screws 1450. The geophone assembly 1900 may be disassembled using any number of suitable methods of disassembling the geophone assembly 1900. In a preferred embodiment, the geophone assembly 1900 is disassembled by removing the screws 1951 from the cover 1945 and removing the individual components as desired. In another preferred embodiment, the geophone assembly 1400 is disassembled by removing the screws 1450 from the cover 1445 and removing the individual components as desired.

In a preferred embodiment, in step 2610 the component to be replaced is removed from the geophone assembly 1900. The component may include the housing 1905, the geophone sensor 1910, the bridge 1920, one or more cables 1925, the gasket device 1935, the cover 1945, or the screws 1951.

In a preferred embodiment, in step 2615 the component that was removed in step 2610 is replaced with a replacement component. The replacement component may include any component suitable for installation within the geophone assembly 1900. In a preferred embodiment, the replacement component is identical to the component in step 2610.

In a preferred embodiment, in step 2620 the geophone assembly 1900 is reassembled. The geophone assembly 1900 may be reassembled using any method suitable for reassembling the geophone assembly 1900. In a preferred embodiment, the geophone assembly 1900 is reassembled by reinserting the geophone sensor 1910, the bridge 1920, the one or more cables 1925, the gasket device 1935, the cover 1945, and the screws 1951 into the housing 1905 in the same order in which the components were present within the housing 1905 before the geophone assembly 1900 was disassembled in step 2605.

A geophone system has been described which minimizes assembly time by eliminating the need for soldered connections. Instead, the present geophone system provides a solderless snap-on connection termination. The teachings of the present geophone system can be applied to existing geophone systems, greatly reduces string assembly time, and will permit in-field repair.

A geophone system has been described that includes one or more geophones including a body including an opening defining a cavity, a first circuit board positioned in the cavity, and a seismic detector positioned in the cavity operably coupled to the first circuit board, one or more removable cable connectors positioned in the cavity above the first circuit board, and a cap coupled to the body, the cap including a second printed circuit board operably coupled to the cable connectors and the first circuit board, and cabling operably coupled to the cable connectors. In a preferred embodiment, the body includes one or more locking fingers adapted to couple to the cap. In a preferred embodiment, the cap includes one or more cavities adapted to receive the locking fingers. In a preferred embodiment, each geophone further includes a locking ring adapted to couple the locking fingers to the cap. In a preferred embodiment, the body includes one or more slots extending into the cavity. In a preferred embodiment, the cable connectors extend into the slots. In a preferred embodiment, the first circuit board includes receptacles, the cable connectors include receptacles, and the second circuit board includes pins operably coupled to the receptacles of the first circuit board and the cable connectors. In a preferred embodiment, the cable connectors have a wedgeshaped cross section. In a preferred embodiment, the cable connectors have a rectangular-shaped cross section. In a preferred embodiment, the cable connectors are stacked within the cavity.

A geophone system has also been described that includes one or more geophones including a body including an opening defining a cavity, a plurality of slots extending into the cavity, a first circuit board positioned in the cavity, a seismic detector positioned in the cavity operably coupled to the first circuit board, and one or more locking fingers extending from the body, one or more removable cable connectors positioned in the cavity above the first circuit board, the cable connectors extending into the slots, and a cap coupled to the locking fingers, the cap including a second printed circuit board operably coupled to the cable connectors and the first circuit board, and cabling operably coupled to the cable connectors.

A geophone system has also been described that includes one or more geophones including a body including an opening defining a cavity, a circuit board positioned in the cavity, and a seismic detector positioned in the cavity operably coupled to the circuit board, one or more removable cable connectors positioned in the cavity on top of the circuit board, and a cap coupled to the body, and cabling operably coupled to the cable connectors. In a preferred embodiment, the body includes one or more locking fingers adapted to couple to the cap. In a preferred embodiment, the cap includes one or more cavities adapted to receive the locking fingers. In a preferred embodiment, each geophone further includes a locking ring adapted to couple the locking fingers to the cap. In a preferred embodiment, the body includes one or more slots extending into the cavity. In a preferred embodiment, the cable connectors extend into the slots. In a preferred embodiment, the cap is coupled to the body by threaded screws. In a preferred embodiment, the body includes one or more slots for containing one or more of the cable connectors. In a preferred embodiment, the circuit board includes contacts; wherein the cabling includes terminations; and wherein the terminations are coupled to the contacts. In a preferred embodiment, the cable connectors include a bridging device positioned on top of the seismic detector, and a gasket device including an interior chamber and exterior walls positioned on top of the bridging device.

In a preferred embodiment, the cable connectors further include a contact pressure rubber seal positioned between the cap and the cabling. In a preferred embodiment, the bridging device includes exterior walls and an interior chamber. In a preferred embodiment, the exterior walls of the bridging device include slots for supporting the cable. In a preferred embodiment, the gasket device includes an upper gasket and a lower gasket. In a preferred embodiment, the gasket device includes slots in the exterior walls for supporting the cable. In a preferred embodiment, the gasket device includes one or more slots extending through the exterior wall for supporting the cable, and a contact pressure rubber seal coupled to the exterior wall and extending into the interior chamber. In a preferred embodiment, the contact pressure rubber seal fits within the bridging device. In a preferred embodiment, the circuit board includes one or more operational keying members for customizing the operation of the geophone system.

A geophone element has been described that includes a geophone sensor and a circuit board coupled to the geophone sensor. In a preferred embodiment, the circuit board includes one or more electrical contacts for coupling the geophone element to electrical cables. In a preferred embodiment, the circuit board includes one or more keying members to facilitate the coupling of the electrical cables to the electrical contacts on the geophone element. In a preferred embodiment, the circuit board includes one or more keying members for positioning the geophone element within a housing. In a preferred embodiment, the geophone is cylindrical and the circuit board is circular with a pair of opposing circular cut-outs.

A cabling system for use within a geophone system has been described that includes an electrical cable, a housing for the cable, and one or more cable terminations at the ends of the electrical cable. In a preferred embodiment, the housing for the cable is adapted to fit within sealing slots in the geophone system. In a preferred embodiment, the housing for the cable is molded onto the cable. In a preferred embodiment, the housing for the cable includes a first housing section including a connection loop, a second housing section including a connection conduit, and a connection pin for coupling the first housing section and the second housing section. In a preferred embodiment, the cable terminations have a rectangular-shaped cross-section. In a preferred embodiment, the cable terminations have a wedge-shaped cross section. In a preferred embodiment, the cable terminations provide an electrical contact for the cabling system within the geophone system. In a preferred embodiment, the cable terminations provide stress relief for the cabling system within the geophone system. In a preferred embodiment, the cabling system further includes one or more shrink sleeves for providing a water block seal between the cable and the cable terminations.

A housing for holding geophone sensor components has been described that includes a housing body including an opening comprising a cavity within the body, one or more keying members located within the housing body, and a cap for sealing the housing body. In a preferred embodiment, the housing further includes a spike attached to the bottom of the housing body. In a preferred embodiment, the keying members include ridges. In a preferred embodiment, the keying members include slots. In a preferred embodiment, the ridges are adapted to align with contours of the geophone sensor components. In a preferred embodiment, the slots are adapted to align with contours of the geophone sensor components.

A bridge device has been described that includes a bridge body, including an interior chamber and exterior walls, and slots defining cable termination supports in the exterior walls. In a preferred embodiment, the bridge device further includes cable rests in the exterior walls. In a preferred embodiment, the bridge device further includes one or more slots within the exterior walls for aligning the bridge device within the geophone system.

A rubber pressure seal for sealing geophone system components has been described that includes a body, including a top surface and a bottom surface and a pressure ridge positioned on the bottom surface of the body. In a preferred embodiment, the body is shaped to fit within one or more of the geophone system components.

A gasket device for mating with a housing for holding a geophone sensor has been described that includes exterior walls and an interior chamber. In a preferred embodiment, the gasket device further includes one or more slots extending through the exterior walls for holding a cable. In a preferred embodiment, the gasket device further includes a rubber pressure seal positioned within the interior chamber. In a preferred embodiment, the rubber pressure seal includes a body including an upper surface and a lower surface and a pressure ridge positioned on the lower surface.

A cap for sealing a housing body within a geophone system has been described that includes a cap body and one or more screw holes extending through the cap body. In a preferred embodiment, the cap further includes a sealing slot for holding a cable.

A method of assembling a geophone assembly has been described that includes inserting a geophone sensor element within a body of a housing, placing a bridge in the body of the housing, inserting cabling into the housing body, placing a gasket device on top of the cabling, and sealing the geophone assembly. In a preferred embodiment, the geophone sensor element includes a geophone sensor and a circuit board positioned on top of the geophone sensor. In a preferred embodiment, the housing body includes one or more keying members, the circuit board includes one or more keying members, and the geophone element is aligned within the body of the housing by aligning the keying members on the circuit board with the keying members in the housing body. In a preferred embodiment, the bridge includes a plurality of exterior walls, an interior chamber, keying slots within the exterior walls, and cable termination support slots within the exterior walls. In a preferred embodiment, the bridge is positioned within the housing body by aligning the keying slots within the exterior walls with the circuit board and the housing body. In a preferred embodiment, the cabling includes cable terminations. In a preferred embodiment, the bridge includes cable termination slots, and cabling is positioned within the housing body by placing the cable terminations within the cable termination slots in the bridge. In a preferred embodiment, the geophone sensor includes electrical contacts and the cable terminations are coupled to the electrical contacts. In a preferred embodiment, the gasket device includes an exterior wall, an interior chamber, and a rubber pressure seal coupled to the exterior wall positioned within the interior chamber. In a preferred embodiment, the geophone assembly is sealed by placing a cap on the housing body.

A method of replacing components in a geophone assembly has been described that includes disassembling the geophone assembly, removing a component from within the geophone assembly, replacing the component with a new component, and reassembling the geophone assembly. In a preferred embodiment, the geophone assembly includes a housing body, a geophone sensor positioned within the housing body, a circuit board positioned on top of the geophone sensor, cable connectors positioned on top of the circuit board, cabling operably coupled to the cable connectors, and a cap positioned on top of the housing body for sealing the geophone assembly. In a preferred embodiment, the cable connectors include a bridging device adapted to hold the cabling and a gasket device adapted to supply pressure to the cabling to couple the cabling and the circuit board.

Although illustrative embodiments of the invention have been shown and described, a wide range of modification, changes and substitution is contemplated in the foregoing disclosure. In some instances, some features of the present invention may be employed without a corresponding use of the other features. Accordingly, it is appropriate that the appended claims be construed broadly and in a manner consistent with the scope of the invention.

What is claimed is:

1. A geophone system, comprising:
    one or more geophones including:
        a body including an opening defining a cavity, a first circuit board positioned in the cavity, and a seismic detector positioned in the cavity operably coupled to the first circuit board;
        one or more removable cable connectors positioned in the cavity above the first circuit board; and
        a cap coupled to the body, the cap including a second printed circuit board operably coupled to the cable connectors and the first circuit board; and
    cabling operably coupled to the cable connectors.

2. The geophone system of claim 1, wherein the body includes one or more locking fingers adapted to couple to the cap.

3. The geophone system of claim 2, wherein the cap includes one or more cavities adapted to receive the locking fingers.

4. The geophone system of claim 3, wherein each geophone further comprises a locking ring adapted to couple the locking fingers to the cap.

5. The geophone system of claim 1, wherein the body includes one or more slots extending into the cavity.

6. The geophone system of claim 5, wherein the cable connectors extend into the slots.

7. The geophone system of claim 1, wherein the first circuit board includes receptacles, the cable connectors include receptacles, and the second circuit board includes pins operably coupled to the receptacles of the first circuit board and the cable connectors.

8. The geophone system of claim 1, wherein the cable connectors have a wedge-shaped cross section.

9. The geophone system of claim 1, wherein the cable connectors have a rectangular-shaped cross section.

10. The geophone system of claim 1, wherein the cable connectors are stacked within the cavity.

11. A geophone system, comprising:
one or more geophones including:
a body including an opening defining a cavity, a plurality of slots extending into the cavity, a first circuit board positioned in the cavity, a seismic detector positioned in the cavity operably coupled to the first circuit board, and one or more locking fingers extending from the body;
one or more removable cable connectors positioned in the cavity above the first circuit board, the cable connectors extending into the slots; and
a cap coupled to the locking fingers, the cap including a second printed circuit board operably coupled to the cable connectors and the first circuit board; and
cabling operably coupled to the cable connectors.

12. A geophone system, comprising:
one or more geophones including:
a body including an opening defining a cavity, a geophone sensor disposed in the cavity, the geophone sensor having at least one electrical contact positioned in the cavity;
one or more removable cables, each cable having at least one cable conductor termination, each cable conductor termination detachably coupled to a corresponding one of the at least one electrical contacts; and
a cap coupled to the body.

13. The geophone system of claim 12, wherein the body includes one or more locking fingers adapted to couple to the cap.

14. The geophone system of claim 13, wherein the cap includes one or more cavities adapted to receive the locking fingers.

15. The geophone system of claim 14, wherein each geophone further comprises a locking ring adapted to couple the locking fingers to the cap.

16. The geophone system of claim 12, wherein the body includes one or more slots extending into the cavity.

17. The geophone system of claim 16, wherein the cable connectors extend into the slots.

18. The geophone system of claim 12, wherein the cable conductor terminations are adapted to provide stress relief.

19. The geophone system of claim 12, wherein the body includes one or more keying slots for aligning one or more of the cable connectors within the body.

20. The geophone system of claim 12, wherein the body includes one or more keying ridges for aligning one or more of the cable connectors within the body.

21. The geophone system of claim 12, wherein the at least one electrical contact is a plurality of contact surfaces disposed on a circuit board.

22. The geophone system of claim 21, wherein the detachable coupling is a press coupling between the plurality of contact surfaces and the cable conductor terminations.

23. The geophone system of claim 12, wherein the circuit board includes one or more operational keying members for customizing the operation of the geophone system.

24. The geophone system of claim 12, wherein the cable connectors include:
a bridging device positioned on top of the seismic detector;
and a gasket device including an interior chamber and exterior walls positioned on top of the bridging device.

25. The geophone system of claim 22, wherein the press coupling includes a contact pressure rubber seal positioned between the cap and the cabling.

26. The geophone system of claim 24, wherein the bridging device includes exterior walls and an interior chamber.

27. The geophone system of claim 26, wherein the exterior walls of the bridging device include one or more keying slots for aligning the bridging device within the geophone system.

28. The geophone system of claim 27, further including one or more slots for supporting the cabling.

29. The geophone system of claim 24, wherein the gasket device includes:
an upper gasket half; and
a lower gasket half.

30. The geophone system of claim 24, wherein the gasket device includes exterior walls and an interior chamber.

31. The geophone system of claim 30, wherein the gasket device includes one or more slots in the exterior walls for supporting the cable.

32. The geophone system of claim 30, wherein the gasket device includes:
one or more slots extending through the exterior wall for supporting the cable; and
a contact pressure rubber seal coupled to the exterior wall and extending into the interior chamber.

33. The geophone system of claim 32, wherein the contact pressure rubber seal fits within the bridging device.

34. The geophone system of claim 12, wherein the cap includes one or more keying slots for aligning the cap on the body.

35. The geophone system of claim 12, wherein the cap includes one or more keying members for aligning the cap on the body.

36. A method of solderless assembly of a geophone system, the geophone system including one or more geophones, each geophone including a body including an opening defining a cavity, a geophone sensor, the geophone sensor having at least one electrical contact positioned in the cavity, one or more removable cables, each cable having at least one detachable cable conductor termination, and a cap for coupling to the body, the method comprising:
placing the geophone sensor within the cavity;
coupling the removable cable at the conductor termination to the geophone sensor within the cavity; and
coupling the cap to the body.

37. The method of claim 36, wherein the cap further comprises one or more locking fingers, and coupling the cap to the to the body further comprises using the locking fingers to couple the cap to the body.

38. The method of claim 36 further comprising using the cable conductor terminations for relieving stress on the cable.

39. The method of claim 36 wherein the at least one electrical contact includes a plurality of contact surfaces disposed on a circuit board, and wherein coupling the removable cable at the conductor termination to the geophone sensor further comprises using a press coupling between the plurality of contact surfaces and the cable conductor terminations.

40. The method of claim 39, wherein the press coupling further comprises positioning a contact pressure rubber seal between the cap and the cables.

* * * * *